INVENTORS
JOHN F. GARDNER
DONALD W. GOULDSMITH
THOMAS B. MICHAELS
GORDON P. TAILLIE
ATTORNEYS

INVENTORS
JOHN F. GARDNER
DONALD W. GOULDSMITH
THOMAS B. MICHAELS
GORDON P. TAILLIE

ATTORNEYS

INVENTORS
JOHN F. GARDNER
DONALD W. GOULDSMITH
THOMAS B. MICHAELS
GORDON P. TAILLIE

ATTORNEYS

INVENTORS
JOHN F. GARDNER
DONALD W. GOULDSMITH
THOMAS B. MICHAELS
GORDON P. TAILLIE

BY
ATTORNEYS

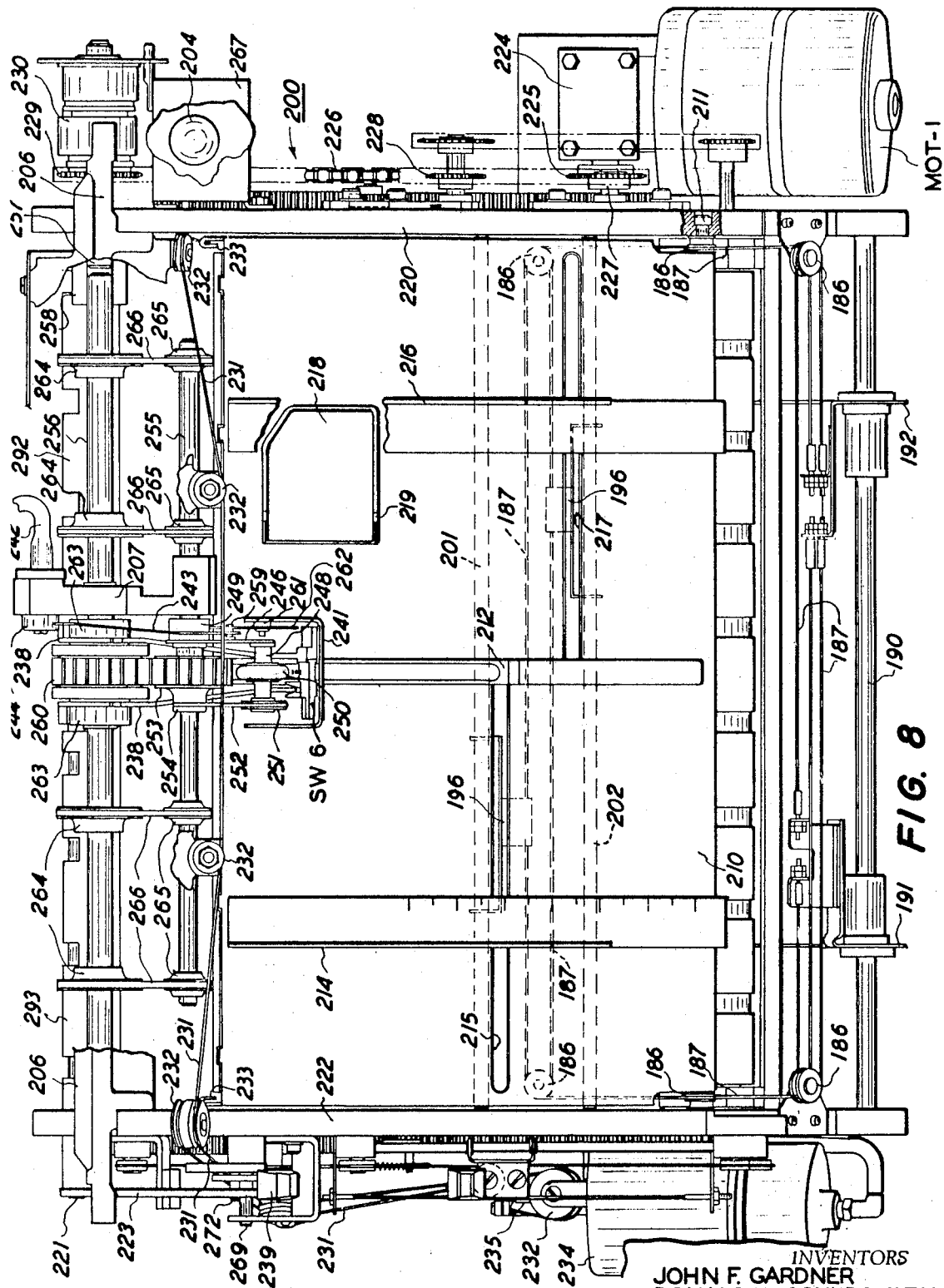

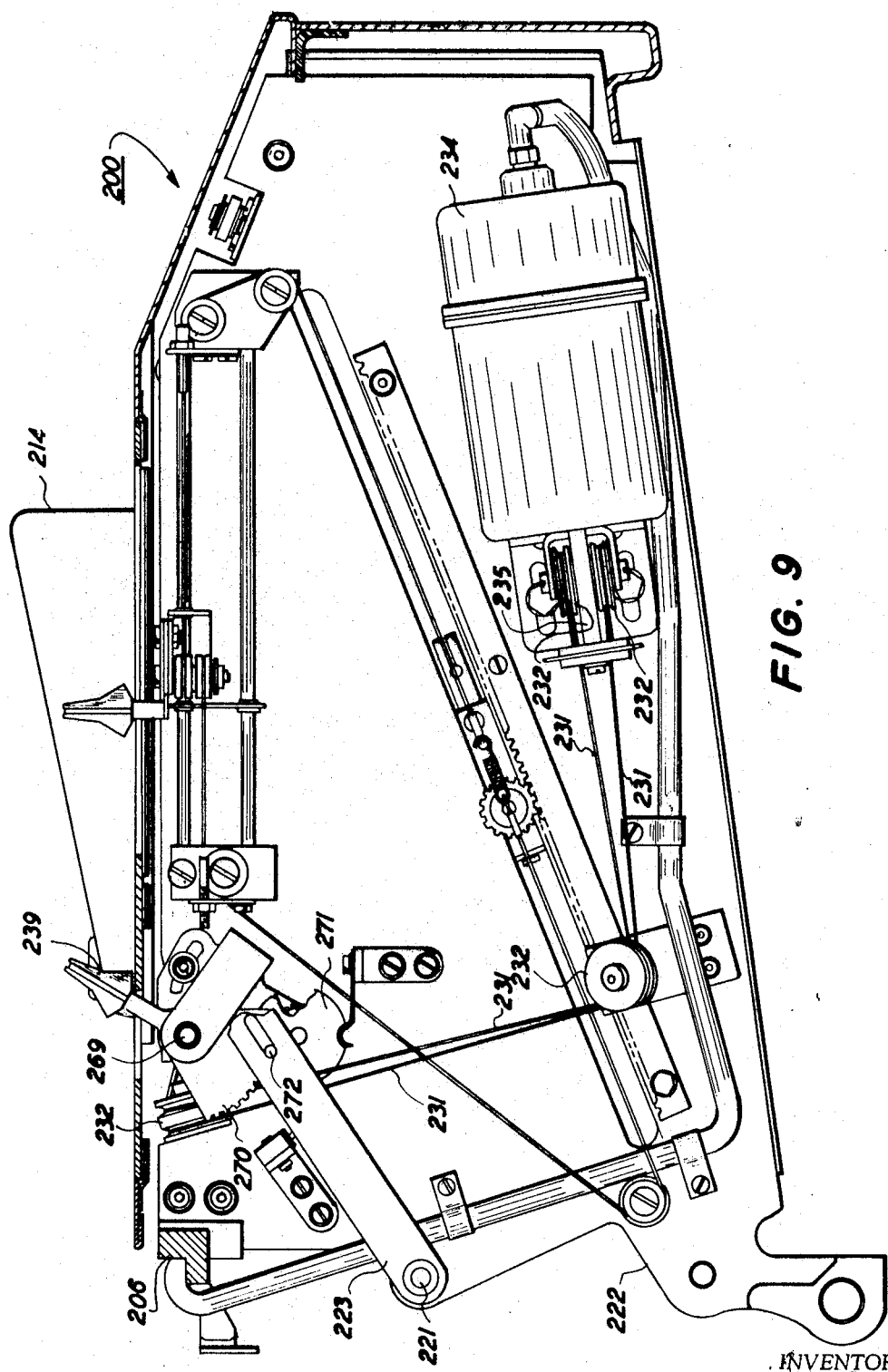

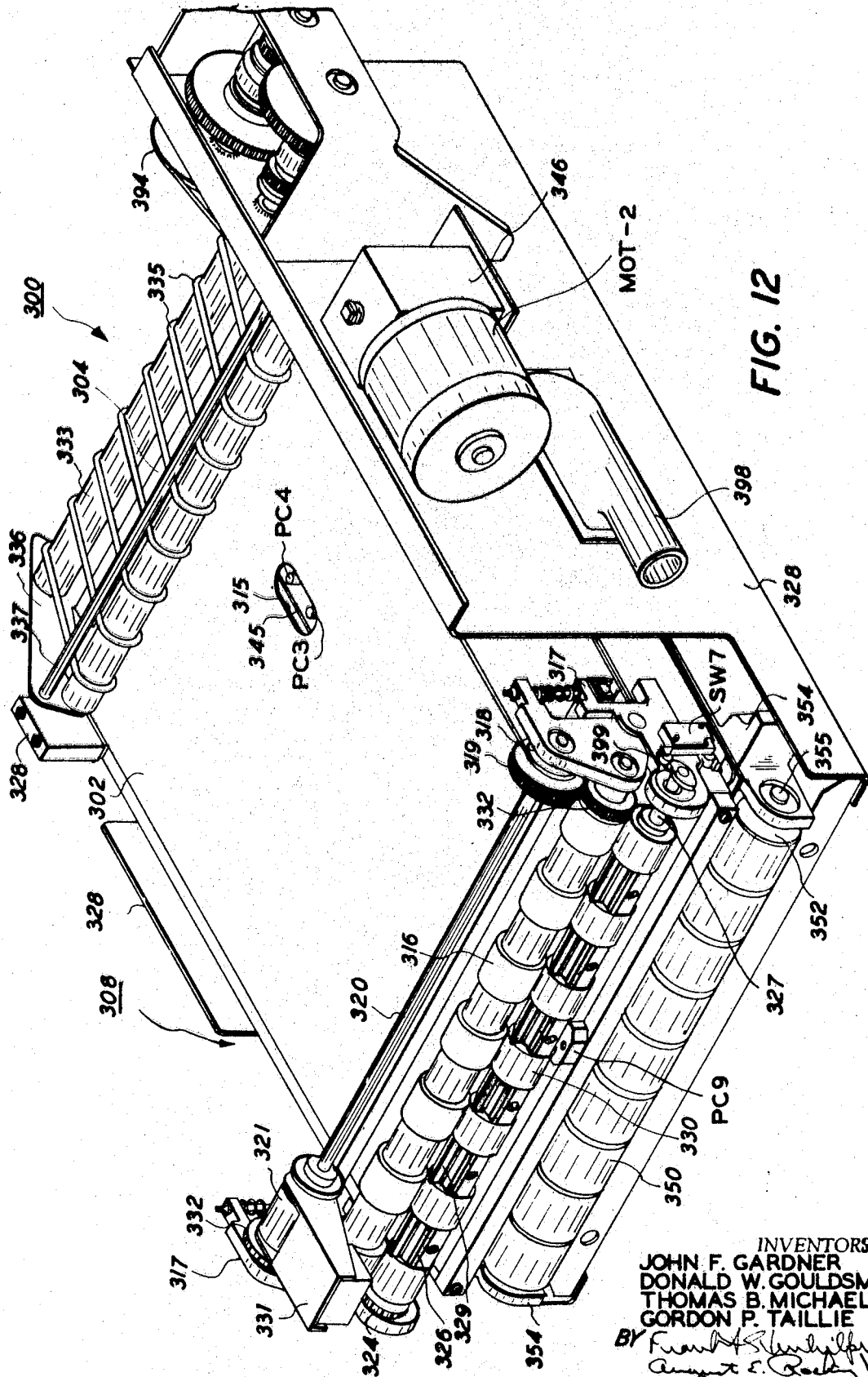

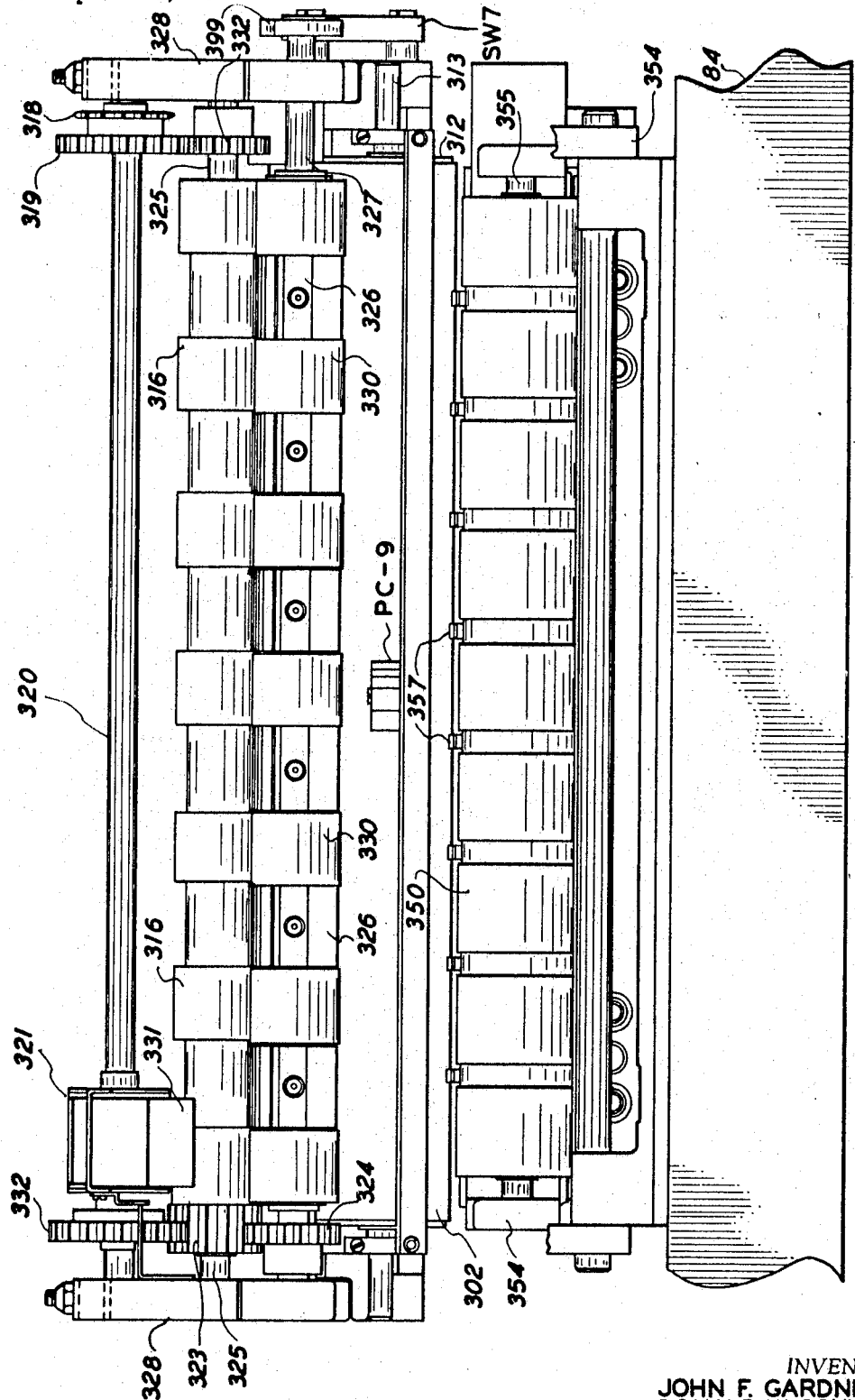

INVENTORS
JOHN F. GARDNER
DONALD W. GOULDSMITH
THOMAS B. MICHAELS
GORDON P. TAILLIE
BY
ATTORNEYS

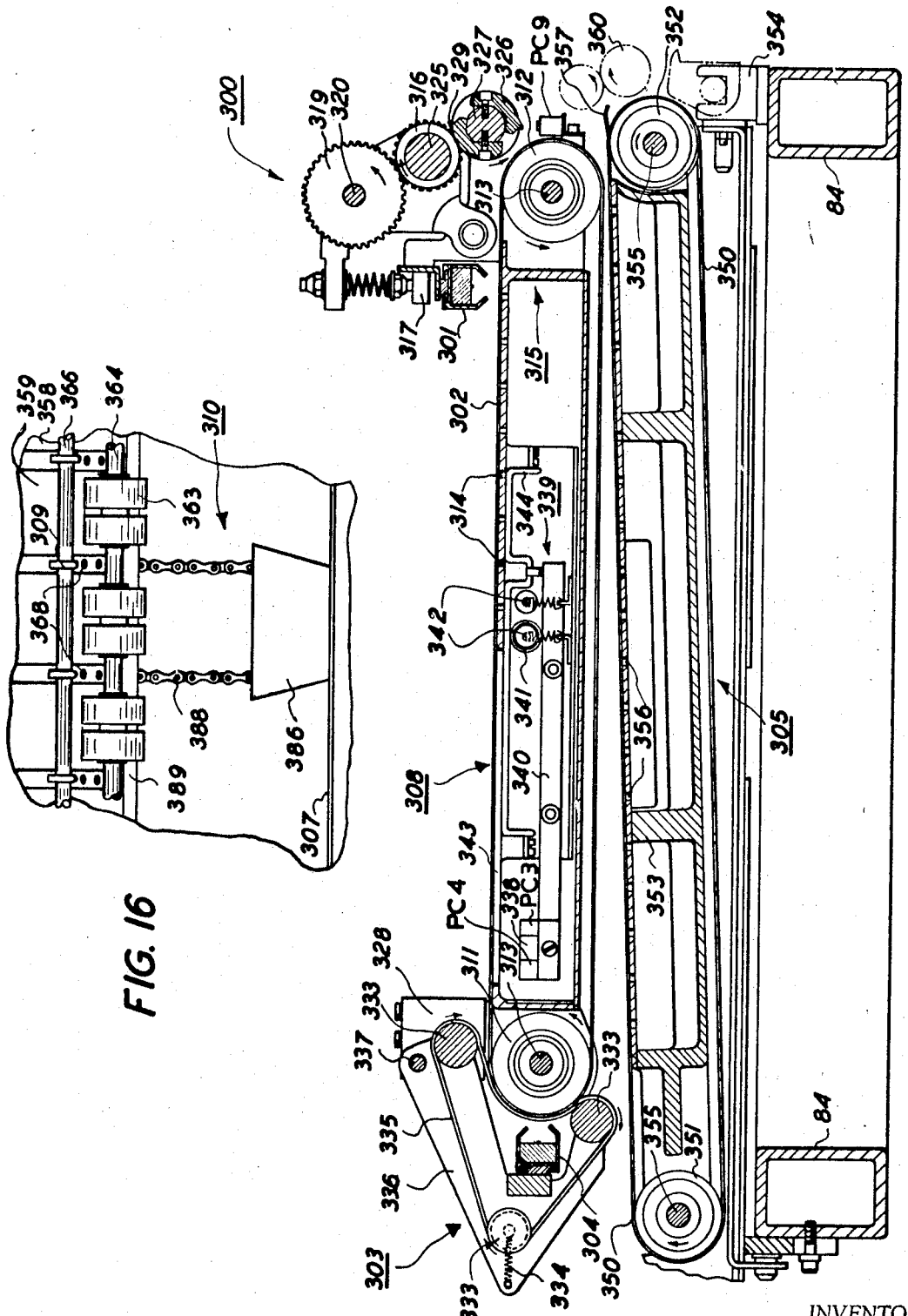

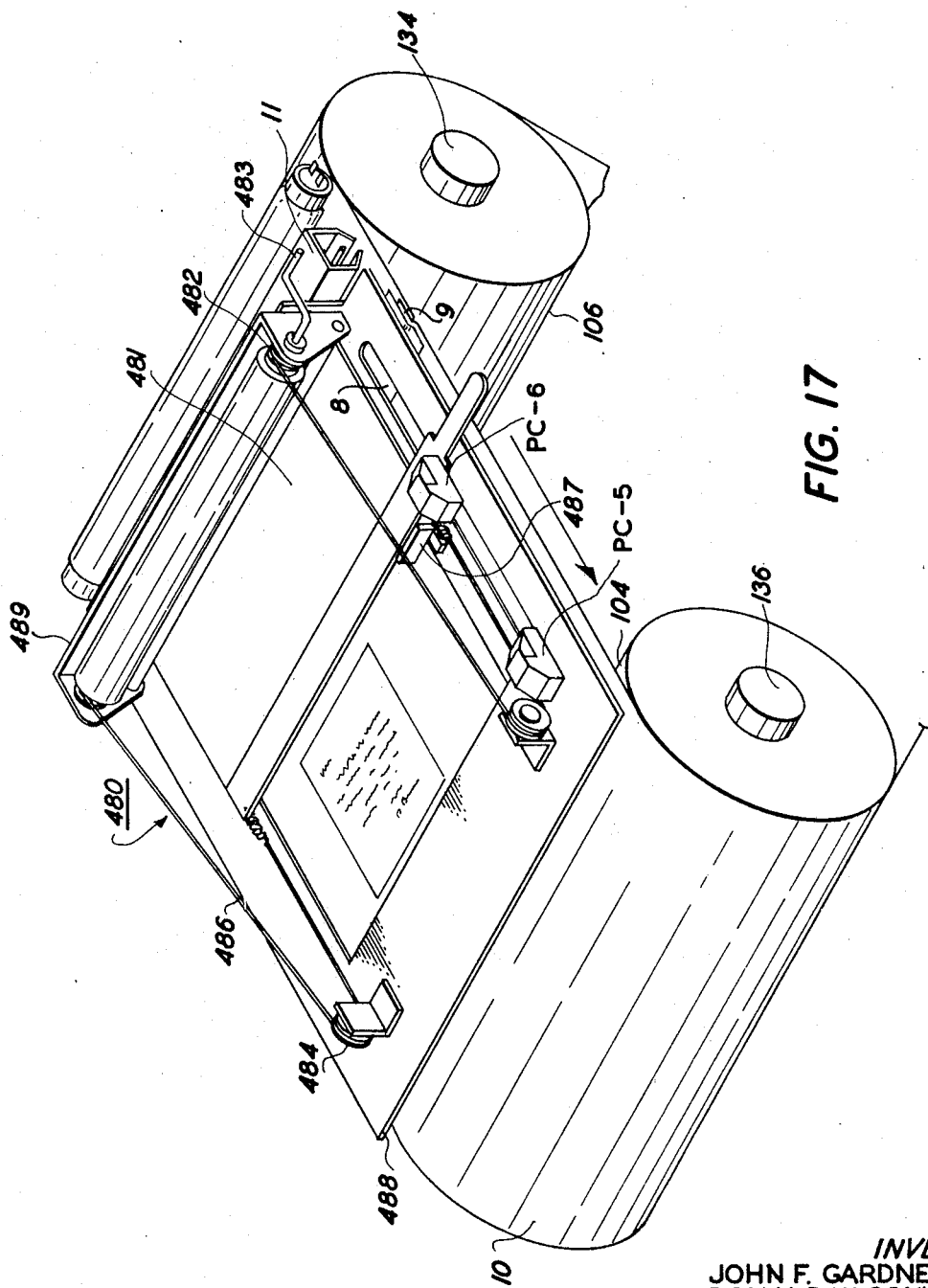

July 28, 1970  J. F. GARDNER ET AL  3,521,950
XEROGRAPHIC REPRODUCING APPARATUS
Filed April 21, 1967  32 Sheets-Sheet 16

INVENTORS
JOHN F. GARDNER
DONALD W. GOULDSMITH
THOMAS B. MICHAELS
BY GODON P. TAILLIE

ATTORNEYS

July 28, 1970   J. F. GARDNER ET AL   3,521,950
XEROGRAPHIC REPRODUCING APPARATUS
Filed April 21, 1967   32 Sheets-Sheet 20

INVENTORS
JOHN F. GARDNER
DONALD W. GOULDSMITH
THOMAS B. MICHAELS
GORDON P. TAILLIE
BY
ATTORNEYS

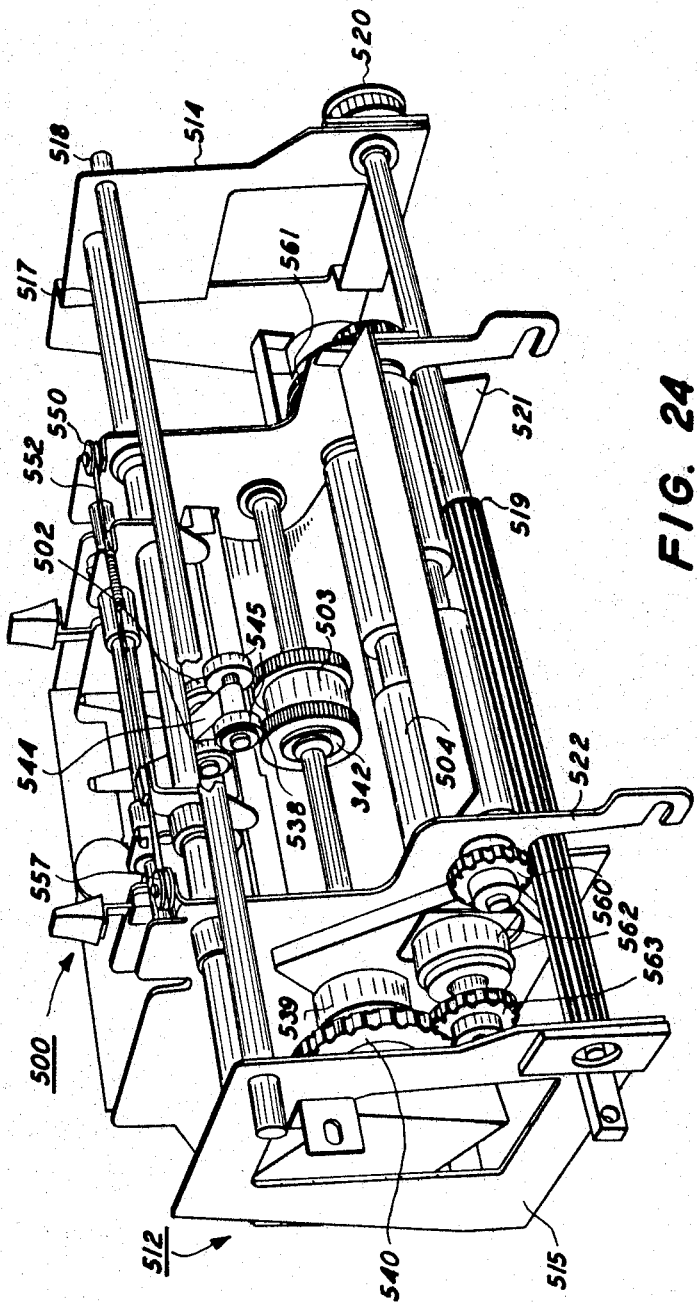

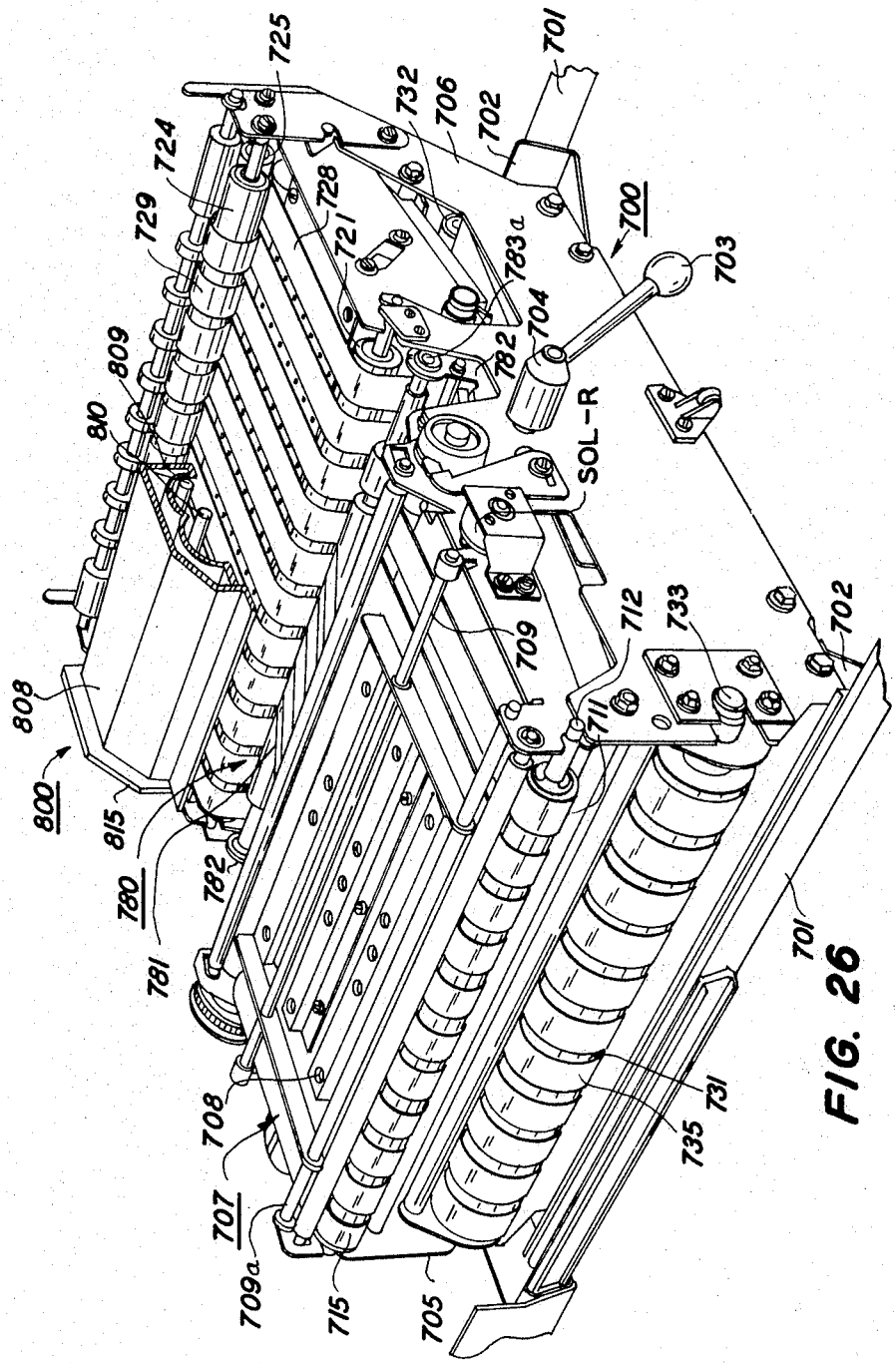

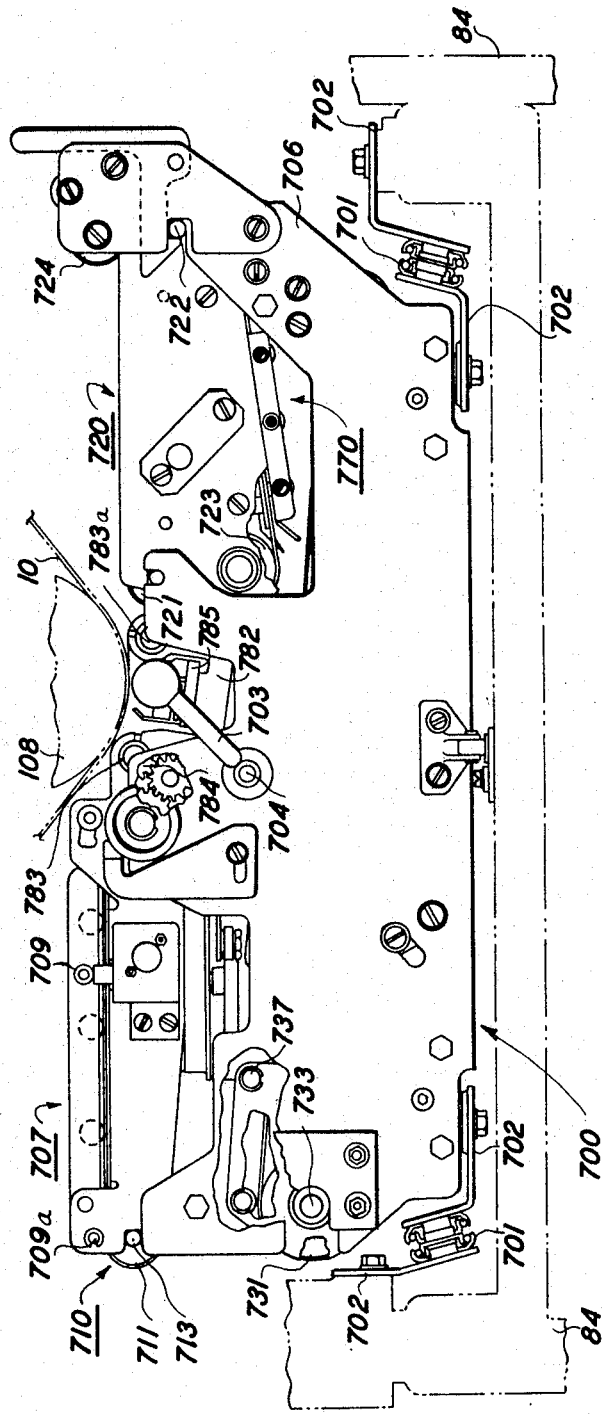

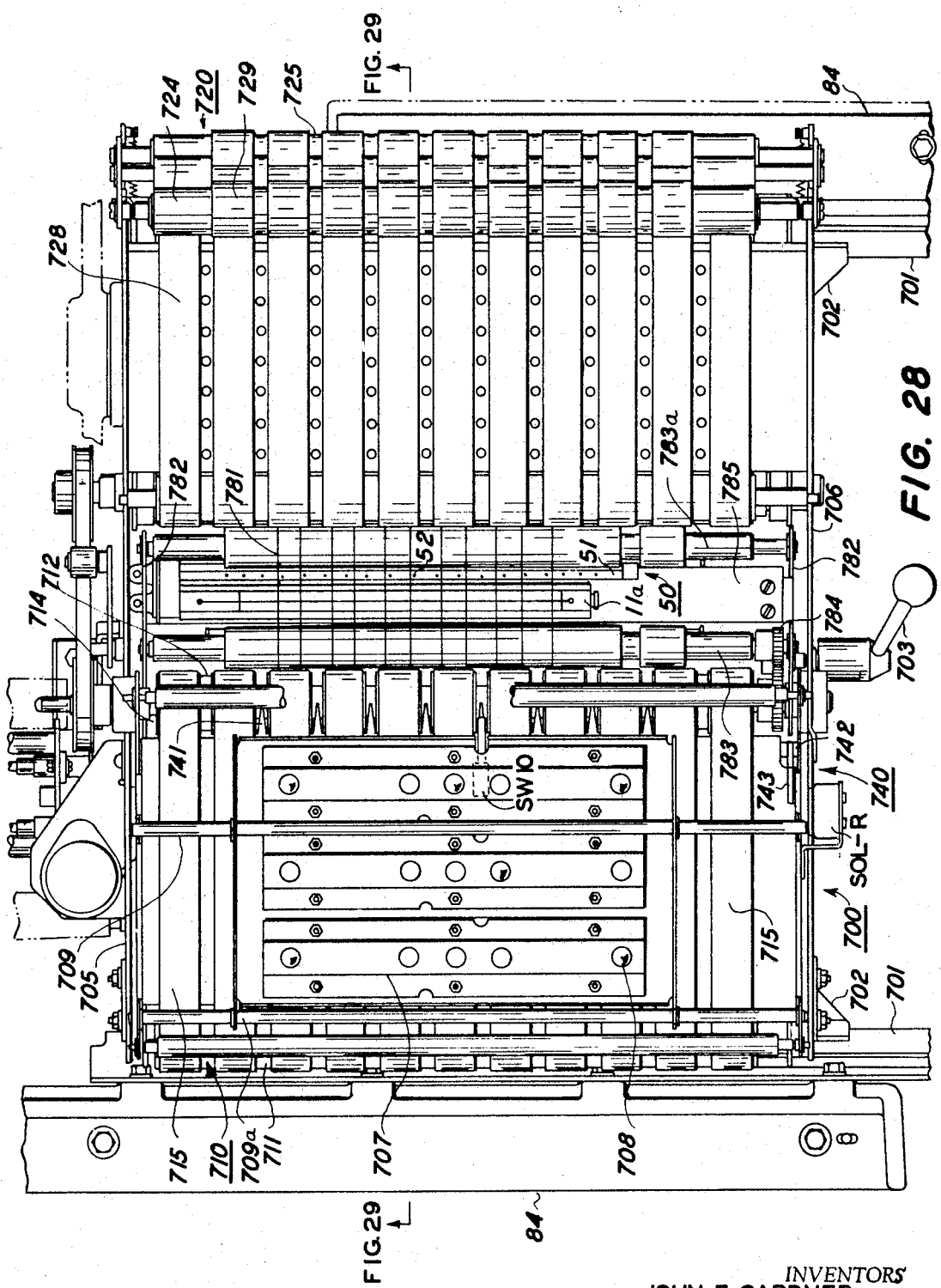

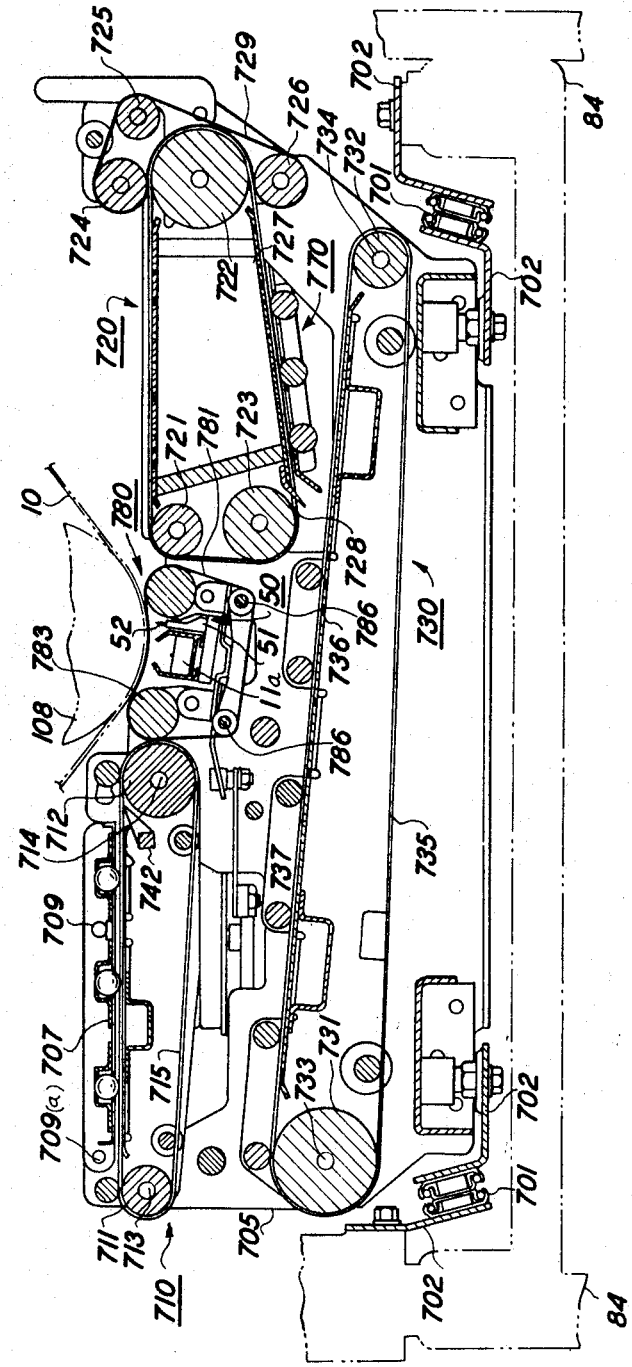

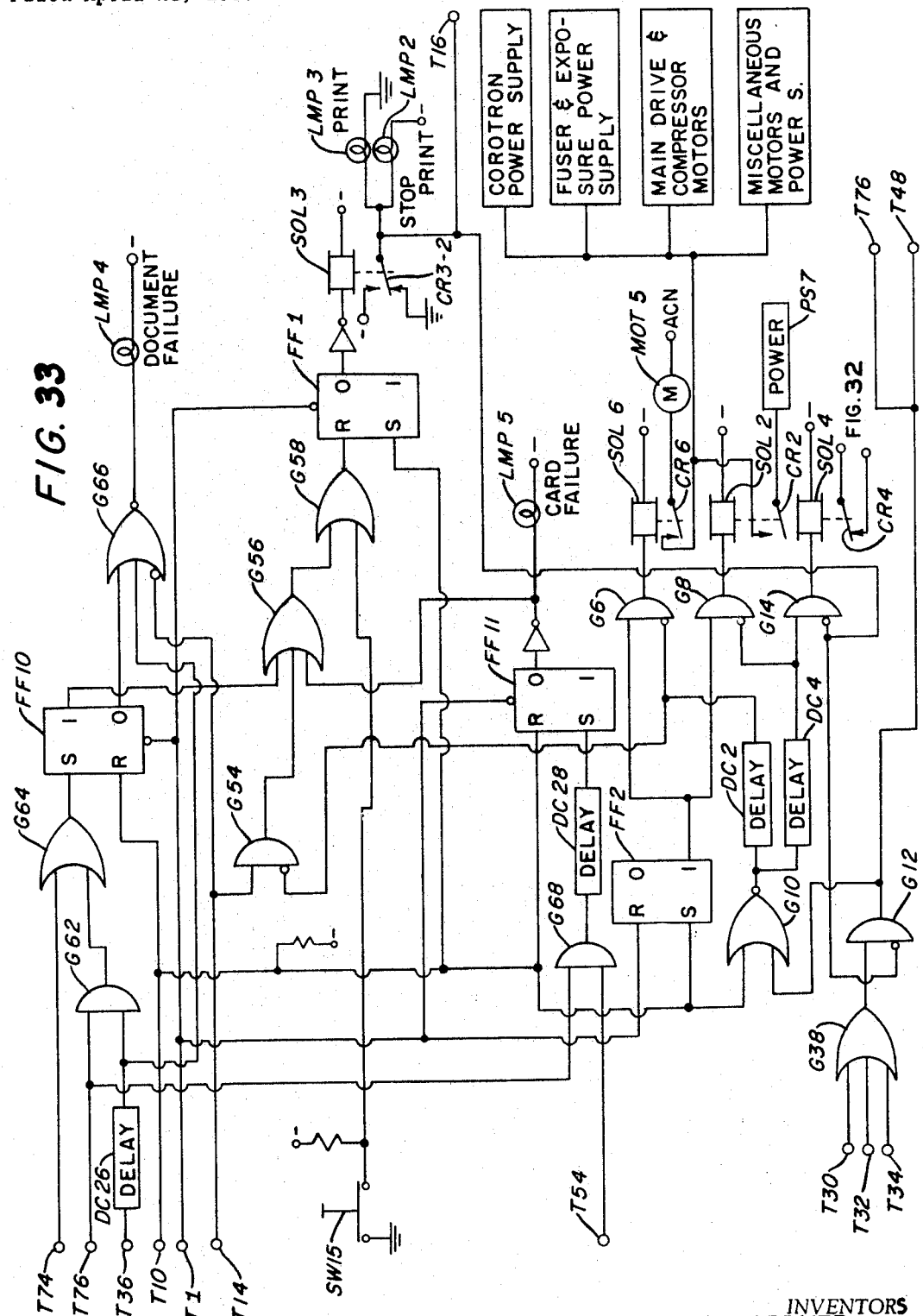

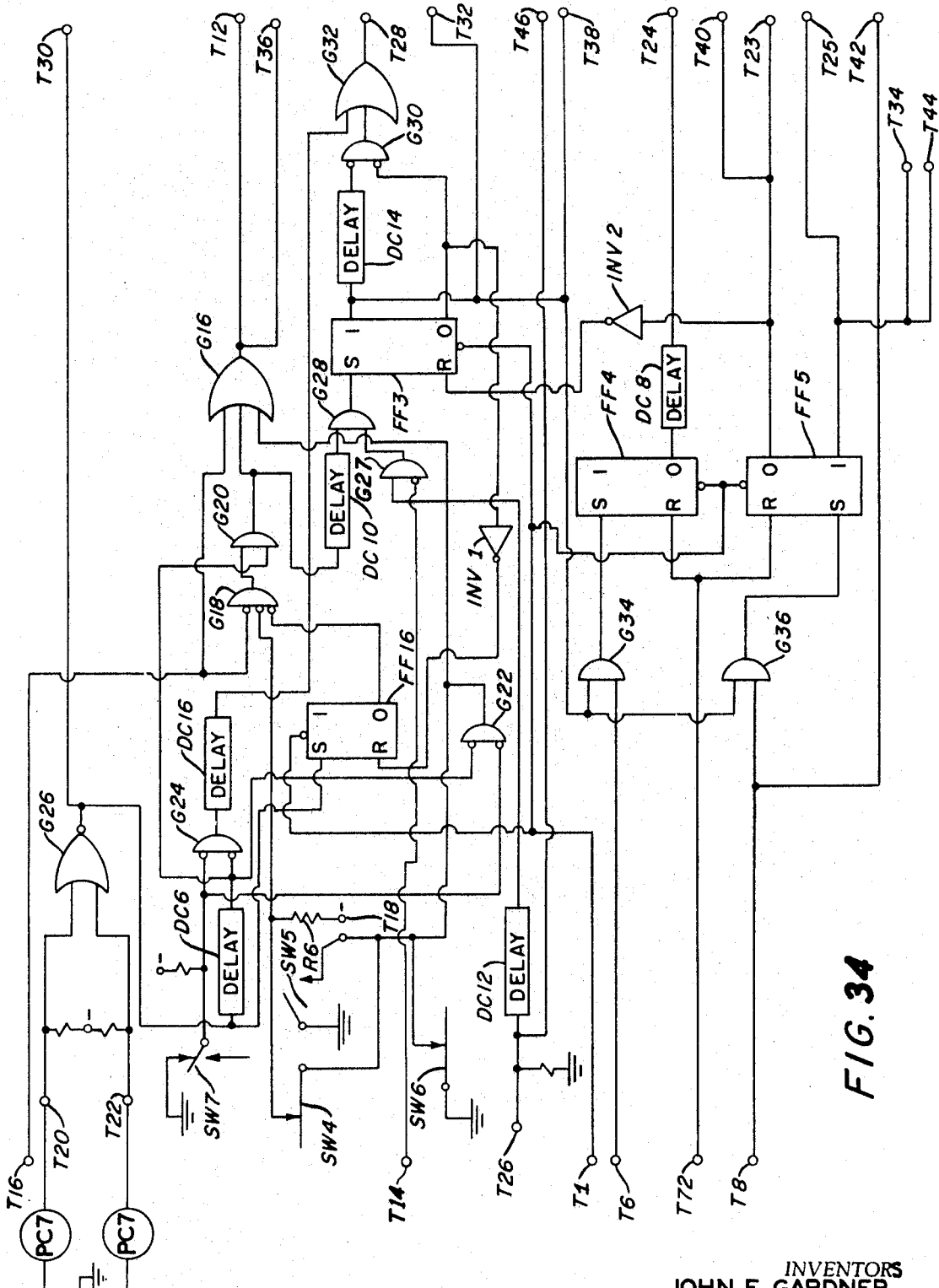

United States Patent Office 3,521,950
Patented July 28, 1970

3,521,950
XEROGRAPHIC REPRODUCING APPARATUS
John F. Gardner, Penfield, and Thomas B. Michaels, Gordon P. Taillie, and Donald W. Gouldsmith, Rochester, N.Y., assignors to Xerox Corporation, Rochester, N.Y., a corporation of New York
Filed Apr. 21, 1967, Ser. No. 632,662
Int. Cl. G03g 15/00
U.S. Cl. 355—3       4 Claims

ABSTRACT OF THE DISCLOSURE

Apparatus for xerographically creating a facsimile of various sized original documents onto data processing cards and duplicating the cards so produced wherein a document feeder serially forwards documents through an exposure station to be illuminated by a flash of light which may be repeated intermittently if multiple copies of the document are desired. The image of the document is projected through an appropriate lens system which projects a full or reduced size image of the document onto a xerographic belt forming an electrostatic latent image. The latent image is subsequently developed by application of xerographic toner powder which is then transferred from the belt to an electrical data processing machine card fed to the transfer station in timed relationship with the powder image on the xerographic belt. At the transfer station the powder image is transposed and permanently fixed onto the data processing card by means of intermittent flashes of radiant energy.

BACKGROUND OF THE INVENTION

This invention relates to xerographic reproducing machines and, in particular, to an improved xerographic reproducing machine for permanently recording data upon electrical accounting machine cards or a similar medium.

More specifically, this invention relates to a high speed automatic xerographic reproducing machine for creating a facsimile of various sized original documents onto electical data processing machine cards and duplicating the optically reduced image from such a card onto additional cards or similar media.

In utilizing electrical accounting machine (EAM) or electrical data processing (EDP) cards, it is frequently desirable to adapt a card to contain pictorial or graphic data as well as alphanumeric information. The graphic-data-bearing card can then be processed through commercially available information storage and retrieval apparatus and thereby be utilized in accordance with the coded information contained on the card for a variety of purposes such as documentation of engineering drawings, maintenance of personnel records, control of corporate capital assets, and recording purchase orders. In data processing cards, which are referred to as EAM or EDP cards of the above type which have been commercially available, known as microfilm aperture cards, a major problem that has existed is the requirement of an optical projection apparatus, known as a reader or viewer, for inspecting the aperture cards to view the data contained on the microfilm. This procedure for proofing the microfilm or ensuring that the correct card has been selected increases the time required of a person utilizing this equipment. In addition, if a duplicate of the original aperture card is required for incorporation into another coded program such duplication is a time consuming, costly procedure utilizing additional special equipment and requiring a skilled operator to photographically duplicate the microfilm, mount a film support onto the data processing card and to mount the duplicated microfilm on the support material.

The present invention comprises a high speed automatic xerographic reproducing machine capable of quickly and inexpensively reproducing a facsimile of various sized original documents directly onto EAM cards and duplicating such data processing cards without the need of special peripheral equipment or a skilled operator. The apparatus comprising the present invention creates graphic or alphanumeric data directly onto a data processing card for immediate use with any type of data processing machine, rather than the specialized equipment as heretofore required when using microfilm aperture cards. Since a facsimile of the original document is reproduced directly onto the EAM card, the entire non-coded portion of the card is available for imaging. The increased image area allows the user to read the information displayed on the card without requiring special reading or viewing equipment. In addition, since an image is created directly onto the card, a user may conveniently make notations on the card with specific reference, by inter lineation or circling, to important data which is graphically displayed thereon.

SUMMARY OF THE INVENTION

It is, therefore, an object of this invention to improve data processing media.

Another object of this invention is to improve apparatus for creating data processing or electric accounting machine cards by directly imaging original documents onto the card medium.

A further object of this invention is to improve apparatus for duplicating electrical accounting machine cards by directly imaging a reduced image from such a card onto another data processing card.

Still another object of this invention is to automatically create multiple minified facsimiles of an original document onto a data processing medium and to conveniently duplicate such a medium onto similar media for use in information storage and retrieval apparatus.

These and other objects are attained in accordance with the present invention wherein there is provided an automatic xerographic reproducing machine for creating a facsimile of various size original documents onto electrical accounting machine cards and duplicating the optically reduced image from such a card onto additional cards or similar media.

Further objects of this invention, together with additional features contributing thereto and advantages accruing therefrom, will be apparent from the following description of one embodiment of the invention when read in conjunction with the accompanying drawings, wherein:

BRIEF DESCRIPTION OF DRAWINGS

FIG. 8 is a plan view of the document feeding and separating apparatus with parts broken away to better illustrate the features thereof.

FIG. 9 is a left elevation of the document feeding and separating apparatus illustrated in FIG. 8.

FIG. 12 is a perspective view of the exposure transport and return transport utilized in the automatic xerographic reproducing machine illustrated in FIG. 1.

FIG. 13 is an end view of the exposure and return transport illustrated in FIG. 12 to show the document registration gate.

FIG. 15 is a sectional view taken along lines 15—15 of FIG. 14.

FIG. 16 is a partial view of the interior of the document stacker unit shown in FIG. 7 taken along lines 16—16 to better illustrate an adjustable back member.

FIG. 17 is a schematic perspective view of the xerographic belt module to better illustrate the apparatus for adjusting the area of the photoreceptive surface exposed to an image of an original document.

FIG. 24 is a perspective view of the card feeding apparatus shown in FIG. 21 to better illustrate the card feeding mechanism.

FIG. 26 is a perspective view of the card conveyor module and fusing apparatus illustrated in FIG. 3 to better illustrate the features thereof.

FIG. 27 is a frontal view of the card conveyor module shown in FIG. 26 with portions broken away to better illustrate the internal features thereof.

FIG. 28 is a top plan view of the card conveyor module illustrated in FIG. 26.

FIG. 29 is a sectional view of the card conveyor module taken along lines 29—29 to FIG. 28.

FIGS. 32 through 37 are schematics of the electronic control circuitry for the apparatus.

GENERAL

Figure 1:
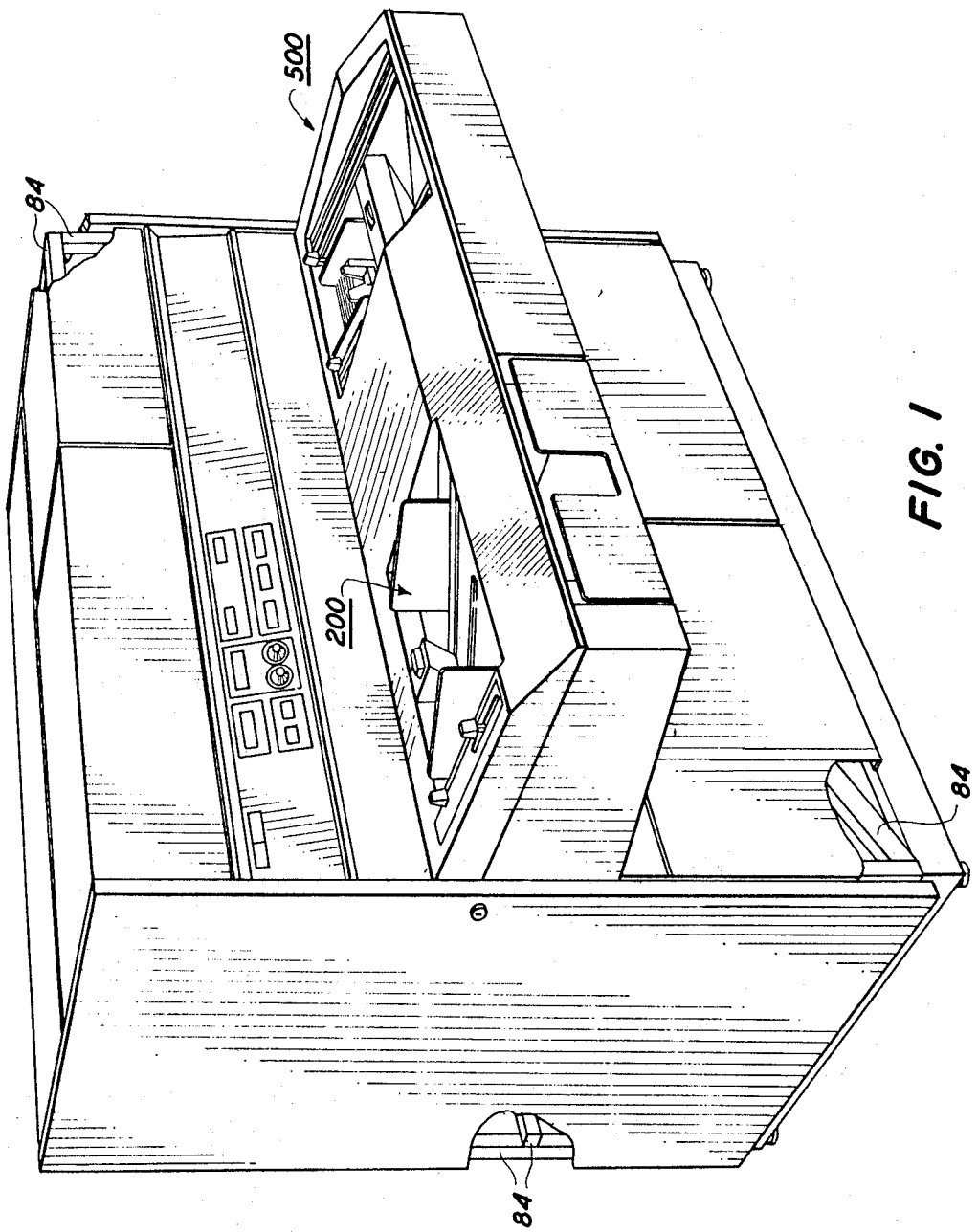
FIG. 1 is a perspective view of an automatic xerographic reproducing machine constructed in accordance with the invention.
Figure 2:
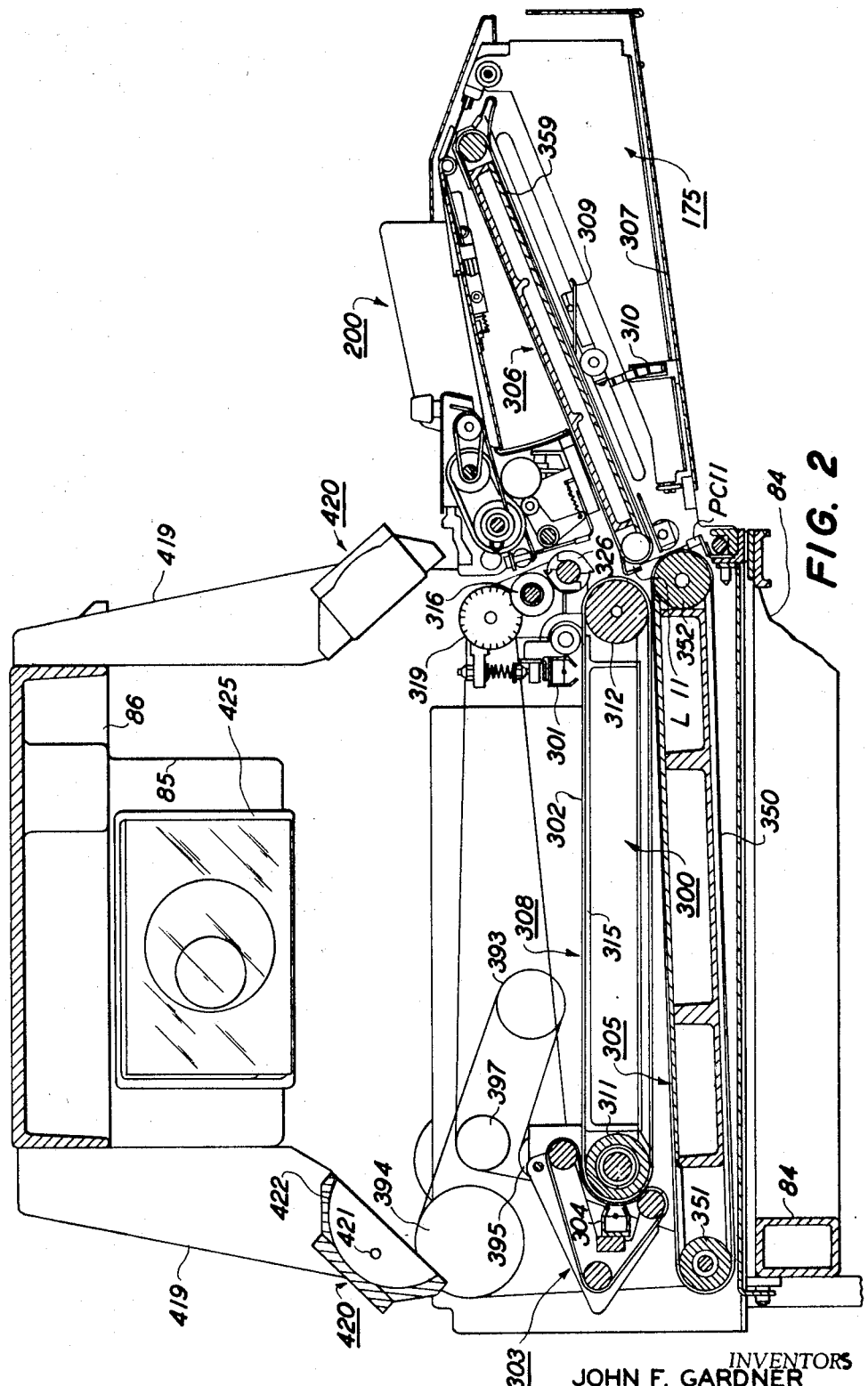
FIG. 2 is an enlarged partial section view of the left end of the automatic xerographic reproducing machine shown in FIG. 1 with parts removed and broken away to better illustrate the document feeder, document transport and optical system thereof.
Figure 3:
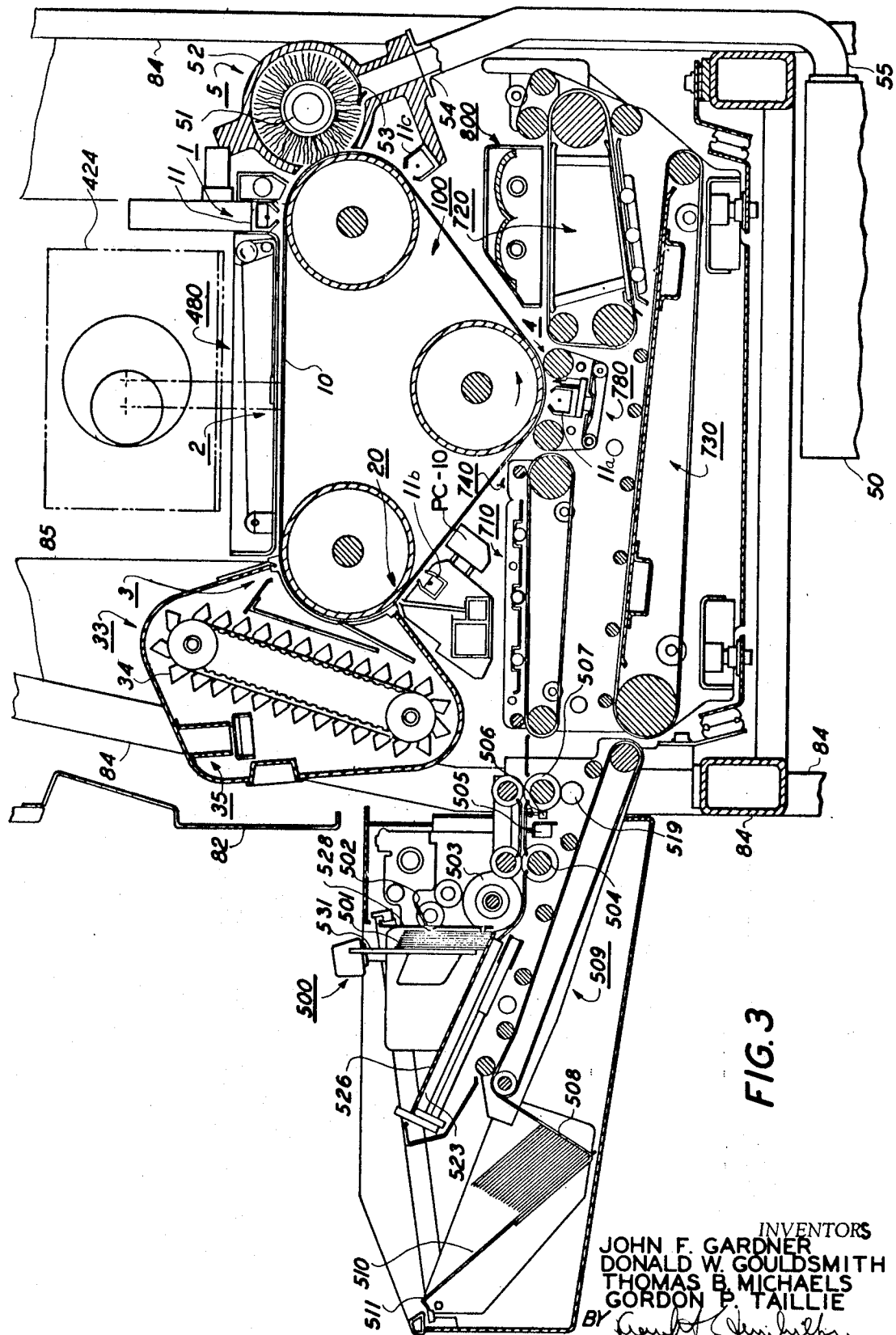
FIG. 3 is a sectional view taken substantially across the right end of the automatic xerographic reproducing machine illustrated in FIG. 1 with parts removed and broken away to better illustrate the card feeder, card conveyors, and apparatus for performing the xerographic process.
Figure 4:
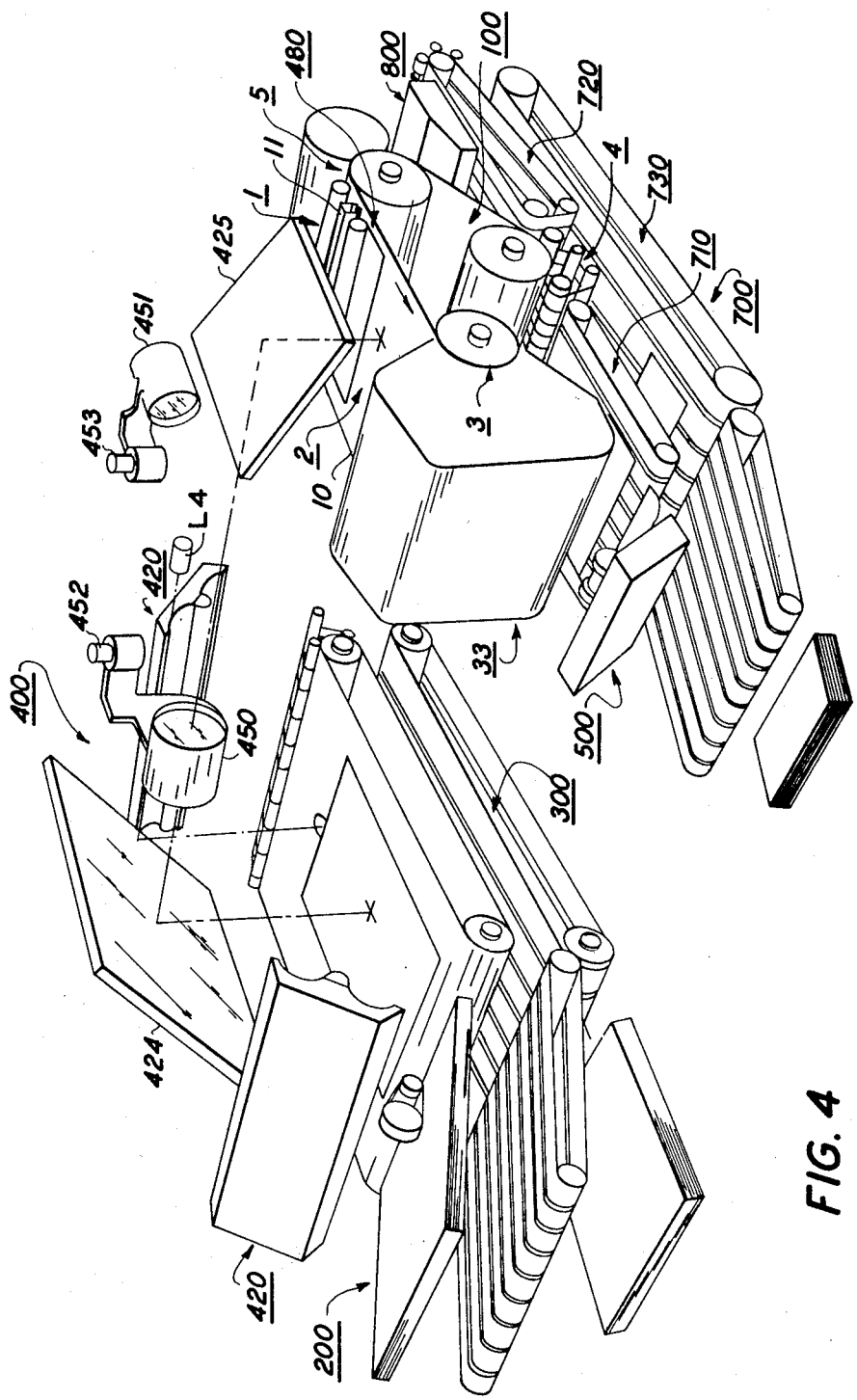
FIG. 4 is a schematic illustration of the optical path and processing stations utilized in the automatic xerographic reproducing machine.

Referring now to the drawings, there is shown in FIGS. 1, 2, 3, and schematically in FIG. 4, an embodiment of the subject invention wherein a document is positioned at an exposure station and a facsimile of the document imaged onto a photoreceptive surface for subsequent transfer to an EAM card or similar media to which the image is permanently affixed as by heat fusing.

An original document, that is the document which is to be reproduced, is fed to the machine by means of an automatic document feeder 200 and onto an exposure transport system 300 to an exposure station. At the exposure station a facsimile of the document is imaged, by means of an exposure-optical system 400, onto a xerographic plate 10, formed into a flexible endless web or belt, for further processing. The xerographic plate 10 includes a photoreceptive surface, for example of the type disclosed in Bixby U.S. Pat. No. 2,970,906 on a conductive backing which is formed into the shape of a flexible belt and mounted on a support module to rotate in the direction indicated by the arrow to cause the plate surface to sequentially pass a series of xerographic processing stations.

The several xerographic processing stations may be described functionally as:

A charging station 1 at which a uniform electrostatic charge is deposited on or in the photoreceptive layer of the xerographic plate;

A station 2, at which a light pattern of a document to be reproduced is projected onto the photoreceptive surface to dissipate the charge in the exposed areas thereof to thereby form a latent electrostatic image of the document to be reproduced;

A developing station 3, at which a xerographic developing material having an electrostatic charge opposite to that of the electrostatic latent image is applied to the photoreceptive surface, whereby the electrostatic latent image is made visible in the configuration of the document being reproduced;

A transfer station 4, at which the developed image is transferred from the photoreceptive surface to a transfer material or a support medium; and A cleaning and discharge station 5, at which the photoreceptive surface is cleaned to remove residual developing material remaining thereon after image transfer, and at which the photoreceptive surface is exposed to a relatively bright light source to effect substantially complete discharge of any residual electrostatic charge remaining thereon.

The transfer material, or support media, is forwarded in timed relation to the formation of the developed visible image on the photoreceptive surface by means of an automatic card feeder 500 whereby the support medium, for example, EAM cards, are forwarded onto a card conveyor or transport system 700 to bring the EAM card into contact with the developed-image-bearing photoreceptive surface for the transfer of the image to the support medium.

After transfer of the developed image to the support medium, or EDP card, the developed image-bearing data processing card is conveyed by the transport system beneath a fixing apparatus 800 whereat the transposed image is permanently affixed to the card. After affixing the developed image to the support medium, the EAM card is conveyed out of the reproducing machine and into a stacking apparatus from which the completed cards may be removed in the order in which they have been created.

At the charging station 1, there is shown a preferred apparatus (FIG. 3) for placing a substantially uniform electrostatic charge on or in the photoconductive surface although any suitable apparatus could be utilized. The apparatus shown 11 is referred to as a corotron and may be of the type disclosed in Vyverberg U.S. Pat. No.

2,836,725 and reference is made thereto for details of the corotron construction. The corotron 11 is supported by a pair of brackets secured to an exposure mask 480 and is positioned adjacent to the xerographic plate 10 extending transversely across the plate surface and energized from a high potential source as shown in the electrical schematic FIG. 33.

The substantially uniform electrostatic charge placed on or in the xerographic plate surface is dissipated in accordance with a light pattern image projected onto the plate surface at a point subsequent to the charging station 1 by means of an exposure-optical system 400 to be hereinafter described in detail. The latent electrostatic image formed at the termination point of the optical path emanating from the exposure station is a full frame exposure of the original document flashed onto the xerographic plate by a high intensity-short duration flash of light from the lamp assembly 420. This light may be electromagnetic rays of any wavelength which will cause a latent image to be formed at the photosensitive surface, 10, although wavelengths in the visible spectrum are generally used. This instantaneous flash of light reflected from a document registered at the exposure station is projected onto the moving xerographic plate to form a latent electrostatic image which is passed to the developing station 3 to be made visible.

Adjacent to the termination point of the optical path emanating from the exposure station is a developing station 3 in which there is positioned a developer apparatus 33 including a casing or housing having a lower or sump portion for accumulating xerographic developer material, which comprises carrier particles and toner powder for developing the electrostatic latent image at the xerographic plate surface. The developer apparatus 33, as seen in FIG. 3, is positioned adjacent the xerographic plate 10 and supported from a portion of the main frame of the xerographic reproducing machine. A bucket type conveyor 34 is used to carry the developing material to the upper part of the developer housing where it is cascaded over a hopper chute onto the xerographic plate to effect development of the latent electrostatic image at the plate surface. A toner dispenser 35 is used to accurately meter toner to the developing material as toner powder is consumed during the developing operation. The developer apparatus 33 is of the type disclosed in W. G. Lewis et al. U.S. Pat. No. 2,067,720 and utilizes a toner dispenser 35 of the type disclosed in R. A. Hunt, U.S. Pat. No. 3,013,703, and reference is made to the two aforementioned patents for the details of construction disclosed therein, and to copending application Ser No. 436,173 filed Mar. 1, 1965, now U.S. Pat. No. 3,332,328 in the name of C. F. Roth for details of the air-knife seal 20 positioned adjacent the developer unit 35 and xerographic belt 10.

Positioned next in the path of the advancing plate surface is a transfer station 4 including a corotron 11a, of the type referred to above, for transposing the developed image from the plate surface onto an EAM card passing between the developed image and the transfer station. The corotron 11a, supported beneath a plurality of strands 781 of the transfer conveyor 780, extends transversely across the xerographic plate surface 10 and is energized from a high potential source as shown in electrical schematic FIG. 33. In operation, the electrostatic field created by the corona transfer device is effective to tack the support medium, or EDP card, electrostatically to the plate surface whereby the support material moves synchronously with the drum while in contact therewith. Simultaneously with the tacking action, the electrostatic field is effective to attract substantially all of the developed image from the plate surface and cause the image to adhere electrostatically to the surface of the support medium.

Immediately subsequent to the image transfer station 4, there is positioned a stripping apparatus or card pick-off corotron 60 for removing the EAM cards from the plate surface. The stripping corotron 60 includes a conductor extending transversely across the plate surface, and energized from a high potential source as shown in the electrical schematic FIG. 33, enclosed in a suitable insulating material 61. A plurality of pin like electrodes 62 extend from the conductor through the insulative material and are positioned adjacent the xerographic plate to emit a corona discharge to substantially neutralize the electrostatic charge placed onto the support media by the transfer corotron 11a allowing the support media or, EDP card, to fall from the plate surface onto the fuser conveyor 720.

Figure 32:
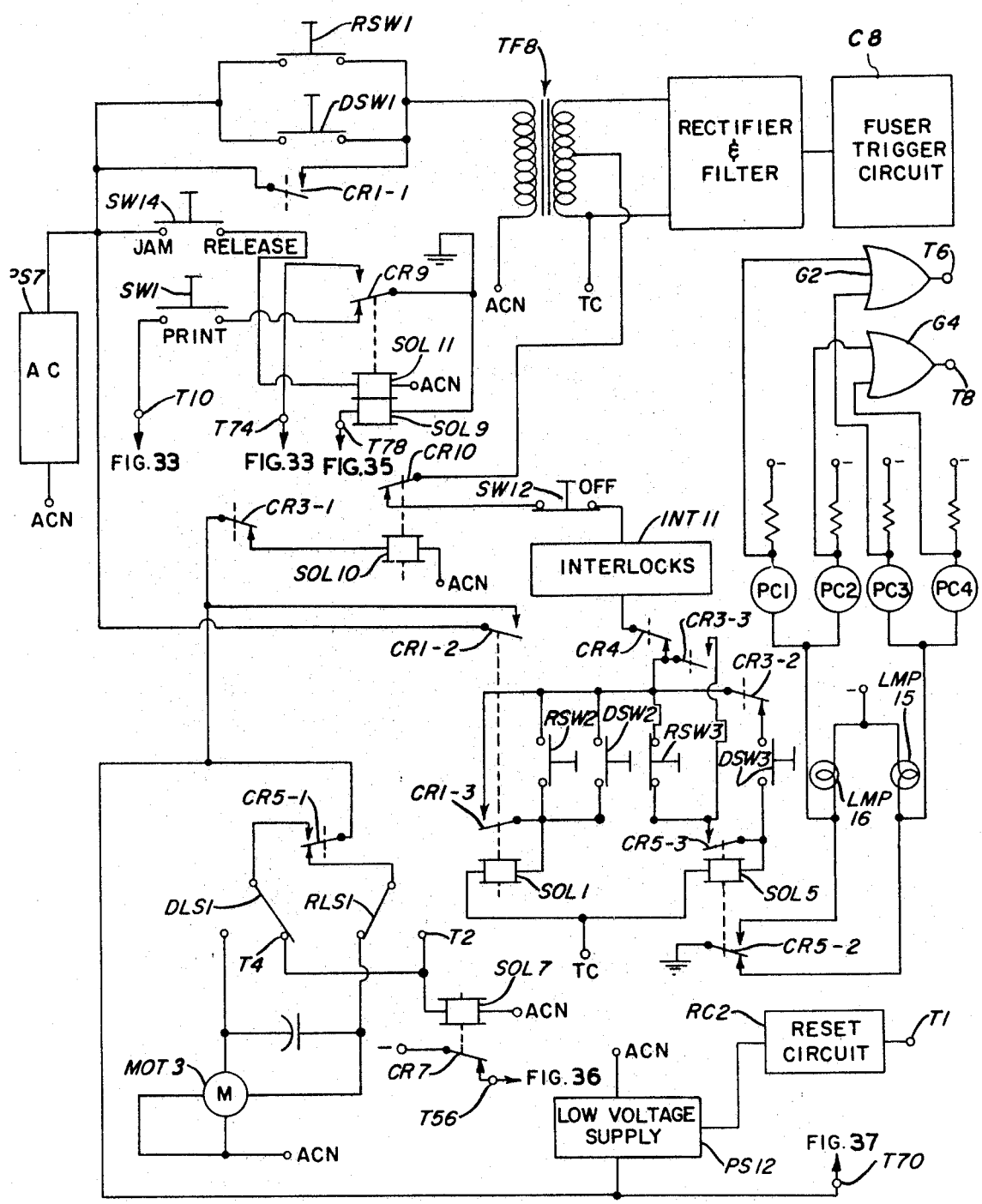

The fuser conveyor 720 forwards the image bearing data processing card beneath the fuser 800 whereat the image is permanently fixed or fused to the card by intermittent flashes of radiant energy from the lamps 810 connected to a suitable power supply as shown in FIG. 32 and intermittently actuated by means of a trigger circuit disclosed in copending application Ser. No. 547,048, filed May 2, 1966, now U.S. Pat. No. 3,445,626, in the name of T. B. Michaels.

After fusing, the card is discharged from the apparatus by means of the fuser conveyor 720, the return conveyor 730, to the card feeder and stacker 500 whereat the card is conveyed to a stacker unit 508 by means of a conveyor 509.

The next and final station positioned adjacent the moving plate surface is the plate cleaning and discharge station 5 at which the photoreceptive surface is cleaned to remove residual developing material remaining thereon after image transfer, and at which the photoreceptive surface is exposed to a relatively bright light source to effect substantially complete discharge of any residual electrostatic charge remaining thereon.

To remove residual developing material from the xerographic plate surface after loosening by means of a preclean corotron 11c, there is disposed a cylindrical brush 51 rotatably mounted on an axle and driven by a motor, not shown. The preclean corotron 11c applied an electrostatic charge of a polarity opposite to that of the toner powder to lessen the electrostatic bond between the toner powder and the plate surface. For collecting powder particles removed from the plate surface by the brush, there is provided a dust hood 52 that is formed to encompass approximately two-thirds of the brush area. To insure thorough cleaning of the brush, a flicking bar 53 is secured to the interior of the dust hood adjacent the edge of the outlet duct 54 for the dust hood in an interfering relation with the ends of the brush bristles whereby dust particles may be dislodged therefrom.

For removing dust particles from the brush and dust hood, an exhaust duct 55 is arranged to cover the outlet of the dust hood, the exhaust duct being connected at its other end to the wall of a filter box 50 attached to the dust hood. A filter bag is secured within the filter box, with the mouth of the filter bag in communication with the exhaust duct. A motor fan unit connected to the filter box produces a flow of air through the filter box drawing air through the area surrounding the xerographic plate surface in the dust hood, the air entraining developer material, or toner powder, particles removed from the drum by the brush as the air flows through the dust hood. Toner powder developing particles are separated from the air as it flows through the filter bag so that only clean air reaches the motor unit.

Figure 5:
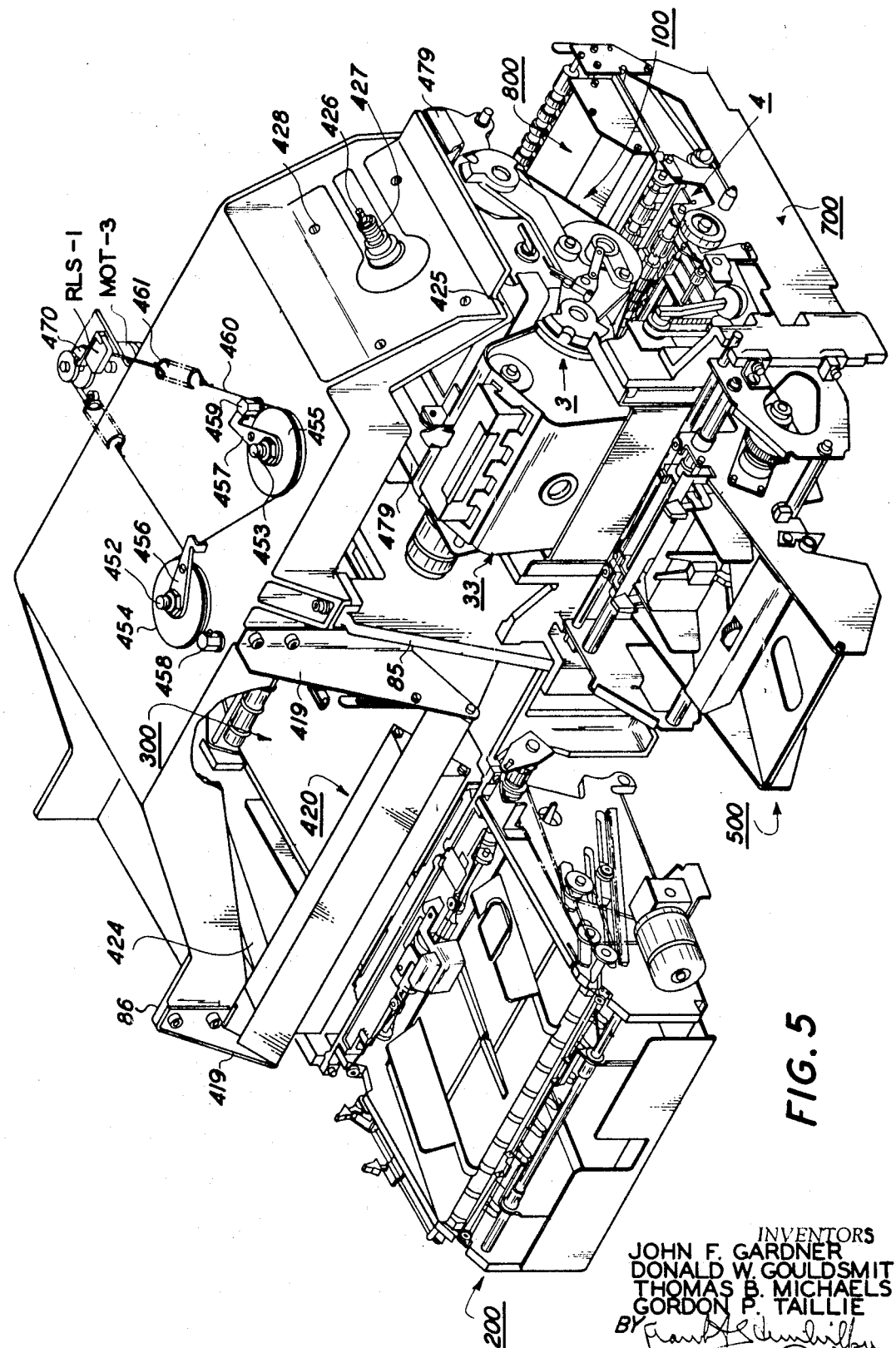
FIG. 5 is a perspective view of the automatic xerographic reproducing machine with the covers removed to better illustrate the internal mechanism thereof.
Figure 31:
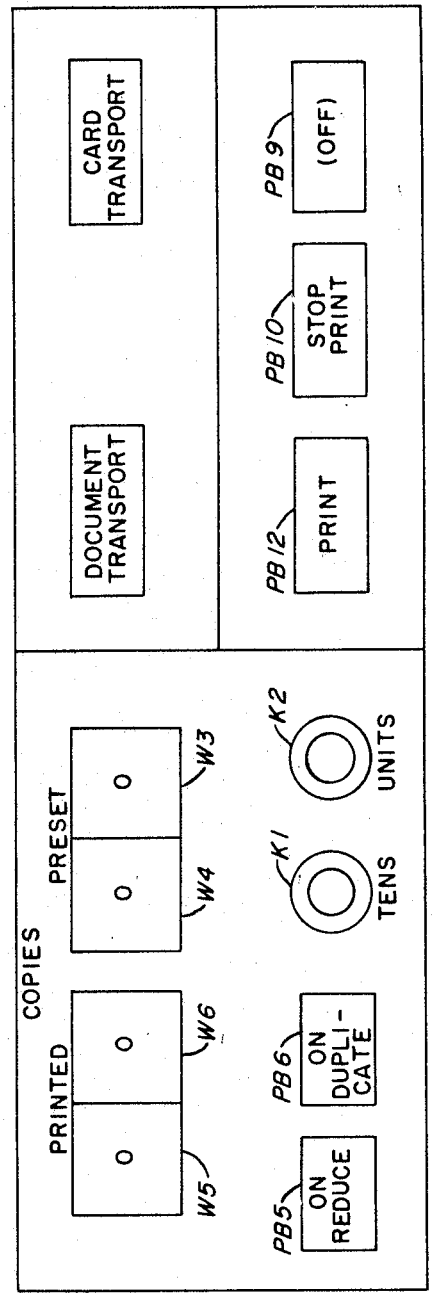
FIG. 31 is an enlarged view of the control panel of the apparatus of the present invention.

This xerographic apparatus is adapted for installation in a suitable cabinet as shown in FIG. 1. The cabinet, is constructed in a conventional manner and has mounted on the front thereof a control panel for initiating operation of the machine and for selecting and indicating the number of reproductions to be made. An enlarged view of the control panel portion of the xerographic machine is shown in FIG. 31. The automatic xerographic reproducing machine comprises a box-like reinforced frame comprising frame members 84 which support various components of the machine including the document feeder 200, exposure-return transport 300, card feeder 500, card transport module 700 and a vertical support plate 85, which divides the internal portions of the machine into substantially two portions. The two portions, as best seen in FIGS. 4 and 5, comprise a document feeding-exposure portion including the document feeder 200 and exposure-return transport 300 and a xerographic portion including the card feeder 500, card conveyor module 700, fuser 800 and xerographic processing stations. The two portions are optically connected by means of the optical-exposure system 400 including the illuminating lamps 420, mirrors 424, 425 and lenses 450, 451.

The optical-exposure system 400 is supported by an optical frame plate 86 secured at approximately its midpoint on the upper end of vertical support plate 85 and with the end extending into the document feeder-exposure portion secured to a frame member 84. The vertical support plate 85 carries the drive and timing components of the various mechanisms associated with the machine and supported from the vertical plate and/or frame members 84.

DOCUMENT FEEDER AND SEPARATOR

Figure 6:
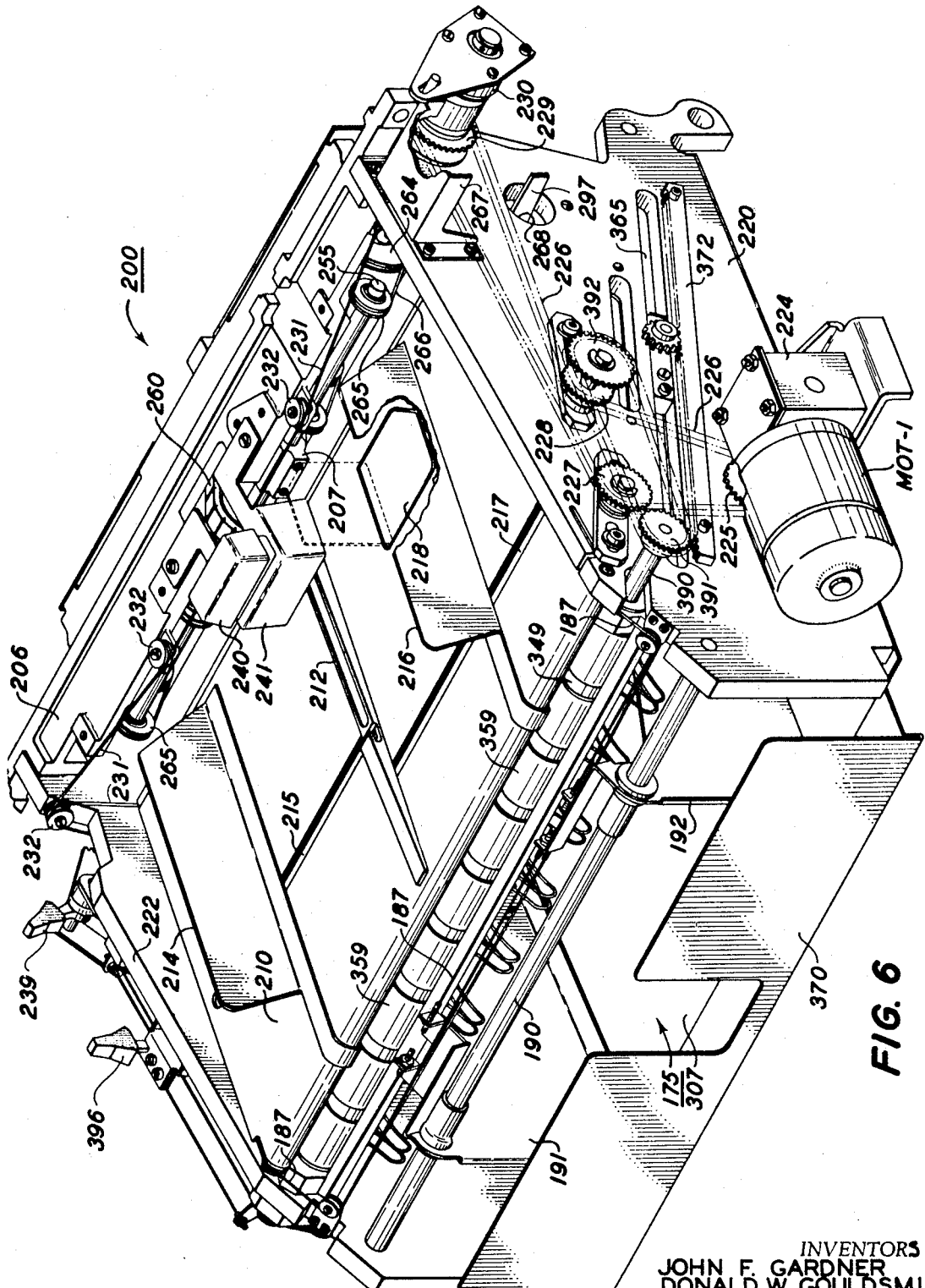
FIG. 6 is a perspective view of an automatic document feeding and separating apparatus utilized in the automatic xerographic reproducing machine illustrated in FIG. 1.

A preferred embodiment of a feeding and separating apparatus particularly adapted for use in an automatic xerographic reproducing machine of the type illustrated in FIG. 1 is shown in FIG. 6. As shown in FIG. 1, the feeder-separator apparatus is mounted in a desk console external to the xerographic portion of the automatic reproducing machine. A document return conveyor and stacking apparatus is mounted within the desk console arrangement below the feeding and separating apparatus. As can be seen from FIG. 1 and as will hereinafter become readily apparent, documents to be processed by the automatic xerographic reproducing machine are placed in the feeder-separator apparatus generally designated 200 and are fed individually into the machine for processing. After processing these documents are returned to the operator by the return conveyor and stacking apparatus generally designated 300.

Referring now especially to FIGS. 6 and 8, the feeder-separator apparatus is mounted between a pair of side frame plates 220 and 222 as is also the document return conveyor and stacker apparatus. A cross frame casting 206 is connected between side frame plates 220 and 222 via bolts or other suitable fastening means. The feeder-separator apparatus and document return-conveyor and stacker apparatus are then attached to the frame assembly of the automatic xerographic reproducing machine via side frame plates 220 and 222 and cross frame casting 206.

A document support tray 210 is pivotally mounted between side frame plates 220 and 222 via pivot shaft 211. A document support member 212 projects above the surface of the document support tray 210 and extends longitudinally in the direction of feed into the feeder-separator area. Documents placed on document support tray 210 extend over support member 212 in draped or arched configuration which has the effect of substantially reducing the tendency of adjacent sheets in the stack to adhere together.

A switch SW-4 which is utilized in manual feeding operations is located beneath document support tray 210. A double L-shaped actuator rod 197 extends from switch SW-4 through openings in document support tray 210 and document support member 212 and is adapted to be contacted by the trailing edge of a manually fed document or document carrier. Actuator rod 197 is normally biased into engagement with switch SW-4 by a spring 195.

A pair of upstanding paper guide plates 214 and 216 are mounted for transverse positioning through slots 215 and 217 respectively in document support tray 210 via mounting brackets 196 on shafts 201 and 202. Paper guide plates 214 and 216 are interconnected by a cable arrangement to paper guide plates 191 and 192 of the document return conveyor and stacker apparatus by cable 187. As may be seen from FIGS. 6 to 8, the cable 187 passes from the mounting bracket 196 of paper guide plate 216 over a dual pulley 186 at the end of paper guide slot 217 and is connected to the mounting bracket 196 of paper guide plate 214. The cable 187 passes from the mounting bracket 196 of paper guide plate 214 over a second dual pulley 186 positioned at the end of paper guide slot 215 and is connected to the mounting bracket 196 of paper guide plate 216.

Paper guide plates 191 and 192 of the document return conveyor and stacker apparatus are slidably mounted on a single shaft 190. The cable 187 passes from the mounting bracket of guide plate 192 over a dual pulley 186 connected to side frame plate 220 and is connected to the mounting bracket of guide plate 191. The cable 187 passes from the mounting bracket of guide plate 191 over a dual pulley 186 connected to side frame plate 222 and is connected to the mounting bracket of guide plate 192.

The two sets of paper guide plates, 214 and 216, and 191 and 192, are then interconnected by cable 187 connected to the mounting bracket 196 of paper guide plate 214, passing over dual pulley 186 at the end of paper guide slot 217, over single pulley 186 on pivot shaft 211, over dual pulley 186 connected to side frame plate 220 and is connected to the mounting bracket of guide plate 192. The cable 187 passes from the mounting bracket of guide plate 192 over dual pulley 186 connected to side frame plate 222, over single pulley 186 on pivot shaft 211, over dual pulley 186 at the end of paper guide slot 215 and is connected to the mounting bracket 196 of guide plate 214. This arrangement provides a continuous cable arrangement between the interconnected parts whereby lateral displacement of any one of the paper guide plates effects a corresponding complementary displacement of the remainder independent of the position of document support tray 210. Thus, positioning of the paper guide plates 214 and 216, of the feeder-separator apparatus likewise effects a corresponding positioning of the paper guide plates 191 and 192 of the return conveyor and stacking apparatus.

An additional guide plate 218, is pivotally movable from a first position coextensive with the upper surface of document support tray 210 to a second upstanding position via pivot shaft 219. Guide plate 218 is utilized in conjunction with certain types of special purpose cards and documents wherein it is desirable that the input documents assume an alignment not obtainable with guide plates 214 and 216.

As best seen in FIGS. 8 and 9, an air motor 234 is connected to side frame plate 222 for adjustably positioning document support tray 210. Air motor 234 is of a type generally well known in the art having a piston therein connected to piston rod 235 and normally biased to the position illustrated in FIG. 9. An air supply line 242 from a suitable air supply source is connected to air motor 234 via bleed valve 244. A pair of cables 231 are connected at one of the ends thereof to piston drive shaft 235. The cables 231 are connected at the other ends thereof to the document support tray 210 by the U-shaped connectors 233. A plurality of pulleys 232 over which the cables pass define paths which the cables follow. The cables 231 pass firstly over a pair of juxtapositioned pulleys 232 connected to air motor 234, thence over a second pair of juxtapositioned pulleys 232 connected to side frame plate 222, thence over a third pair of juxtapositioned pulleys 232 connected at the top of side frame plate 222. One of the cables 231 is connected to the U-shaped connector 233 along side frame plate 222 and the other cable 231 follows over a plurality of single pulleys 232 connected to cross frame casting 206 and thence is connected to the other U-shaped connector 233 along side frame plate 220. Thus, from this arrangement, it may be seen that as air pressure is supplied to the piston of air motor 234 the piston and piston drive shaft 235 are driven to the left as viewed in FIG. 9. This dipslacement, yields a corresponding displacement of the cables along their defined paths of travel which in turn pivots document support tray 210 clockwise about pivot shaft 211 as viewed in FIG. 7. By controlling the air pressure supplied to air motor 234 through bleed valve 244, the displacement of piston drive rod 235 and hence the position of document support tray 210 may be adjustably controlled.

Referring now to FIGS. 6 and 8, a first drive shaft 257 is rotatably mounted in side frame plate 220 by suitable bearing means. An electromagnetically actuated clutch and brake assembly 230, having a drive sprocket 229 connected thereto is mounted on shaft 257 for intermittent rotation thereof. An AC motor, MOT1, is connected to side frame plate 220 and provides continuous rotation to drive sprocket 225 via gear reduction assembly 224. A flexible drive chain 226 connects drive sprocket 225 with clutch drive sprocket 229 and passes over a pair of idler sprockets 227 and 228 rotatably mounted on side frame plate 220.

A main drive shaft 256 is rotatably mounted at one end thereof in side frame plate 222, and at the other end thereof is connected to shaft 257 via coupling 258. Main drive shaft 256 is additionally rotatably mounted via a suitable bearing arrangement in casting 207 which is connected to cross frame casting 206 and depending therefrom. An idler shaft 255 is mounted in casting 207 parallel to shaft 256 and spaced therefrom. Idler shaft 255 is held against axial and angular displacement thereof with respect to casting 207 via set screws or other suitable fastening means in casting 207.

A separator drive pulley 213 is centrally located between side frame frames 220 and 222 on main drive shaft 256. Separator drive pulley 213 is connected to main drive shaft 256 via a one-way overriding drive clutch of a type generally well known in the art. A pair of cylindrical members 263 having a circumferential groove therein are mounted on main drive shaft 256, via suitable bearing arrangements, one at either side of separator drive pulley 213. Cylindrical members 263 are spaced from the hub of separator drive pulley 213 via suitable spacers and are held against axial displacement along shaft 256 via snap rings or other suitable fasteners. A separator idler pulley 253 is rotatably mounted on idler shaft 255 and held in alignment with separator drive pulley 213 via snap rings or other suitable fasteners.

A flexible separator feed belt 260, formed from a material having a high coefficient of friction is connected between side frame plates 220 and 222 on main drive shaft pulley 253. The separator feed belt 260 at the inner surface thereof has a longitudinal tang portion or projection 198 which is received by a corresponding mating arrangement in separator drive pulley 213 and separator idler pulley 253. Separator feed belt 260 at the outer surface thereof has a plurality of longitudinally spaced transverse grooves therein, the purpose of which will hereinafter be more fully explained. The circumferential area of the flanges 199 on separator drive pulley 213 are formed from a material having a high coefficient of friction corresponding to that of separator feed belt 260 and are coplanar with the outer circumference of separator feed belt 260 on separator drive pulley 213.

A nudger or feed wheel 250 formed from a material having a high coefficient of friction is rotatably mounted on stub shaft 248 which in turn is connected to lever arm 246. Lever arm 246 is connected to a bearing assembly 249 which is rotatable with respect to shaft 255. Bearing assembly 249 is axially positioned along shaft 255 intermediate casting 207 and separator idler pulley 253 by suitable spacer means so as to align feed wheel 250 with separator feed belt 260. A feed wheel pulley 251 is connected to the hub portion of feed or nudger wheel 250 and rotates therewith on stub shaft 248. A feed wheel drive pulley 254 connected to separator idler pulley 253 is connected to feed wheel pulley 251 by drive belt 252.

It should be particularly noted that the parameters of the drive train from motor MOT1 to feed or nudger wheel 250, have been so chosen as to provide an angular surface velocity of feed wheel 250 of approximately four inches per seconds, and an angular surface velocity of separator feed belt 260 of approximately 14 inches per second. This is done primarly to provide low acceleration to the sheets as they are advanced from the stack by nudger or feed wheel 250 and higher acceleration to the sheets as they pass through the separator area. By applying an initial low acceleration to a sheet in the stack, in many instances only a single sheet is advanced by the nudger wheel 250 to the separator area.

Two pairs of paper guide drive pulleys 264 are connected to drive shaft 256 via set screws or other suitable fastening means, one pair being axially positioned along shaft 256 in a spaced relationship between the separator assembly and side frame plate 220, and the other pair being axially positioned in spaced relationship along shaft 256 between the separator assembly and side frame plate 222. A plurality of paper guide idler pulleys 265 are rotatably mounted on shaft 255 via suitable bearing means and are held in alignment with paper guide drive pulleys 264 via snap rings in shaft 255 or other suitable fastening means. Paper guide drive belts 266 are connected between paper guide drive pulleys 264 and paper guide idler pulleys 265. Paper guide drive belts 266 thus provide an overhead guide path on either lateral side of the separator feed belt 260, moving in the direction of feed.

A feed wheel housing 241 encloses the feed wheel assembly from above and is connected to cross frame casting 206 via screws or other suitable fastening means. A control lever 262 is pivotally mounted within housing 241 via pivot pin 261. A pin 259 connected to lever arm 246 intermediate bearing 249 and stub shaft 248 is received by a slot in control arm 262. Air bleed valve 244 is mounted in casting 207 and is of the type which is rotatable to regulate the flow of air through the valve. A bleed valve actuator rod 243 connected to bleed valve 244 extends therefrom into interfering relationship with pivot pin 259 in lever arm 246 and is normally biased into contact therewith. Control knob 240, which is mounted on housing 241, is connected to lever engaging member 289 and is normally biased upwardly as viewed in FIG. 7 by spring 290. Lever engaging member 289 engages control arm 262 when control knob 240 is actuated, thus pivoting control arm 262 about pivot pin 261, nudger wheel 250 about shaft 255, and bleed valve actuator rod 243.

A pair of wire rod members 238 are formed at one end thereof into a generally U-shaped spring arrangement and are received by the circumferential grooves in cylindrical members 263. Wire rod members 238 extend from cylindrical members 263 toward document support tray 210, around nudger wheel 250, and extend upwardly into housing 241. Wire rod members 238 are spaced from each other on either side of feed wheel 250 and document support member 212. A magnetically actuated reed switch SW6 mounted within housing 241 is adapted for actuation thereof by a magnet 237 connected to the upper end of one of the wire rod members 238. With sheets on document support tray 210 and in contact with nudger wheel 250, magnet 237 is positioned out of contact with switch SW6. With no sheets on document support tray 210, magnet 237 is in contact with switch SW6 since wire rod members 238 are free to contact the surface of the document support tray.

Figure 7:
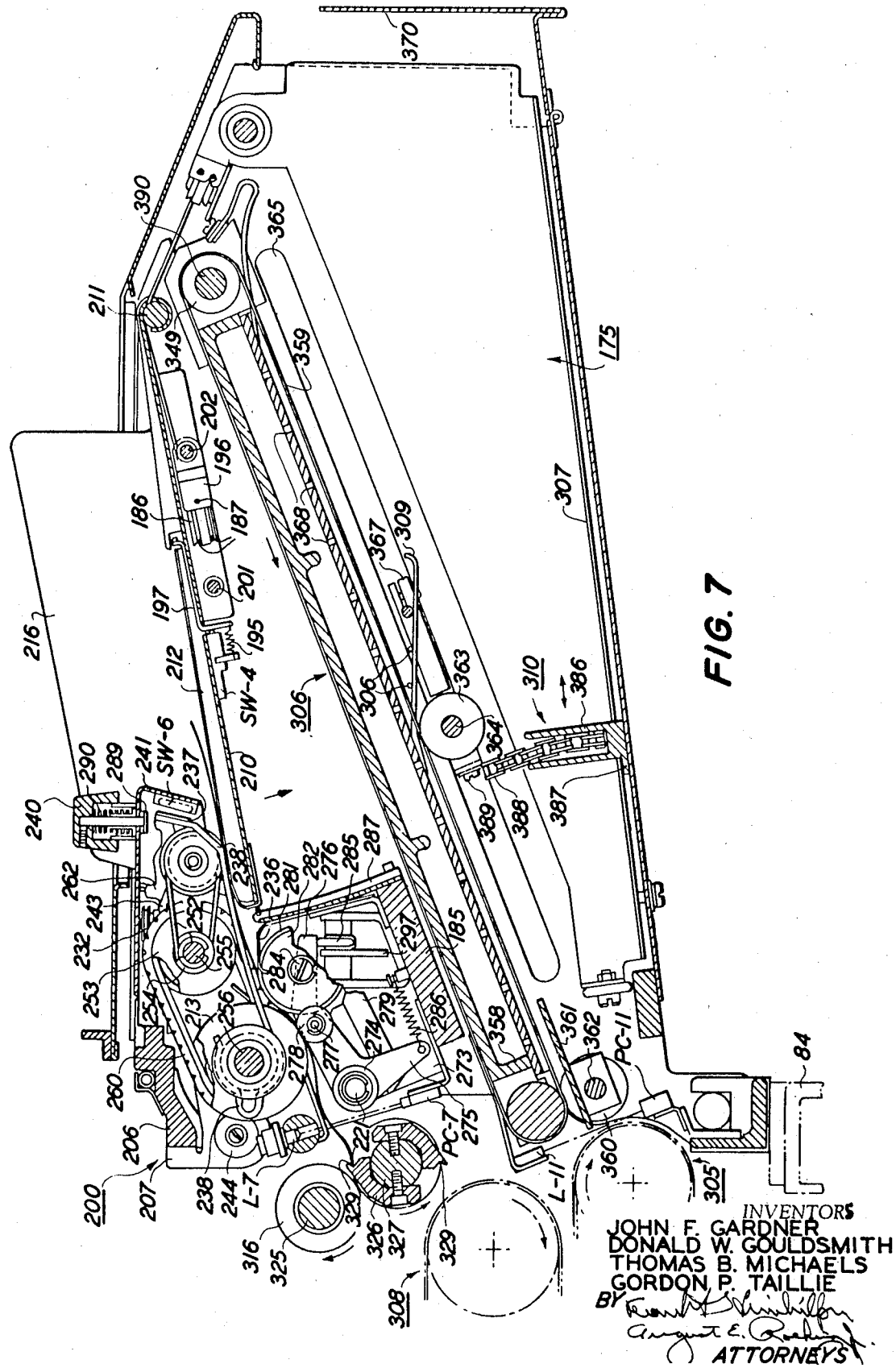
FIG. 7 is a sectional view taken along lines 7—7 of FIG. 6, showing the document feeding and separating apparatus.
Figure 11:
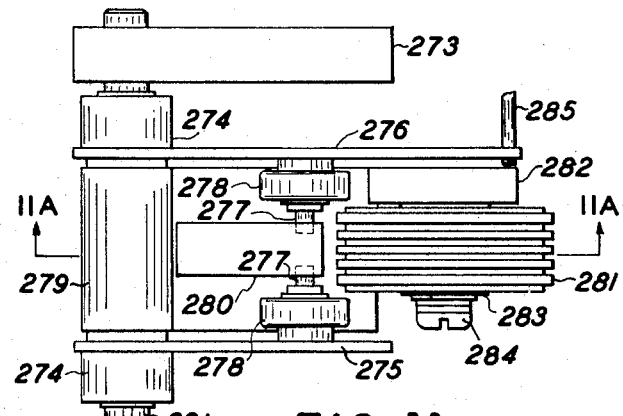
FIG. 11 is a top plan view of a portion of the document feeding and separating apparatus.
Figure 11A:
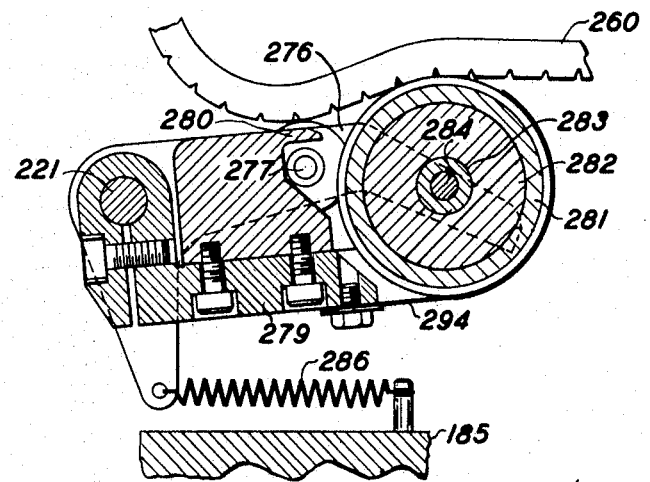
FIG. 11a is a sectional view taken along lines 11a—11a of FIG. 11.

Referring now to FIGS. 6, 7, and 11, a support plate 185 extends transversely between side frame plates 220 and 222 and is connected thereto by screws or other suitable fastening means. A shaft 221 extending parallel to support plate 185 is rotatably mounted a one end thereof through side frame plate 222 via suitable bearing means, and at the other end thereof in a bearing block 273 connected to support plate 185. A support member 279 having an upstanding side portion at one end thereof and a bifurcated offset shaft receiving portion at the other end thereof is connected to shaft 221 via bolts or other suitable means extending through the bifurcated portion into support member 279. A retarding roll or abutment member 282 is supported on the upstanding side portion of support member 279 by a one-way clutch and connecting bolt 284. The one-way clutch unit which is connected to support member 279 is of a type which is generally well known and permits abutment member 282 to be rotated in the clockwise direction as viewed in FIG. 7, but prevents rotation of abutment member 282 in the counterclockwise direction. A friction member 281 formed of a resilient material having a lower coefficient of friction than that of separator feed belt 260, is mounted on retarding roll or abutment member 282 in alignment and engageable with separator feed belt 260.

A pair of crank members 275 and 276 are connected to bearings 274 and are pivotally mounted on shaft 221 at either side of support member 279. A pair of idler rolls 278 having a low coefficient of friction are rotatably mounted on crank members 275 and 276 via stub shafts 277 and are engageable with the flange portions 199 of separator drive pulley 213. Crank member 276 has one arm slightly longer than that of crank member 275, the purpose of which will hereinafter be more fully explained. An idler roll retracting member 280 connected to support member 279 centrally between crank members 275 and 276 has a projection which is engagable with idler stub shafts 277 as shaft 221 is rotated clockwise as viewed in FIG. 8. A pair of springs 286 connected between crank members 275 and 276 and a pair of pins in support member 185 normally bias idler rolls 278 into positive engagement with the flanges 199 on separator drive pulley 213. A shroud 294 connected to support member 279 extends around the periphery of abutment member 282 to provide a sliding surface into the separator throat. A pair of guide members 236 connected to abutment plate 287 on either side of retarding roll or abutment member 282 extend along the sheet feed path toward the separator to likewise guide advanced documents into the throat. On the exit side of the throat, idler rolls 278 and crank members 275 and 276 provide a guide path over which the advanced sheets follow. At either side of crank members 275 and 276 guide plates 292 and 293 extend toward side frame plates 220 and 222, respectively, to guide advanced documents from abutment plate 87 along the sheet feed path in cooperation with the overhead advancing guide belts 266.

With reference to FIG. 9, a control lever 239 which extends through the top panel of the desk-console is pivotally mounted on side frame plate 222 via pivot 269 and mounting bracket 291. A sector gear 270 on lever 239 meshes with a pinion 247 rotatably mounted on side frame plate 222 via shaft 245. A disc member 271 connetced to pinion 247 carries a crank pin 272 at the periphery thereof. A crank arm 23 is connected at one end thereof to shaft 221 and at the other end thereof to crank pin 272 via slot 194. A spring detent 288 connected to side frame plate 222 is received by a notch in disc member 271 for normally holding disc 271 to that rotative position. A switch SW5. As shaft 221 is driven clockwise, support positioned to be actuated by crank lever 223.

Thus it may be seen as control lever 239 is pivoted clockwise about pivot 269 from the normal position, disc member 271 is driven clockwise overriding the detent action of spring 288. As disc member 271 rotates clockwise pin 272 drives crank lever 223 and shaft 221 clockwise, thus effecting a change in position in the actuator of switch SW5. As shaft 21 is driven clockwise, support member 279 retracts retarding roll or abutment member 282 from its normal position in substantial engagement with separator feed belt 260 to a disengaged position. As the abutment member 282 is retracted from its normal position, idler roll retractor member 280 likewise retracts idler rolls 278 from engagement with separator drive pulley 213.

With reference to FIGS. 7 and 13, a shaft 325, spaced in the direction of feed from separator drive pulley 213 is rotatably journaled in a pair of side frames 328 and has a plurality of axially spaced friction roll members 316 connected thereto. A second shaft 327, rotatably journaled in side frames 328 and parallelly spaced from shaft 325 has connected to one end thereof a dual lobe switch actuating cam 399. A switch SW7 is connected to side frame 328 and positioned to be actuated by cam 399.

A plurality of sheet interrupting or sheet engaging members 326 having notched projections 329 thereon are connected to shaft 327 in axial alignment with and extend into the spaces formed between axially adjacent friction roll members 316 on shaft 325. The sheet interrupting members 326 are angularly spaced about shaft 327 in accordance with the spacing between the lobes on cam 399 and may be collectively referred to as a sheet registration gate or sheet interrupting means.

A plurality of idler roll members 330 are rotatably mounted on shaft 327 alternately spaced with sheet interrupting members 326 and contact friction roll members 316 on shaft 325 to be driven thereby independent of the rotation of shaft 327.

A third shaft 320, rotatably journaled between side frames 328, is driven by a sprocket 318 connected thereto and a flexible chain drive from the main drive system of the xerographic machine. A gear 319 connected with sprocket 318 meshes with gear 332 on shaft 325 to drive friction roll members 316 and hence idler roll members 330. An electromagnetically actuated indexing clutch 321 on shaft 320 selectively transmits power to position shaft 327 and hence sheet interrupter members 326 via gear 322 on the output drive of clutch 321, idler gear 323 on shaft 325, and drive gear 324 connected to shaft 327.

Thus, it may be seen that friction roll members 316 and idler roll members 330 in effect form a continuously rotating pinch roll arrangement for advancing sheets received by the bite formed between the respective rolls. The sheet interrupting means or registration gate assembly is indexed to a first position in response to an electrical signal to clutch 321 interrupting the advancement of the leading edge of a sheet which forms a hump or buckle in the sheet, and to a second position which releases an engaged sheet into the bite of the pinch roll arrangement. It will be appreciated that a plurality of the sheet engaging members 326 have been illustrated which are angularly spaced about shaft 327 to minimize rotation of shaft 327 between the respective indexed positions.

A pair of photocells PC7 are positioned between shaft 221 and shaft 327 at one side of the sheet feed path by a mounting bracket connected to support plate 185. A complementary pair of light sources L7 are positioned between shaft 325 and shaft 256 at the side of the sheet feed path opposite photocells PC7, and are connected to casting 207 in optical alignment with their respective photocells. Photocells PC7 and light sources L7 form a part of the sensing apparatus for indexing the sheet interrupting means previously described. The dual arrangement has proven effective in the event that one portion of an advanced sheet has a mutilated leading edge and would not otherwise interrupt the light beam at the proper position.

Figure 10:
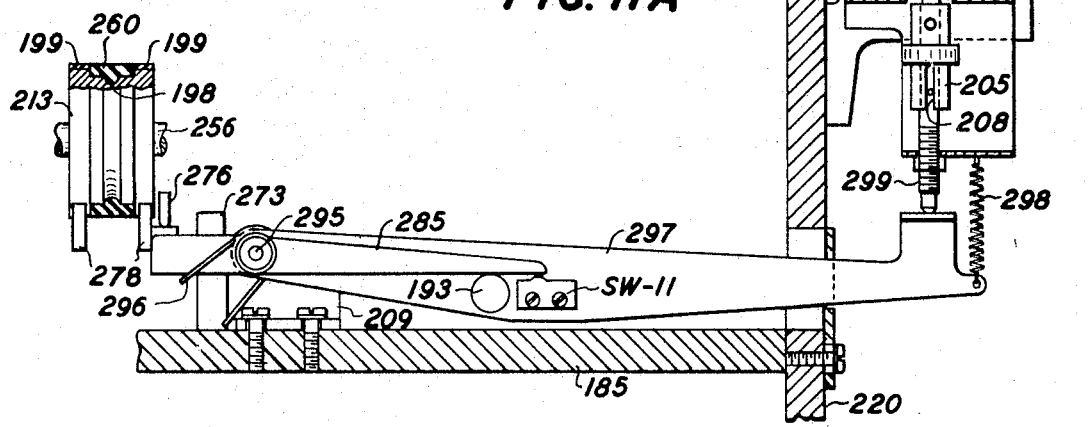
FIG. 10 illustrates an apparatus for use in cooperative relationship with the document feeder for inhibiting the release of the document to the automatic xerographic reproducing machine in the event that a malfunction occurs in the feeding and separating apparatus.

FIG. 10 illustrates apparatus for detecting a malfunction in the feeder-separator device. As shown therein, a support bracket 209 is connected to support plate 185 adjacent bearing block 273. A first lever arm 297 pivotally mounted at one end thereof about pivot shaft 295 extends through side frame plate 220 in opening 268. A second lever arm 285 is pivotally mounted about pivot shaft 295 with one end being engageable with the longer lever arm of crank member 276 and with the other end in engagement with a positive stop member 193 and the actuator of a switch SW11 connected to lever arm 297. A torsion spring 296 positioned about pivot 295 has one end thereof in engagement with lever arm 285 and the other end thereof in engagement with support bracket 209. Spring 296 thus normally biases lever arm 285 in a clockwise direction about pivot shaft 295 into engagement with positive stop member 193. An adjusting screw 299 is connected to support bracket 267 and is engageable with the end of lever arm 297 projecting through side frame plate 220. A spring 298 connected between support bracket 267 and lever arm 297 biases lever arm 297 into engagement with adjusting screw 299 in opposition to the force exerted by torsion spring 296.

An adjusting knob 204 projecting above the top panel of the desk-console is connected to an annular collar member 205 via shaft 189. An axial slot in collar member 205 receives a pin 208 connected to adjusting screw 299 for providing positive rotation of adjusting screw 299 by rotating knob 204 and at the same time permitting axial displacement therein.

From this arrangement adjusting knob 204 may be sent to permit a predetermined amount of displacement of idler roll 278 as advancing sheets pass between idler roll 278 and the flange 199 on separator drive pulley 213 without actuating lever arm 285 and switch SW11. However, in the event that idler roll 278 is displaced more than the predetermined amount by the passage of more than a single sheet or the passage of a wrinkled or crumpled sheet, switch SW11 will be actuated thereby. If switch SW11 has been thus actuated the sheet interrupting means previously described will not release the document or documents to the continuously rotating friction rolls 316 and idler rolls 330.

Reference will now be made to the logic circuitry of FIG. 34 which provides the necessary control over the document feeder and transport system of the xerographic machine.

The document feeder brake is activated by a high level signal at output terminal T12 in FIG. 34. The level of this signal is determined directly from the conditions of the three inputs to OR gate G16.

One of these conditions is a print or stop print condition of the xerographic machine which is indicated to the circuit of FIG. 34 through input terminal T16 which is directly connected as one input to OR gate G16. In the stop print condition the signal present at this input terminal T16 is at a high level, while in the print condition this signal is at a low level.

A second input to OR gate G16 is derived directly from the output of AND gate G20. The condition of this signal will be described in detail hereinafter.

The last or third input to OR gate G16 is derived initially from either the output of AND gate G22 or from one of three switches.

The first switch SW4 is a carrier switch referred to earlier in connection with FIG. 7 and is in its position as shown in FIG. 34 during the automatic operation of the apparatus. If the operator elects to feed documents to the apparatus manually then a carrier of transparent material may be employed to support the document to be copied. This carried when the trailing edge is inserted in the switch actuator on the support tray will open the carrier switch SW4.

The second switch, manual-automatic switch SW5, is shown in its normally opened position when the machine is operating in an automatic mode. The switch is mechanically linked to the manual/automatic control previously alluded to in connection with FIG. 9.

The third switch, a document feed switch SW6, is as shown in FIG. 34 in its normally opened condition indicative of the fact that there are documents in the document support tray. This switch was described earlier in connection with FIG. 7.

For purposes of this example, the manual/automatic switch SW5 is in its opened condition and the document feed switch SW6 is also in an opened condition as illustrated in FIG. 34. The carrier switch SW4 is closed connecting a source of low voltage applied at terminal T18 through a suitable resistor R6 directly to OR gate G16.

AND gate G22 has one input connected through an input inverter to the junction between delay circuit DC6 and the input inverter associated with AND gate G24. The signal from this junction represents the output from OR gate G26, which monitors the output of the two photocells PC7 coupled to the input terminals T20 and T22 previously referred to in connection with FIG. 7.

These two photocells function to detect the lead edge of a document as it leaves the document feeder moving toward the feed rollers 316 and 330. In order to so function, the photocells PC7 and their respective light sources L7 are positioned intermediate the document feeder and the feed rollers 316 and 330. Two spaced apart photocells are utilized instead of one photocell in this situation to insure accurate lead edge detection even in the case of a mutilated document having an irregular and discontinuous lead edge.

When no document is detected, the output at this junction is a low level signal which serves to enable this input of AND gate G22 after being inverted by the input inverter.

The other input to AND gate G22 through an input inverter is from a document gate switch SW7 which is cam operated to indicate the position of the document gate. When this switch is closed, as illustrated in FIG. 34, the document gate is up to obstruct the passage of a document from the document feeder toward the exposure transport system of the xerographic machine. If the document gate switch SW7 is open, then the document gate is down or released to permit the passage of a document from the document feeder through the feed rollers to the exposure transport system. As illustrated, a high level signal is applied to the input inverter associated with AND gate G22 which is connected to the arm of the document gate switch SW7.

The combination of a high level signal from the document gate switch SW7 and a low level signal from the delay circuit DC6 when no document is detected by photocells PC7 provide a low level signal at the output of AND gate G22, which is supplied directly as an input to OR gate G16.

The input to OR gate G16 from AND gate G20 is determined by four signal conditions. The first three of these signal conditions are monitored by AND gate G18, the output of which is a direct input to AND gate G20. These will now be described.

One signal condition is print or stop print condition, the former being a low level signal while the latter is a high level signal.

A second condition is the state of carrier switch SW4 which, in its normally closed condition for automatic operation, is represented by a low level signal also.

The third signal condition at the input of the AND gate G18 is the condition of flip-flop FF16, the zero output of which is connected to AND gate G18. This flip-flop is initially in a set condition as a result of a signal at input terminal T1 when the apparatus is first energized by the operator. In this set condition a low level signal is connected to the input inverter associated with AND gate G18. The set input of flip-flop FF16 is connected to the output of OR gate G26. The reset input of this flip-flop is connected via an inverter INV1 to the zero output of flip-flop FF3. When the xerographic machine is first energized, this flip-flop FF3 is placed in a reset condition providing a high level signal at its zero output and a low level signal at its one output. In this condition, the signal from the zero output of flip-flop FF3 does not affect the initial set condition of flip-flop FF16.

The fourth signal condition monitored by AND gate G20 is derived from the output of delay circuit DC6. Initially, photocells PC7 will not detect a document passing through the document feeder since the apparatus has just been activated and the output of OR gate G26 and delay circuit DC6 will be at a low level.

Prior to the depression of a print push button on the control panel, OR gate G16 will have as inputs two low level conditions derived from the output of AND gate G18 and AND gate G22. A high level signal is supplied to OR gate G16 from terminal T16. This high level signal is passed by OR gate G16 to terminal T12 to energize the document feeder brake. After the operator has placed the documents and card stock in their respective feeders, and the print push button is depressed, this high level signal at terminal G16 is removed thereby deenergizing the document feeder brake and initiating feeding of the first document into the apparatus.

With the document feeder feeding the first document after depression of the print button by the operator, this first document advances so as to interrupt the light incident upon either of the photocells PC7 referred to previously in the description of FIG. 7. As the lead edge of the first document feed interrupts this light path, the output of NOR gate G26 goes to a high level condition. This low-high level transition is delayed by delay circuit DC6 connected to the output of NOR gate G26. After the expiration of this delay the output of delay circuit DC6 goes to a high level condition thereby enabling its respective input to AND gate G20. In addition, AND gate G22 is disabled long with AND gate G24 via the input inverters associated with these AND gates.

It is noted that this low-high level transition does not affect the condition of flip-flop FF16 since it is already in a set condition.

The enabling of AND gate G20 provides a high level signal at terminal T12 via OR gate T16 to energize once again the document feeder brake after the time period of delay circuit DC6.

As was noted previously, document gate switch SW7 was in a condition indicative of the fact that the document gate was thwarting passage of any document from the document feeder to the transport system. Therefore, due to the spacing of the photocells PC7 relative to the document feeder and the document gate along with the time delay provided by the delay circuit DC6, the document feeder is permitted to run long enough to effect a buckle or warped condition in the first document fed through the document feeder. This occurs since this document abuts the document gate while the document feeder continues momentarily its feeding operation. However after the aforementioned time interval designed into delay circuit DC6, has elapsed, the document feeder brake is energized and the feeder is stopped.

When the output of AND gate G20 goes to a high level, a low-high level transistion is provided at the input of the delay circuit DC10 and is delayed for a specified period of time necessary to insure that from the initiation of the document feeder the first document has in fact been buckled at the registration gate. After the lapse of the delay provided by delay circuit DC10 the input of AND gate G28 connected to the output of delay circuit DC10 is enabled. The enabling of AND gate G28 is delayed also to insure that a slot in the transport belt will not be sensed until a document is buckled at the document registration gate.

The next event is the detection of a slot in the highly reflective surface of the document transport belt 305. When this slot is detected by slot sense photocell PC9, a low-to-high level transition is provided at input terminal T26 which is connected to the input of delay circuit DC12 which delays this transition. The delay of circuit DC12 is utilized to insure that the document gate will not be released until the slot is in such a position as to permit the advancing document to bisect the slot rather than completely cover it.

The amount of delay afforded by delay circuit DC12 of the slot sense signal will be dependent in part upon the exact position of the slot when it is sensed by the photocell relative to the speed of the transport belt as will become more apparent hereafter.

After the elapse of the delay of circuit DC12, one input to AND gate G27 is enabled. The other input to this gate is connected via an input inverter to terminal T14. The signal supplied to this terminal originates from the double feed or malfunction detector switch SW11 which is actuated by the malfunction detector mechanism previously described in connection with FIG. 6. This signal will be at a low level in the absence of the detection of a malfunction thereby enabling AND gate G27.

With the enabling of AND gate G27, AND gate G28 is enabled to generate a setting signal to the set input of flip-flop FF3. When the flip-flop goes into a set condition the zero output goes to a low level which is inverted by inverter INV1 to afford a resetting pulse to flip-flop FF16, thereby disabling AND gate G18 connected to this output of flip-flop FF16 via an input inverter.

The disabling of AND gate G18 disables AND gate G20 to return the output of this gate to a low signal level. This, in turn, provides a low level signal at output terminal T12 via OR gate G16 to release the document feeder brake and commence operation of the feeder.

With flip-flop FF3 now in a set condition, the low-high level transition in its one output is delayed by delay circuit DC14 to provide a pulse at output terminal T28 of OR gate G32 having a duration equal to the delay period circuit DC14. This delay typically may be 13 milliseconds. This pulse is passed by AND gate G30 which has one input connected via an input inverter to the output of delay circuit DC14 and another input connected through a similar input inverter to the zero side of flip-flop FF3. This pulse generated at output terminal T28 will effect the release of the document held in buckled configuration by the document gate by energizing the document gate solenoid which is coupled to output terminal T28.

With the release of the document gate, the document gate switch SW7 is now in an opened condition providing a low level signal to the input inverter associated with AND gate G22 and G24. This effectively enables the respective inputs of these AND gates.

The document gate having been released to permit the document it was holding to enter the bite between the feed rollers, the document now continues under the influence of the feeder and feed rollers 316 and 330 referred to previously in connection with the description of FIGS. 7 and 13. The document proceeds onto the exposure transport belt in such a manner that its lead edge bisects the area of a slot in the transport belt.

As the document advances onto the document transport system, the trailing edge of this document will pass over photocell PC7 and thereby re-establish light incident on the photocells. This will immediately provide a low level signal at the output of NOR gate G26 which will enable AND gate G22 and G24 providing a high level signal at the output of each of these AND gates.

The high level signal at the output of AND gate G22 will be passed by OR gate G16 to output terminal T12 energizing the document feeder brake and terminating the operation of the feeder.

The enabling of AND gate G24 will provide a low-high level transition at the input of delay circuit DC16 which will delay this transition for a predetermined period of time, for example, 57 milliseconds. After this elapse of time, a high level signal will be translated by OR gate to output terminal T28 reinstating the document registration gate in its initial position to abut the next document fed from the document feeder. The amount of this delay afforded by delay circuit DC16 is dictated by the amount of time required to move the trailing edge of the document from immediately above photocells PC7 to a position where it is clear of the document gate to insure that the document gate, when reinstated, does not damage the document.

With the document gate reinstated, document gate switch SW7 once again disables AND gate G22 and G24 terminating the high level signals at output terminal T28 as well as once again providing a low level signal at the output of AND gate G22 which is translated to OR gate G16.

Since OR gate G16 has at its input only low level signals, the feeder is once again energized through the release of the document feeder brake.

The status of the circuitry of FIG. 34 is such now as to have photocells PC7 exposed to light, the document gate switch is again closed as illustrated in FIG. 34, the slot sense photocell is detecting the reflections from the surface of the document transport belt, and the feeder has commenced the second document from the document support tray. This document will continue to be fed until it interrupts the light incident upon either of photocells PC7 whereby the stopping of the feeder as outlined above will be repeated with the exception that flip-flop FF16 which was in its reset condition will be set upon the detection by photocells PC7 of the lead edge of the second document.

This second document will maintain its buckled condition against the document registration gate until such time as the slot sense photocell detects the slot in the document transport belt when the document transport belt is moving.

As the document is deposited on the exposure transport belt 308 by feed rollers 316 and 330, the document is electrostatically tacked to the transport belt and moves into the exposure zone. A slow photocell PC3 in the exposure zone detects the lead edge of the document through the slot and the change from light to dark generates a signal at input terminal T6 which enables one input of AND gate G34. The other input of this AND gate, as well as one input of AND gate G36, is connected to the one output of flip-flop FF3 and, while this flip-flop is in a set condition, is enabled. Therefore, the signal indicative of the passage of the lead edge covering a portion of the slot in the exposure transport belt past slow photocell PC3 set flip-flop FF4 disengaging the high speed exposure transport clutch connected to output terminal T24.

The enabling of AND gates G34 and G36 with the set condition of flip-flop FF3 insures that the slow photocell will only be able to slow down the speed of the document transport when a document is actually on the transport as signified by the set condition of flip-flop FF3. Otherwise, the slow photocell will detect the trailing edge of the slot in belt 308 and slow the transport belt even if a document is not on the belt.

It should be noted that the delay circuit DC8 in the zero output circuit of flip-flop FF4 does not delay this negative-going signal since this delay is effective only in regards to a positive-going signal.

When this occurs, the exposure transport speed will be reduced from a relatively high speed to a slower speed under the influence of the slow speed clutch connected to output terminal T25 associated with flip-flop FF5. The lead edge of the document bisecting the slot continues now at a slower speed in the exposure zone and approaches a stop photocell PC4.

Immediately upon the detection by the stop photocell PC4 of the lead edge of the document bisecting the slot, a signal is generated at input terminal T8 which enables a respective input of AND gate G36 to effect the setting of flip-flop FF5. Upon the placing of flip-flop FF5 in its set condition, the slow speed clutch connected to output terminal T25 is deenergized and the exposure transport brake energized thereby stopping the exposure transport with the document now properly registered in the exposure zone. Also coincident with the setting of flip-flop FF5 is the resetting of flip-flop FF3, the reset input side of which is connected to the zero output of flip-flip FF5 via inverter INV2. The resetting of flip-flop FF3 inhibits AND gates G34 and G36 and maintains the output of OR gate G32 at a low level.

From the preceding description of the slot sensor circuitry and the document feeder control, the interrelationship between the delay of circuit DC12, the position of slot sense photocell, the speed of the exposure transport belt 308, the output of the pinch rollers, and the conveying speed of the pinch rollers are all of some criticality. Each individual factor may be altered only with a compensating adjustment in one or more of the other factors.

With these factors being carefully selected, upon release of the document by the document gate the pinch or feed rollers will convey the document onto the transport belt in such a manner that the belt slot will be bisected by the lead edge of the document. This relationship must be achieved in order to obtain high quality images of the subject documents.

To feed documents into the xerographic machine for processing in the manual mode, abutment member 282 is retracted from its normally engaged position by positioning lever 239 as previously described. In the retracted position, a document may be manually inserted through the separator area via a transparent document carrier to contact the sheet registration gate 326. The trailing edge of the document or carrier is then inserted to contact switch actuator 197 of carrier switch SW4 to enable the gate release circuit previously described. By inserting the trailing edge of the document or document carrier into the switch actuator 197, a hump or buckle is formed in the sheet which forces the sheet into friction feed rolls 316 and 330 upon release of sheet registration gate 326. With a document thus in place, registration gate 326 is released in response to a signal from the logic circuit as previously described.

To feed documents into the xerographic machine for processing in the automatic mode, paper guide plates 214 and 216 are laterally positioned on document support tray 210 to receive the stack, or if certain types of cards are being processed, guide plate 218 is raised to its upstanding position.

Depression of control knob 240 through the actuator linkage connected to bleed valve 244 and nudger wheel lever arm 243 pivots the nudger wheel assembly in the counterclockwise direction about shaft 255 and rotates bleed valve 244 to release the air pressure acting against the piston in air motor 234. As the air pressure is released from air motor 234, document support tray 210 is lowered from its raised position as illustrated in FIG. 7 to a lowered position engaging a projection on abutment plate 287. The stack of documents is then positioned on the document support tray 210 over document support rib 212 with the leading edges of the stack contacting abutment plate 287.

After positioning the stack of documents on document support tray 210, control knob 240 is released lowering the nudger wheel assembly from its raised position and rotating bleed valve 244 to again supply air pressure to air motor 234. As air is supplied to air motor 234, the document support tray 210 is elevated to a position wherein the uppermost sheet in the stack of documents contacts nudger wheel 250. The document support tray 210 and the stack of documents thereon continue to rise as viewed in FIG. 7, raising the nudger wheel assembly therewith and bleed valve actuator rod 243 thereby rotating bleed valve 244. As bleed valve 244 is rotated, the pressure acting on air motor 234 is decreased until a point of equilibrium is achieved with the nudger wheel 250 resting on the uppermost sheet in the stack. In this position wire rod guide members 238 are supported by the uppermost sheet in the stack, having been pivoted counterclockwise about shaft 256 to a position wherein magnet member 237 is no longer in contact with magnetically actuated document feed switch SW6 thus conditioning the logic circuitry as previously described.

With lever 239 in the automatic feed position the retarding roll or abutment assembly is in substantial engagement with separator feed belt 260 and this position is sensed by manual-automatic switch SW5 also previously described.

With all of the conditions having been satisfied as previously described, a pulse from the control logic of the xerographic machine releases the brake and energizes the clutch of electromagnetically actuated clutch and brake assembly 230 thus rotating shaft 256 in a clockwise direction as viewed in FIG. 7. Shaft 256 drives separator drive pulley 213 via the overriding one-way drive clutch connecting shaft 256 to separator drive pulley 213. As shaft 256 rotates, paper guide drive belts 266 are driven to provide a moving overhead guide for the documents as they are advanced to the sheet registration gate. As separator feed belt 260 is driven by separator drive pulley 213, nudger or feed wheel 250 is thereby driven through the belt and pulley arrangement. In most instances as nudger wheel 250 rotates, only the uppermost sheet in the stack will be advanced into contact with separator feed belt 260 and stationary retarding roll or abutment member 282. In this case the single sheet passes over the lower paper guide members 236 into the throat formed between the separator feed belt 260 and stationary abutment member 282.

Because of the respective coefficients of friction of the separator feed belt 260 and abutment member 282, the tractive forces acting on the single document as it passes into the wrap are such that the separator feed belt 260 advances the sheet over abutment member 282 and into the bite formed between separator drive roll 213 and idler rolls 278 thus providing a positive take-away force acting on the advanced sheet. The transverse longitudinally spaced notches in separator feed belt 260 and the circumferential grooves in the resilient friction member 281 on abutment member 282 substantially enhance the differential tractive forces between the respective members.

With the sheet registration gate 326 indexed to the position as illustrated in FIG. 7, the sheet is advanced toward the gate interrupting the light from light sources L7 impinging upon photocells PC7. The sheet is further advanced into contact with sheet engaging portions 329 of sheet registration gate 326 for a fixed time delay period until a buckle or hump is formed in the advanced sheet. At this point, operation of the feeder separator apparatus is interrupted by a suitable pulse to electromagnetically actuated clutch and brake assembly 230.

Thereafter, in response to a signal received from photocell PC9 associated with the transport apparatus 308, the gate is indexed to the released position allowing the sheet to extend into the bite formed between friction members 316 on shaft 325, and the idler roll members 330 on shaft 327. Responsive to the release of sheet registration gate 326, cam 399 is rotated, actuating document gate switch SW7 which again actuates the feeder separator apparatus for a fixed period of time. This actuation is for the purpose of completing the advancement of a sheet through the separator area while it is being advanced by the rotating feed rolls 316 and 330.

After the trailing edge of the previously advanced sheet passes from the interfering position between light sources L7 and photocells PC7 and a fixed time delay period, sheet registration gate 326 is indexed from its released position to the sheet engaging position and the feeder separator apparatus is again driven to advance another sheet toward the sheet registration gate.

In the event that more than a single sheet is advanced into the separator apparatus by nudger wheel 250, the separating arrangement between separator feed belt 260 and retarding roll or abutment member 282 provides a very effective and efficient separating apparatus for delivering only a single sheet to the sheet registration gate 326. For example, if the top four sheets in a stack adhere together and are advanced to the separator apparatus, they may all four together enter into the throat formed between belt 260 and abutment member 282 and will be separated therein.

It will be appreciated that rather than being centrally located between the axis of shaft 256 and shaft 255, abutment member 282 is spaced closer to shaft 256 in substantial contact with belt member 260, thereby forming a wrap about abutment member 282. At the exit of the separator throat, it will also be appreciated that abutment member 282 is spaced only slightly from separator drive pulley 213, approaching the condition of a positive bite therebetween. This arrangement in the dynamic condition, that is, when belt member 260 is being driven over the surface of abutment member 282, yields a varied distribution of normal forces exerted by the belt member 260 on retarding roll 282. This condition therefore allows a slug or quantity of sheets advanced by the nudger wheel 250, such as the four exemplary sheets, to enter the throat, displacing the belt 260 away from abutment member 282. Because of this deflection, additional normal forces are exerted on the pack of sheets in the warp which causes a deflection of the resilient friction member 281 on abutment member 282 where it is in contact with the lowermost sheet in the pack. As a result of this action and the resiliency of friction member 281, friction member 281 new engages the lead edge of the lowermost sheet in the pack in addition to being in engagement with the lower surface thereof. This, therefore, allows only the upper three sheets to be further advanced in the pack causing a shear between the third and fourth sheets. As the remaining three sheets are advanced the third sheet in the pack then engages friction member 281 in a similar manner which causes a shear between the second and third sheets. This process is repeated until only the uppermost sheet remains in contact with the belt member 260 and friction member 281. When this condition is met the uppermost sheet is therefore free to pass through the throat into contact with the bite formed between separator drive pulley 213 and idler rolls 278 thereby providing a positive take-away force exerted on the single document as it is advanced to the sheet registration gate 326.

It has been found for a wrap angle of approximately 25° a slug of sheets each being 3 mils in thickness and numbering 10 sheets in the slug can be inserted into the separator throat with complete and effective separation without the feeding of more than a single sheet past the exit of the throat. Thus from this arrangement it can be seen that by providing a stationary retarding roll or abutment member such as 282 having a frictional surface thereon which is positioned in substantial contact with a separator feed belt member such as 260 with the abutment member being spaced slightly off center from the axis of rotation of the members driving the separator feed belt, a very effective and highly reliable apparatus for separating stacked sheets is obtained.

EXPOSURE-RETURN TRANSPORTS AND DOCUMENT STACKER

As shown in FIG. 1, the reproduction apparatus includes a document feeder 200 on which is placed documents to be reproduced. Directly beneath the document feeder is a stacker unit generally designated by the reference numberal 175. The documents are fed from feeder 200 onto a transport for flash exposure, and are then returned to the stacker unit where they are accessible to the operator. The document path and the manner in which the documents are conveyed through this path in the apparatus of FIG. 1 may be more clearly seen with reference to FIG. 2.

FIG. 2 presents a sectional view of the document path from a document feeder 200 to a document stacker 175. The feeder may be of any conventional design and, for example, may be of a design as disclosed in copending application Ser. No. 632,793 filed concurrently herewith in the names of T. B. Michaels, K. K. Stange, A. A. Lux. The documents placed in the document feeder 200 are urged toward feed roller 316 by a separator feed belt 260 in the feeder itself. A document registration gate 326 is positioned as shown in FIG. 2 at the output of the feeder to selectively obstruct passage of the document past the feed roller 316. When the document registration gate is down, it is in a position to permit passage of the document past the feed roller. The document is then advanced under an electrostatic tacking device such as a conventional corotron 301 as shown in FIG. 2.

The results of the tacking corotron is to electrostatically adhere the document onto the exposure transport 308 and specifically onto the insulating exposure transport belt 302 which draws the document from the feed roller 316 into an exposure zone which substantially lies between the tacking corotron 301 and a turn-around assembly generally designated by reference numeral 303 located at the other end of the exposure transport.

The document adhering to the surface of the exposure transport belt 302 is then conveyed to an exposure zone at which time the exposure transport belt is stopped and the document is, for example, flash exposed by exposure lamps 420.

After exposure the exposure transport is started again and the document enters the turn-around assembly where a suitable de-tacking device shown as a conventional corotron 304 is employed to neutralize the electrostatic charge which attracts the document to the surface of the exposure transport belt.

The document, still under the influence of the turn-around assembly 303, leaves the turn around area and is now free to be attracted by the suction of a second transport system 305 which employs a vacuum manifold. This transport system, referred to as a return transport, returns the document to a position adjacent the other end of the exposure transport where the document leaves the return transport and is guided into the influence of a third transport system, referred to as the stacker transport, which advances the document into the stacker.

The stacker 175 will receive the document from the stacker transport 306 after stripper fingers 309 urge the advancing document away from the vacuum influence of the stacker transport. As the trailing edge of the document is broken from the vacuum, the document copied will lie face down on the stacker tray 307. The stacker tray itself is inclined so as to permit documents to slide back toward the return transport. This sliding effect is desirable to permit an orderly stack of documents to be formed in the stacker area. However, because of the fact that documents varying in size may be desired to be copied, a backing assembly generally designated by reference numeral 310 is employed to prevent the documents from sliding to the end of the stacker tray remote from the front of the apparatus. This effectively keeps the documents copied in an orderly stack at the front of the stacker tray readily accessible to the operator.

Also illustrated in FIG. 2 is part of the drive chain system for the exposure and return transports as well as feed roller 316 and the registration gate 326. A main drive sprocket wheel 393 is mechanically coupled with a drive chain to idler sprockets 394 and 395 and conveyor roller 351 to provide continuous motive power to the return transport 305. Feed roller 316 is driven by gear 319 coupled via wheel 397 to a sprocket wheel (not shown) which is fixed to the same shaft associated with sprocket wheel 395.

Reference will now be made to FIGS. 12, 13, 14, and 15 which show in detail the exposure and return transports 308 and 305, respectively, in addition to the turn-around assembly 303, feed roller 316, and document registration gate 326.

An endless exposure transport belt 302 is supported and driven by two conveyor rollers 311 and 312 which are mounted on shafts 313 to permit the belt 302 to be driven along a predetermined path. A portion of this predetermined path is directly above the ports 314 in vacuum manifold 315. These ports are present in the portion of the vacuum manifold 315 coextensive with the area of the belt's path referred to as the exposure zone.

The exposure transport belt is formed of an insulating material and has a very reflective surface which is white or optically neutral in appearance. In a position substantially equidistant from the edges of the belt there is an elongated opening or slot 345 having its longer dimension parallel to the edges of the belt. The purpose of this slot will be described hereinafter.

At the input edge of the exposure transport there is located an electrostatic tacking device shown as a conventional corotron 301. This corotron is mounted on a support member 317 which also supports a sprocket wheel 318 fixed to gear 319. Fixed to rotate with gear 319 is a power shaft 320 translating the power applied at sprocket wheel 318 to a solenoid-operated indexing clutch represented generally by reference numeral 321.

The indexing clutch 321 selectively translates power from the power shaft 320 through gear 322 and idler gear 323 to gear 324.

Idler gear 323 may be mounted on bearings to permit shaft 325 to rotate freely or this idler gear may be made of a suitable material, such as nylon, to permit shaft 325 to rotate freely through the idler gear without driving the gear itself.

Gear 324 drives a shaft 327 which is journaled at both ends to rotate in the side frames 328. Spaced along and fixed to this shaft and driven thereby are a plurality of segments 326 collectively referred to as the document registration gate. As seen in FIG. 15, a cross section of one of these segments shows each segment to be irregularly shaped to provide in the position shown in FIG. 15 an abutting surface 329 to effectively block the advancement of a sheet of material or document between the feed rollers 316 and the idler rollers 330 associated with each feed roller and separating each gate segment 326. In the position shown in FIG. 15, the document registration gate will be referred to as being in an up position. This up position may be altered upon the enerization of the document gate solenoid in housing 331 which energizes the indexing clutch 321 to move the abutting surface of the registration gate so as to no longer block the advancement of a document. In this down position, a document will be free to pass through the path between and under the influence of the feed rollers and the idler rollers and onto the exposure transport belt 302. The idler rollers 330 are mounted on shaft 327 as are the segments of the document registration gate with the difference that the idler rollers are free to rotate in a friction drive relationship with the feed rollers.

The sprocket wheel 318 also provides driving power via gear 319 to the feed roller gear 332 which is fixed on shaft 325 to drive the feed rollers. The feed rollers and the power shaft 320 for the document registration gate will be rotating continuously when the machine is in operation through the motive power supplied by main sprocket wheel 393 referred to in FIG. 2.

The turn-around assembly 303 is located at the extremity of the exposure transport opposite the feed roller and registration gate. This assembly includes three friction driven rollers 333 which are driven with the exposure transport belt. One roller is spring loaded by springs 334 to tension a plurality of small belts 335 which move in a path to contact the three turn-around rollers and in cooperation with the exposure transport belt as it is in contact with conveyor roller 311. This tensioned roller 333 is also grooved to provide guides for each of the turn-around belts. The three turn-around rollers are rotatably mounted between two side plates 336 which, in turn, are supported by side frames 328. A support shaft 337 is pivotally mounted on these side frames 328 and extends through the two side plates of the turn-around assembly. This pivot relationship permits easy access to the interior of the turn-around assembly in case of a document jam or servicing of the detack corotron 304.

Within the path of the turn-around belts and closely adjacent the exposure transport belt as it is in contact with conveyor roller 311, there is positioned a suitable electrostatic detacking device shown as a conventional corotron 304. This corotron is mounted on a support rod which is fixed to the turn-around side plates 336.

The exposure transport belt 302 is under the influence of a vacuum during its travel through the exposure zone coextensive with the ported vacuum manifold 315. This vacuum is provided by a suitable compressor (not shown) connected to the vacuum manifold through an appropriate exhaust duct 398.

Inside the vacuum manifold within the path of the exposure transport there are located two pair of photocells PC1–PC2, and PC3–PC4. Each pair of photocells are mounted on a plate 338 which is held in position by a positioning assembly 339. This assembly includes a positioning rod 340 which is frictionally driven by way of a small rubber O-ring 341 which is mounted on a rotatable screw shaft 342. This screw shaft may be actuated from outside of the vacuum manifold to move the photocells to any particular position within a certain predetermined range. Positioned immediately above each pair of photocells is an opening 343 in the vacuum manifold to render each pair of photocells accessible to light when the slot 345 in the exposure transport belt is over the opening in the vacuum manifold. The positioning assemblies 339 for these photocells are held stationary relative to the vacuum manifold and the openings 343 therein by a frame member 344 which is secured to the interior surface of the ported portion of the manifold.

Spaced adjacent from the exposure transport belt 302 as it contacts conveyor roller 312 and centrally with respect to the edges of the belt is a photocell assembly including a photocell PC9, referred to hereinafter as the slot sense photocell, which functions to monitor the reflections from the white or highly reflective surface of the exposure transport belt. In this manner, when the slot 345 in the exposure transport belt passes the slot sense photocell PC9, this photocell will detect a light-no light transition.

The function of photocells PC1, PC2, PC3, PC4, and PC9 will be described in more detail hereinafter in connection with the decsription of FIGS. 32 and 34.

Figure 14:
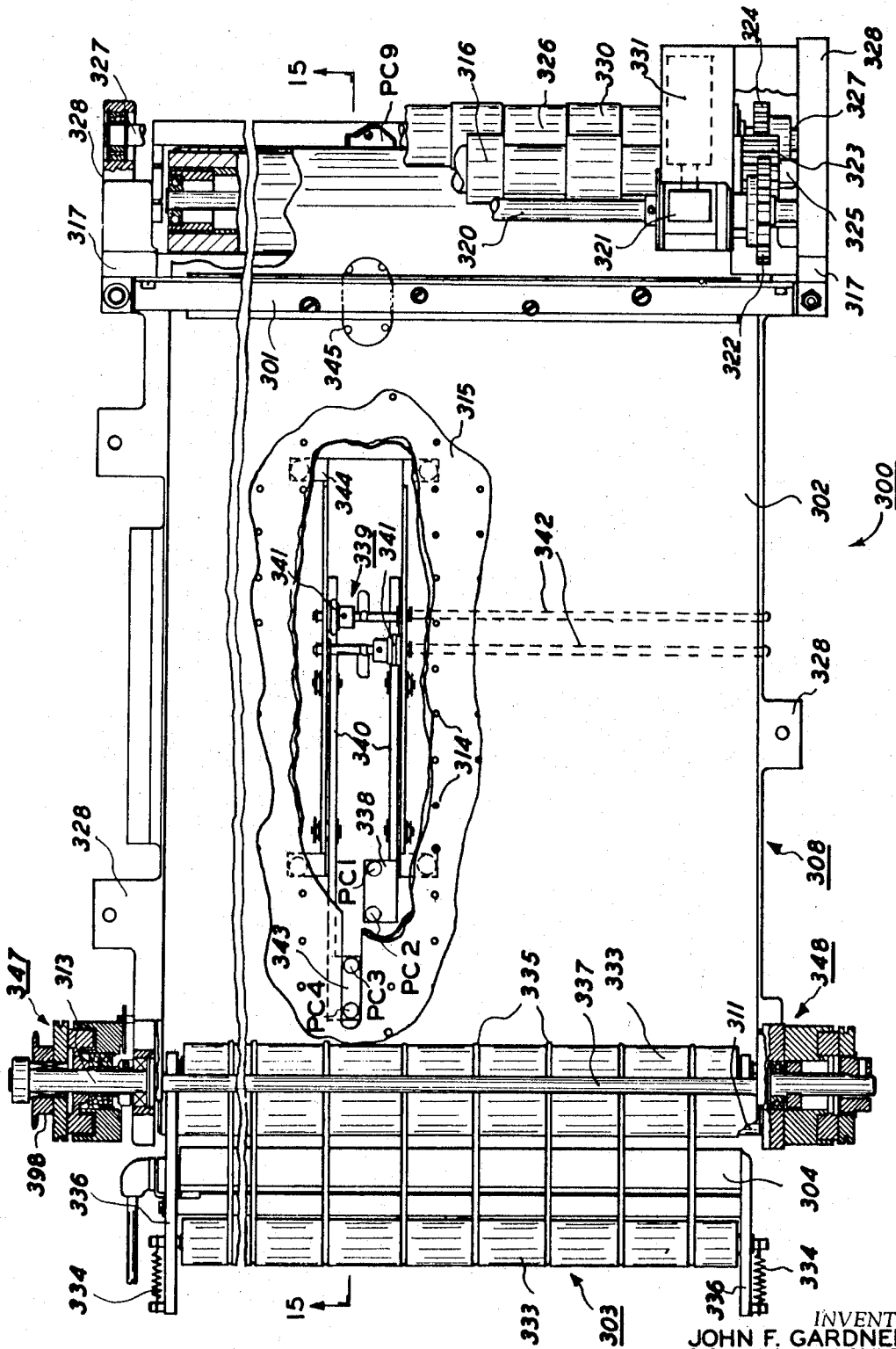
FIG. 14 is a horizontal plan view of the exposure transport to better illustrate the document registration features utilized in cooperation with the optical exposure system.

Referring specifically to FIGS. 12 and 14, there is shown the main document transport motor MOT2 mounted on side frame 328 which, via a suitable gear box 346, provides motive power to the main sprocket wheel 393 referred to previously in connection with FIG. 2. FIG. 14 shows a bearing assembly 347 mounted on shaft 313 of conveyor roller 311 to allow power translated to the shaft from sprocket wheel 398 to freely rotate the conveyor roller. At the other end of this shaft 313, there is mounted the exposure transport brake assembly generally designated 348.

FIGS. 12 and 14 also show the document gate switch SW7 which is activated by cam 399 fixed to shaft 327. This cam turns with the document registration gate 326 to provide an electrical signal indicative of the position of the gate 326 and its abutting surface 329.

Referring now specifically to FIGS. 12, 14, and 15, the return transport will be described. This transport 305 is comprised of a plurality of belts 350 mounted on two conveyor rollers 351 and 352, roller 351 being continuously driven by a suitable sprocket wheel (not shown) mechanically coupled to the main transport drive motor MOT2.

Inside the return transport belts 350 and between conveyor rollers 351 and 352 there is mounted a vacuum manifold 353 which is attached to rigid member 354 which also supports the ends of shafts 355 of the conveyor rollers 351 and 352 on suitable bearings. The vacuum manifold 353 for the return transport has one surface thereof facing the exposure transport which has a plurality of ports 356 which are aligned in the spaces between adjacent return transport belts 350 to attract through suction the document being conveyed to these belts.

From the relationship between the return transport and the exposure transport and after the detacking operation in the turn-around assembly, a document previously copied will egress from the turn-around assembly and be attracted by the suction of the return transport and adhere to the constantly moving return transport belts 350. The direction of travel of this document will be opposite to the direction of the document movement in the exposure zone on the exposure transport and will exit from the return transport over a plurality of finger elements 357.

As the document leaves the return transport and passes over the guide fingers 357, it will enter the influence of the stacker transport 306 which is shown in FIGS. 6 and 7.

Referring now specifically to FIGS. 6 and 7, the stacker transport comprises a vacuum manifold 358 similar to that employed in the return transport which is inside the path of a plurality of stacker transport belts 359. At the input of the stacker transport shown in FIG. 7, there is a conveyor roller 360 comprised of a series of rollers having between each roller a guide element 361. The rollers of the conveyor roller 360 are mounted on shaft 362 which is journaled at both ends to rotate in a supported manner in side frame panels 220 of the document stacker 175. This conveyor roller 360 is frictionally driven by the moving stacker transport belts 359 so as to urge the document egressing from the return transport into the area of vacuum influence of the stacker transport. The ports 368 in the vacuum manifold of the stacker transport are aligned between the transport belts 359 to attract a document into friction contact with the moving transport belts. The document adhering to the stacker transport is then conveyed toward the front of the document stacker. At some point along the ported surface of the stacker vacuum manifold 358 there is located a series of stripper fingers 309 each positioned intermediate adjacent stacker transport belts. In cooperation with the stripper fingers and frictionally driven by the moving stacker transport belts, there is located a plurality of foam rollers 363 mounted on shaft 364. These rollers are free to rotate about their supporting shaft 364. Also coupled to the shaft 364 is a backing assembly 310 which is directly mounted on a support bar 389. This support bar is fixed to the shaft and rides on slots 365 in the side frame panels 220. The details of this backing assembly will be described hereinafter.

The stripper fingers 309 are interconnected via rods 366 one of which extends and is fixed to blocks 367 which are secured to shaft 364 and move with this shaft along slots 365. Therefore, stripper fingers 309 and the foam rollers 363, as well as the backing assembly 310, will all move as the one unit along slots 365 in the side frame panels 220. The position of this unit will be detailed hereinafter.

As the document on the stacker transport reaches the stripper fingers 309, it will follow the stripper fingers and break the vacuum formerly drawing it to the stacker transport belts in cooperation with the frictionally driven foam rollers 363. In this manner when the document reaches the stripper fingers 309 it will be peeled from the stacker transport and will fall onto the stacker tray 307.

The position of the shaft 364, the stripper fingers 309 and the backing assembly 310 will be dictated by the size of the documents being copied by the apparatus utilizing the concepts of the present invention. With documents having a maximum dimension equal to the greatest distance which can separate the backing assembly 310 and the hinged door 370 associated with the stacker, the stripper fingers and the backing assembly will have to be positioned at the lower extremity of the slot 365 in the side frame panels 220. In this manner, the document will begin peeling from the influence of the stacker transport almost as soon as it has entered this transport. As the document continues to be fed into the stacker from the return transport, the lead edge of this document will be forced along the stacker tray toward the door of the stacker. As the trailing edge is peeled from the stacker transport, the document will completely settle to the stacker tray 307 and this trailing edge may abut the backing assembly.

In the case of smaller documents, such as automatic data processing cards, the stripper fingers 309 and the backing assembly 310 will have to be positioned almost at the other extremity of the slot 365. In this manner, the document will be conveyed almost along the entire length of the stacker transport before it is stripped from the transport belts and permitted to fall into the space between the door 370 and the backing assembly 310. The positioning of shaft 364 and consequently stripper fingers 309 and backing assembly 310 can better be described with reference to FIG. 9.

FIG. 6 also shows the drive train for conveyor 349 associated with the stacker transport. Shaft 390 has mounted in fixed relation thereon a sprocket wheel 391 which is mechanically linked to sprocket wheel 392. On the same shaft as sprocket wheel 392 there is mounted in fixed relation an idler sprocket 228 which is driven by drive chain 226 as it rotates around idler sprocket 227, drive sprocket 229, which may drive a conventional feeder mechanism, and drive sprocket 225 which is coupled to a suitable gear box 224. Drive sprocket 225 receives its motive power directly from motor MOT1 mounted on side frame panel 220. In this manner, the stacker transport operates continuously with the energization of motor MOT1.

FIG. 9 is a side view of the stacker showing the side frame panel 220 and the slot 365 therein along which rides the unit consisting of the backing assembly 310, the shaft 364 bearing the foam rollers 363 and the stripper fingers 309. On the outside of the side frame panel 220 there is mounted on shaft 364 a pinion gear 371 which is free to rotate about this shaft. The teeth of pinion gear 371 cooperate with the teeth in a rack 372 which is secured to the side frame panel and is arranged parallel to the lower edge of the slot 364. The pinion gear may be moved along the rack between the extremities of the slot 365 so as to position the stripper fingers and the backing assembly anywhere intermediate these two extremities. The actual movement of the shaft 364 and the pinion 371 is accomplished through a cable-pulley arrangement to permit the operator of the apparatus, for example, to easily select the position of shaft 364 in accordance with the documents placed in the document feeder 200.

This adjusting arrangement includes one cable 373 which extends from an attachment to anchor member 374 which is attached to the shaft 364 and around two idler pulleys 375 secured to the side frame panel 220 and around a third idler pulley 377 mounted on support flange 378 to which the other end of cable 373 is secured. This flange has an eyelet 379 which permits this flange to be moved along rod 380. This rod is spaced from and fixed to the side frame panel 220. A second such rod 381 is also attached to the side frame panel and accommodates another eyelet 382 which is also coupled to flange member 378. A suitable knob 396 is provided for the operator to move the flange member 378 along these rods 380 and 381. Flange member 378 also supports another idler pulley 383 around which a second cable 384 extends. The end of this cable is secured to the flange member. The cable 384 extends also around idler pulleys 385 and its other end is secured to one end of a spring 376. The other end of this spring is connected to the anchor member 374 fixed to the shaft 364.

With this cable-pulley arrangement the operator, when feeding large documents, will pull the knob 396 toward the right as the knob is viewed in FIG. 9 thereby moving the pinion 371 along rack 372 toward the lower extremity of slot 365 in the side frame panel 220. This will permit the documents copied to be stacked neatly on the stacker tray with the lead edge of the stack proximate to the door of the stacker and readily accessible to the operator. Machine vibration or gravity will not dislodge the documents from this position to cause them to slide back into the machine in a position difficult to reach by the operator because of restraining effect of the backing assembly 310.

This backing assembly may be seen in greater detail in FIG. 16 which shows a partial view from the outside of the stacker with the door 370 in an opened condition. The foam rollers 363 are shown spaced apart on shaft 364 and the stripper fingers 309 are shown between adjacent stacker transport belts 359. The backing assembly 310 includes a container 386 which has a substantially flat exterior bottom which is inclined to slide on the stacker tray 307. The cross section of this container shown in FIG. 7 illustrates the configuration of the bottom of this container and shows an edge 387 which extends past the rear wall of the container to make it more difficult for the container to tilt in a counterclockwise direction of FIG. 7 is viewed. The container 386 is adapted to receive folds of a conventional link chain 388 having two ends connected to support member 389 which is attached to shaft 364. The backing assembly will function to provide a restraining surface for a stack of documents on the stacker tray of any height depending upon the position of the backing assembly along the stacker tray. For larger documents, as the backing assembly is moved toward the lower extremity of slot 365, the link chain 388 will fold into the container effectively reducing its length above the top of this container. When shorter documents are used and the backing assembly is moved toward the higher extremity of the slot 365, the chain folded in the container will be drawn out of the container. Consequently, the chain will be extended its full length permitting the container to remain on the stacker tray while any documents on the stack exceeding the height of the container will be restricted by the chain itself. The chain may be a loop or may be two pieces of chain permitted to dangle from its support into the container 386. A link chain is preferred for utilization in this manner since it resists any lateral movement or flexing in a direction parallel to the pivot rods in the chain itself. This enables movement of shaft 364 to effectively move the container without the container tipping over or the chain flexing excessively. Located in the stacker 300 is the document output photocell PC11 which is positioned between the return transport 305 and the input to the stacker transport 306. This photocell receives light from source L11 which is interrupted when a document leaves the return transport and enters the stacker transport. By way of photocell PC11, the documents which enter the stacker 300 may be detected and this detection utilized in suitable jam detection circuits. This will be more clearly seen hereinafter in the description of FIG. 35.

EXPOSURE-OPTICAL SYSTEM

A document fed onto the exposure-return transport system 300 by means of the document feeder 200 is conveyed to an exposure station whereat the document is registered by means of photocells PC3, PC4 or PC1, PC2. As shown in FIGS. 32 and 34 of the electrical schematic, when the automatic xerographic reproducing machine is placed in the REDUCE mode of operation the photocells PC3, PC4 are electrically connected into the circuit to control document registration, and similarly, when the machine is placed in the DUPLICATE mode of operation the photocells PC1, PC2 are electrically connected into the circuit to control registration.

Illuminating units 420 are supported from optical support 86 by appropriate brackets 419 (FIGS. 2 and 5) and positioned to illuminate a document registered on the exposure transnport 300. The units 420 include a lamp 421 energized by a suitable power supply (FIGS. 33 and 36) to provide a high intensity-short duration flash of light. A preferred lamp for use in the illuminating units is manufactured by PEK LABS, INC., Sunnyvale, Calif., and provides a 100-microsecond flash of light sufficient to discharge the plate 10. The lamps 421 are supported by suitable conductors in the units 420 adjacent to the reflective surface 422 having a configuration such that a substantially uniform pattern of light impinges on the document surface.

A folded optical path emanating from the document surface is formed by pair of mirrors 424, 425 supported from the optical support 86 by means of threaded adjusting studs 426 secured to the back of each mirror and held in proper alignment by means of a spring 427 encompassing the studs 426 and compressed between a portion of the optical support 86 and a retainer threaded onto stud 426. Fine adjustment of the alignment of mirrors 424, 425 is accomplished by a plurality of adjusting screws 428 threaded through a support 86 and engaging the back of the mirrors, the assembly for mirror 425 as best shown in FIG. 5 being typical for both mirrors.

Adjacent the termination point of the optical path is an exposure mask 480 which is supported from and secured to the vertical support 85 and the optical support 86 by appropriate brackets 479. The exposure mask, as best seen in FIG. 17, includes a base plate 488 having an aperture therein interposed into the optical path emanating from a document registered on the exposure transport 300. The mask 480 is supported adjacent and parallel to the belt surface, by means of the brackets 479, at the termination point, 2, of the optical path. The effective size of the aperture and therefore the effective size of the area of the xerographic belt which may be illuminated by means of the optical-exposure system 400, is adjusted by means of an opaque mask 481 wound on a return-biased roller 482 rotatably supported in bracket 489 secured to base plate 488. The mask 481 is movable to increase or decrease the receptive area of the xerographic belt by means of a cable 486 and pulley 484 system through operation of a handle 483 connected to the roller 482. The pulleys 484 are secured to the base plate 488 and the cables 486 are fastened to the roller 482 and extend therefrom around the pulleys and are connected at the other end to the leading edge of the mask 481.

Figure 36:
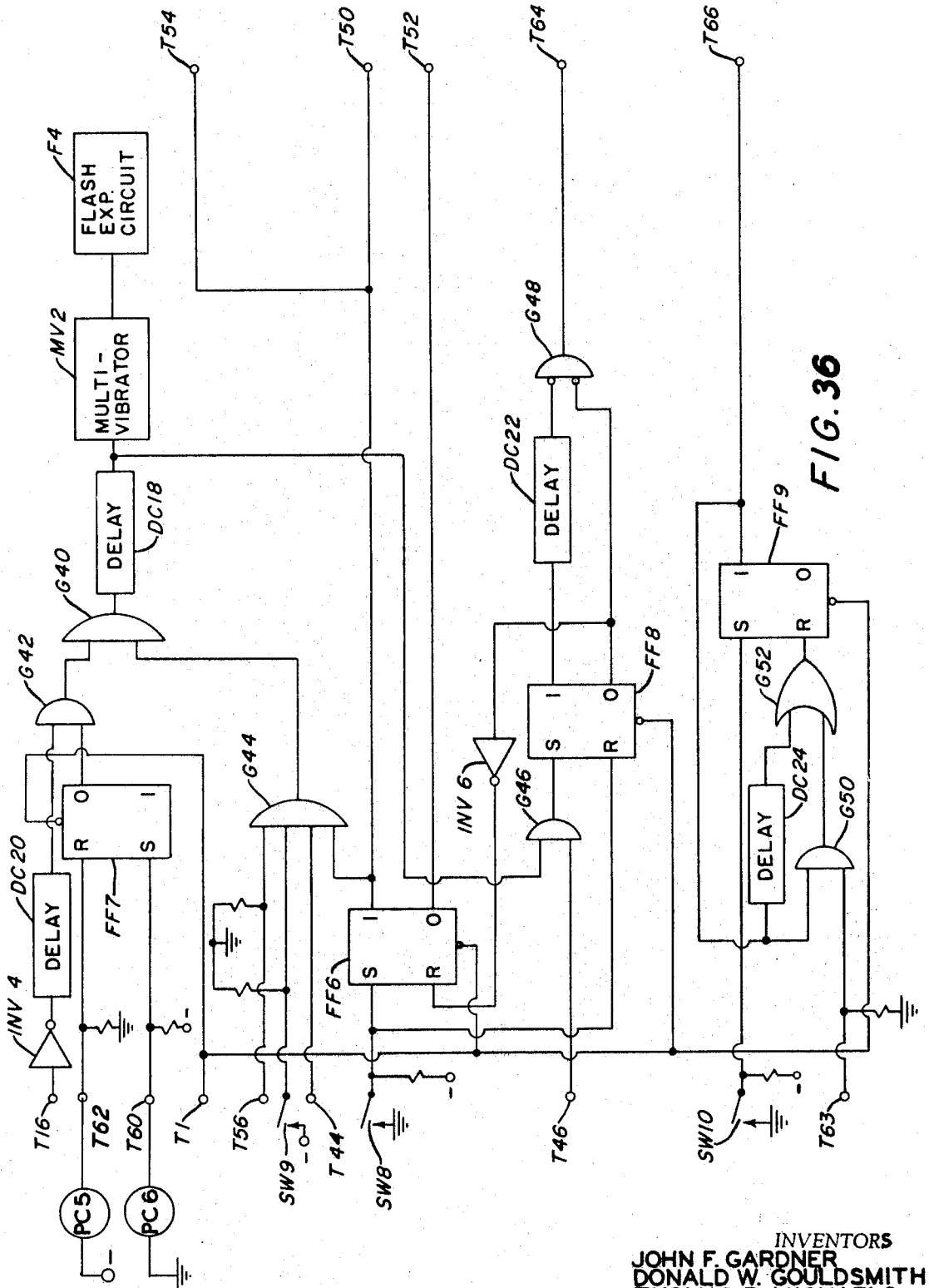

Secured to the leading edge of the opaque mask 481 are a photocell PC6 and a marker 487. The photocell PC6 is operatively connected with photocell PC5 secured to base plate 488 to comprise a belt seam detection system. Since one embodiment of the automatic xerographic reproducing machine disclosed herein utilizes a xerographic belt 10 having a seam formed where the belt ends are joined creating an endless web, it is desirable to prevent an image from being formed on the belt at such time as the seam 9 is passing through the termination point of the optical path. To prevent an image from so being formed, a light absorptive material, for example nonreflective tape 8, is placed on the seam removed from the image area of the belt surface and movable therewith in a path beneath photocells PC5 and PC6. The photocells are electrically connected into the machine, as shown in FIG. 36 and described in the Machine Operation portion of this specification, to prevent actuation of the illumination units 420 during the passing of the seam 9 through the image area. The marker 487 is secured to the leading edge of the mask 481 and comprises an opaque material extending into the optical path, adjacent the termination point 2, but removed from the image formed at the xerographic belt. The marker 487 creates an electrostatic latent image in registration with the latent document image, which is developed therewith, and functions as a cue or timing mark for photocell PC10 to control the card registration gate 740.

A pair of lenses 450, 451 are rotatably supported from the optical support 86 and interposable into the optical path for optically duplicating or reducing a document registered on the exposure transport 300. In FIG. 4, one of the lenses 450 is shown in position to form a reduced image of a document on the xerographic belt 10, and in FIG. 5 there is shown the lens control mechanism actuated to position lens 451 into the optical path and lens 450 out therefrom to form a duplicate image of a document registered on the exposure transport 300. The lens units 450, 451 are secured to and supported from lens support shafts 452, 453, respectively. The rotatable shafts extend through the optical support 86 and have a pulley 454, 455 each carrying a lever arm 456, 457 secured thereto. A cable 460, having each end connected to a spring 461, extends about the pulleys 454, 455 and a drive pulley 470 powered by a lens drive motor MOT3 which is actuated by switches RLS1, DLS1 to control movement of the lens units 450, 451 into and out from the optical path. As shown in the electrical schematics FIG. 32 and explained in detail in the Machine Operation portion of this specification, when for example as shown in FIG. 5, the machine is placed in the REDUCE mode and motor MOT3 is driven until the arm 457 abuts stop 459 and is biased thereagainst by the spring 461 which is tensioned by the motor MOT3 being powered until the arm of switch RLS1 falls into a detent of pulley 470. During this operation lens unit 450 is moved away from its stop 458 out of the optical path to await being actuated in a similar manner when the machine is placed in the DUPLICATE mode of operation and control of motor MOT3 is switched to DLS1, not shown in FIG. 5, but similar to RLS1.

XEROGRAPHIC PLATE AND SUPPORT MODULE

The xerographic plate having a photoreceptive surface on a conductive backing and formed into the shape of a flexible web or belt is carried by a support module 100 (FIG. 18) which includes a plurality of support rollers 104, 106, and 108. The xerographic belt is driven around these rollers past the termination point of the optical path emanating from the document exposure station, 2, a developing station 3, a transfer station 4, and a cleaning and discharge station 5. At the termination point of the optical path, the xerographic belt is held in a flat position by a vacuum platen 118 and is exposed to an optical light pattern image of an original document through one of the lenses 450 or 451. A primary reason for using a flexible xerographic belt in this type of automatic xerographic reproducing machine is that the exposure takes place on a flat surface giving the optical properties of a flat plate. In conventional xerographic machines the exposure is a scanning type whereby an image is flowed onto the surface of a rotating xerographic plate formed into the shape of a cylinder. The optical qualities associated with full frame exposure on a flat surface are superior to those of scanning on a moving cylinder. The flexible xerographic belt can then be fed around rollers and through various processing stations thus combining the efficiency of continuous processing with the obvious superior optical qualities of full frame exposure on a flat plate. However, with this type of device it becomes necessary to maintain accurate alignment between the electrostatic image produced at the termination point of the optical path emanating from the exposure station, 2, and the positioning of a developed xerographic toner powder image on a support media such as an EAM card at the transfer station 4. Drift or lateral movement of the xerographic belt between the point at which the electrostatic latent image is created and the transfer station 4 will result in copy being improperly positioned on the support medium.

If the axis of the rollers and the surface of the rollers were exactly parallel and the belt approached the rollers at right angles to the axis then each successive point on the belt would contact the roller at the same relative position, that is, the plane having all points of contact would be perpendicular to the roller axis of rotation. However, in normal operation either the surface of the roller has worn so that it is not exactly parallel to the axis of the roller, or the belt does not approach the roller exactly perpendicular to the surface of the roller then the belt does not contact the surface of the roller at the same relative position for each succeeding point. When a belt approaches a roller at an angle each incremental area of the belt comes into contact with a different lateral point along the surface of the roller. Each succeeding point is a little further misaligned and unless there is relative movement between the belt and the roller the belt will tend to move laterally along the roller. This movement is produced by any variation in the angle at which the belt approaches the roller.

The very same result can be produced by varying the position of the roller axis rather than the angle of approach of the belt surface. The angle between the belt and the surface of the roller can be varied by moving the rollers axis of rotation in either direction thus producing the movement as illustrated above. A change in the angle of the roller axis relative to the belts movement produces a corresponding movement or drift of the belt along the surface of the roller. By adjusting the position of the axis the belt may be tracked along the roller so that the drift or lateral movement is kept to a minimum.

Figure 18:
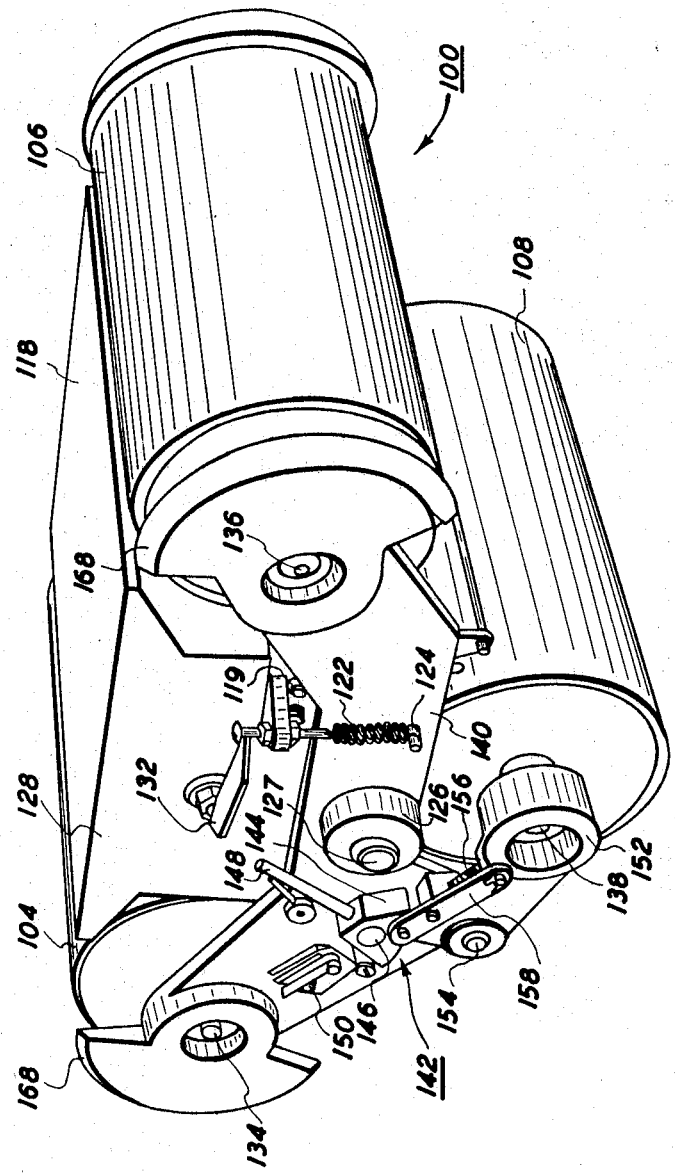
FIG. 18 is a perspective view of the xerographic belt module to better illustrate the construction thereof.
Figure 19:
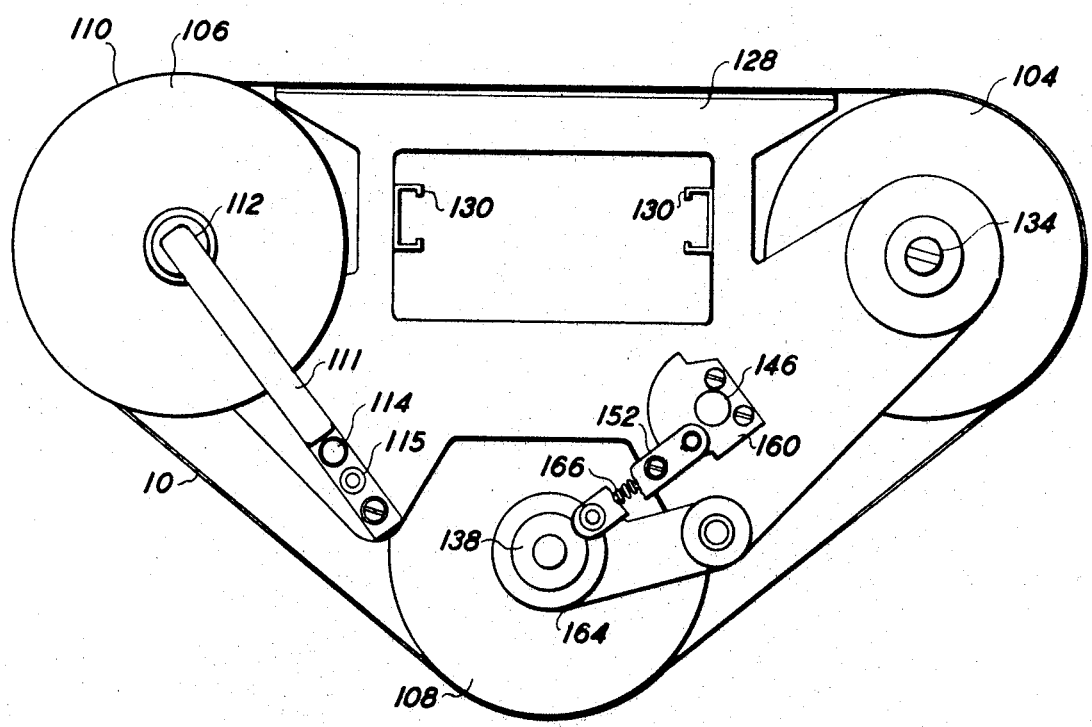
FIG. 19 is a front profile view of the xerographic belt module illustrated in FIG. 18.
Figure 20:
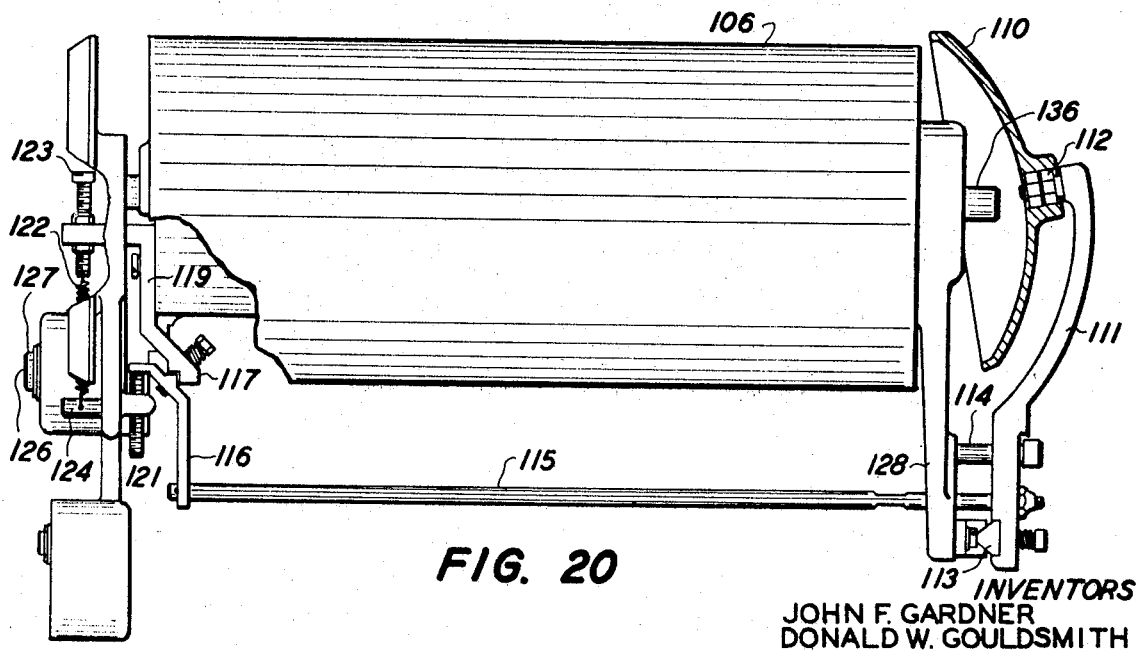
FIG. 20 is an end view of the xerographic belt module shown in FIG. 18 to better illustrate a mechanism for tracking the photoreceptive web or belt.

The amount of movement of the belt for slight variations in the angle of the roller axis is also dependent upon the degree of wrap or contact that the belt has with the roller. The larger the degree of wrap or contact the larger the amount of movement. In a two roller, three roller, or multiple roller system any one or all of the rollers may be moved to produce the belt tracking. However, the larger the number of rollers moved the smaller the actual movement of the axes required to produce corresponding movement of the belt. A preferred embodiment of the support module shown in FIGS. 18, 19 and 20 is a three roller system. Each of the three rollers is journaled in fixed relation to each other in a plate pivotable about a point 126 whereby the belt may be tracked or moved by moving the axis of the rollers between the various positions.

As shown in FIG. 18 the point 126 about which the axis of the three rollers are rotated is a shaft indicated by reference numeral 127. The shaft 127 is mounted in a main frame 128 which is the rigid support for the entire system and also serves the purpose of a platen for the belt at the termination point of the optical path emanating from the exposure station for creating an electrostatic latent image on or in the photoreceptor surface. The main frame 128 is carried by the vertical support 85 by means of the channel slide members 130 secured at one end to vertical plate 85, and the module 100 is secured to the slides 130 in a fixed or rigid position by means of a quarter turn type lock 132. Each of the rollers 104, 106 and 108 is mounted on a shaft 134, 136 and 138 respectively. The inboard ends of shafts 134, 136 and 138 are journaled in the main frame 128.

At the outboard end of the rollers there is a frame member 140 suspended from and rotatable about the shaft 127. The outboard ends of the roller shafts 134, 136, and 138 are journaled in the outboard frame member 140. Thus the entire assembly is supported from the main frame 128 and the outboard ends of the rollers are pivotable about the point 126.

The roller 108 is a belt tensioning roller and may be raised and lowered by means of an eccentric type latch 142 to permit a continuous loop belt or web to be placed on or off the roller assembly. The latch mechanism comprises an eccentric lock 144 pivotable about a pin 146 and having an arm 148 which may be held in a latch 150 to hold the roller in an elevated position. The shaft 138 of the tensioning roller 108 is mounted in a bearing 152 which is pivotally secured to the frame 140 by pin 154. The bearing 152 is urged downward by a compression spring 156 and is connected to the eccentric lock 144 by means of an arm 158. Movement of the arm 148 toward the latch 150 causes the eccentric lock 144 to rotate about the pin 146 releasing the spring 156 and moving the arm 158 and the bearing 152 upward. On the inboard end as shown in FIG. 19 the pin 146 extends through the main frame 128 and is connected to another eccentric lock 160, arm 162, and bearing 164 to produce identical movement of the shaft 138 against the action of the second compression spring 166.

When a belt is replaced around the rollers, the latch 142 is actuated to raise the roller 108 against the action of the springs 156 and 166 and a belt is placed on the rollers with the aid of the chamfered portions 168 of the frame 140. With the belt in position the latch 142 is released and tension is applied to the belt through the roller 108. The drive forces to move the belt are supplied through a gear secured to shaft 106 and driven by means of the drive system illustrated diagrammatically in FIG. 30.

The tracking mechanism comprises a sensing member 110 shown as a bell-shaped member and an actuating arm 111 on which the sensing member rotates. The purpose of the member 110 is to pivot the arm 111 in response to lateral movement of the belt. The member 110 rotates about a bearing 112 on the arm 111 with the movement of the belt. Thus there should be little or no friction between the belt and the rotatable member 110. As the belt moves or tracks towards the sensing member 110, the belt tends to force the sensing member 110 to the right as seen in FIG. 20. Movement of the sensing member 110 causes the arm 111 to pivot about a knife edge pivot point 113. Movement of the arm 111 is guided by a pin member 114 secured in the main frame 128. The movement of the arm 111 produces corresponding movement in a rod 115 which is connected to an arm 116. The arm 116 pivots about a pivot point 117 and a bracket member 119. The bracket 119 is secured to the main frame 128. The arm 116 translates the movement of the rod 115 into rotational movement of the frame 140 about the point 126. The arm 116 pivots about point 117 and bears downward on an adjustable set screw 121 mounted in the frame 140. When the sensing member 110 is moved away from the roller or to the right as seen in FIG. 20, the arm 111 pivots about knife edge pivot point 113 drawing the rod 115 to the right. The rod 115 in turn pivots the arm 116 about the pivot point 117 forcing the end of the arm 116 downward against the set screw 121 forcing the frame 140 to rotate in a clockwise direction as seen in FIG. 18. The frame 140 is biased in a counterclockwise direction by means of a tension spring 122 secured between a set screw 123 mounted in the bracket 119 on the main frame 128 and a pin 124 secured to the rotatable frame 140. The biasing of the frame 140 in a counterclockwise direction produces a nonalignment of the three rollers in a direction which would produce movement of the belt inward towards the sensing member 110. Thus when a new belt is placed on the rollers the action of the spring 122 to bias the frame 140 in a counterclockwise direction produces tracking of the belt toward the sensing member 110 and continues until the force of the belt against the sensing member 110 actuates the linkage described above to rotate the frame 140 in a clockwise direction. Rotating the frame slows down the amount of tracking of the belt until the belt stops tracking and remains at an equilibrium condition. If the belt is forced against the sensing member 110 the linkage tends to rotate the frame to a position where the belt will track away from the member 110 until the equilibrium is reached. After equilibrium condition is reached the belt is held in contact with the sensing member 110 and properly aligned on the belts roller supports.

CARD FEEDER AND SEPARATOR

The feeding device 500 is shown in FIG. 1 positioned in the xerographic reproducing machine. The feeding device 500 delivers card stock, e.g., EAM cards, data processing cards, indexing cards, etc., sequentially to the xerographic section of the machine where a copy of an original document is reproduced on the cards. The operation of the card feeder in conjunction with the xerographic machine is best understood by referring to the sectional view of the xerographic machine shown in FIG. 3. The card feeder 500 plays an active roll in assisting the xerographic machine in transferring an image of an original document formed on photoreceptive belt 10 to a card.

The feeding device 500 feeds a card to the xerographic machine at a time that will permit the card to arrive at the transfer station 4 at the same instant as the developed image. Initially, a card is ejected from stack 501 by the action of nudger wheels 502 and friction wheel 503 and advanced to the primary feed rollers 504 and stop switch 505. Stop switch 505 generates an electrical signal upon the arrival of the card causing feed rollers 504, friction wheels 503 and nudger wheels 502 to stop. The card is held at the stop switch 505 until an electrical signal is issued by the xerographic machine indicating that a document has been imaged onto the belt 10. The signal issued by the xerographic machine energizes the feed rollers 504 to drive the card forward past inhibit switch 506 to the secondary feed rollers 507. The inhibit switch 506 initiates the transmission of an electrical signal to the xerographic machine while the card is in contact with switch 506. This electrical signal prevents the formation of additional images on the photoreceptive belt thereby establishing the minimum spacing between images formed on the belt and assisting the stop switch in establishing the minimum distance between cards.

The secondary feed rollers 507 advance the card to registration conveyor 710 internal to the xerographic machine. The speed of conveyor 710 is such to enable a card placed thereon to arrive at the transfer station 4 at the same time as the developed image. Although cards are ejected in proper registration by the card feeder, it is desirable to insert a registration gate, 740, for example, to temporarily restrain the motion of the card on the conveyor 710, to realign the leading edge of the card to the image on the photoreceptive belt 10. To activate the registration gate 740 means are provided for detecting the location of the developed image on the belt 10 and for issuing a command to release the registration gate at the proper instant in time to insure that the card and developed image arrive at transfer station 4 simultaneously. The location of the image on the belt 10 is determined by a photocell PC10 that scans the belt for a timing mark placed on the belt when the latent image is originally formed. A photocell, PC10, detects the timing mark formed by a marker 487, shown in FIG. 17 appropriately secured to the leading edge portion of the adjustable exposure mask unit 480. The marker may be any type of opaque material which upon energization of exposure lamps 420 prevent the light from reaching the plate surface forming a latent electrostatic image of the marker at a point adjacent to the electrostatic latent image of the document positioned at the exposure station by means of the photocells PC3, PC4, or PC3A, PC4A. The latent electrostatic image of the marker is subsequently developed with the image of the document forming a que or timing mark to be sensed by photocell PC10. Upon the detection of the timing mark a signal is sent to the registration gate 740 to release the card. The command sent to the registration gate is timed to allow the image and the card to arrive simultaneously at the transfer station 4.

Following the transfer of the developed image to a card, the card is advanced by fuser conveyor 720 to fuser 800 where the developed image is permanently affixed to the card. Thereafter, the card is returned to the stacker tray 508 by return conveyor 730 and the feeder conveyor belt 509. The conveyor 720 reverses the direction of the card and places it onto conveyor 730. Conveyor 730 delivers the card to the feeder conveyor belt 509 which in turn transports the card to the stacking tray 508. The stacker tray 508 consists of a tray 510 hinged at point 511 to permit the tray to pivot about point 511 under the weight of the cards.

Figure 21:
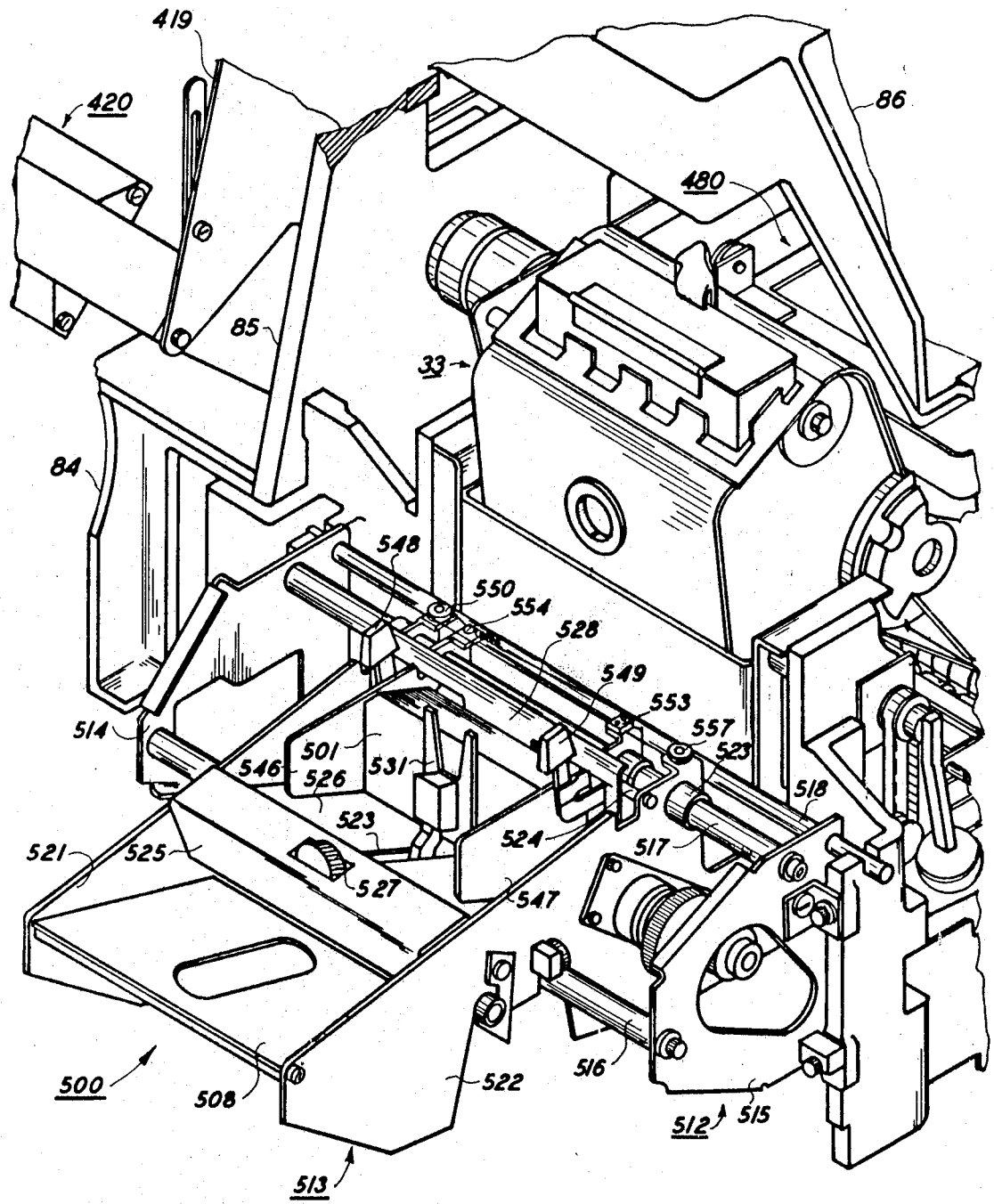
FIG. 21 is a perspective view of the card feeder mechanism utilized in cooperative relationship with the automatic xerographic reproducing machine illustrated in FIG. 1.

The present card feeder is comprised of two basic units, the frame 512 and the carriage 513 as shown in FIG. 21. The frame 512 is mounted on the xerographic machine in a position to enable cards to be fed at varying lateral positions to the conveyor belt 710. Frame 500 includes end panels 514 and 515 remotely spaced from each other by three parallel guide rods 516, 517, and 518. As best seen in FIG. 24, spline shaft 519 is rotatably supported by the end panels 514 and 515 and 518, and has sprocket 520 keyed thereto at its end adjacent to end panel 514. Sprocket 520 is adapted to receive continuous rotary motion from a power source in the xerographic machine shown schematically in FIG. 30. Because sprocket 520 is keyed to the spline shaft 519, the spline shaft is continuously rotated, providing a continuous driving means for the mechanism which operates the feeder. The feeder mechanism will be described more fully below.

Again referring to FIG. 21, carriage 500 is slidably supported by guide rods 516, 517, and 518, which are a part of frame 512. Side plates 521 and 522 are slidably mounted on the frame guide rods 516, 517, and 518. Inclined base plate 523, together with guide rod 524 and channel member 525 are mounted between the side plates and maintain them at a fixed distance from each other. Bed plate 526 is slidably mounted on top of base plate 523 and provides the surface on which cards are supported. A differential screw (not shown) is operatively connected to both the slidable bed plate and the base plate for adjusting the position of the bed plate relative to the base plate. Dial 527 records on a scale the position of the bed plate relative to the base plate. Fixed abutment plate 528 is mounted between side plates 521 and 522 and is the surface against which the leading card in a stack abuts prior to the time it is fed into the xerographic machine.

Bed plate 526 and base plate 523 have a longitudinal slot 529 centrally positioned between side plates 521 and 522 through which standard 530 extends. Rigidly attached to standard 530 is adjustable abutment plate 531 which is substantially parallel to the fixed abutment plate 528. The adjustable and fixed plates are the members between which the cards are retained while waiting to be fed.

Figure 23:
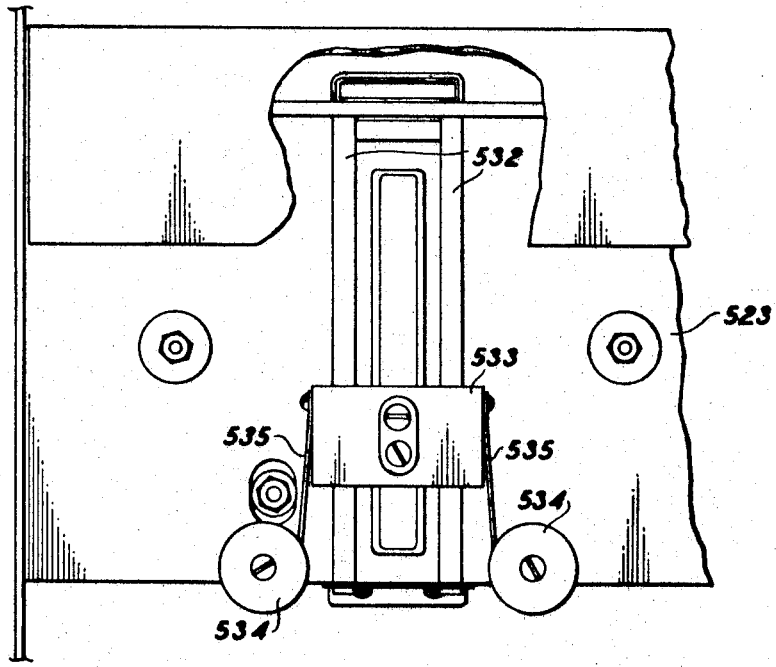
FIG. 23 is a partial section view of FIG. 22 taken along line 23—23.

FIG. 23 is a view of the underside of base plate 523. Tracks 532 are mounted on base plate 523 and carry block 533. The block supports and guides standard 530 which in turn supports adjustable plate 531. Two constant tension devices 534 are rigidly attached to the base plate at the end adjacent to fixed abutment plate 528. Devices 534 each have a band 535 attached to block 533. As the block is drawn away from the tension devices the force exerted by the bands on the block remains constant. The bands apply a constant bias on block 533 regardless of where the block is positioned along the tracks. Since the adjustable abutment plate is carried by block 533, cards 501 placed between plates 528 and 531 have a constant pressure applied to them regardless of the quantity of cards between the plates.

Figure 22:
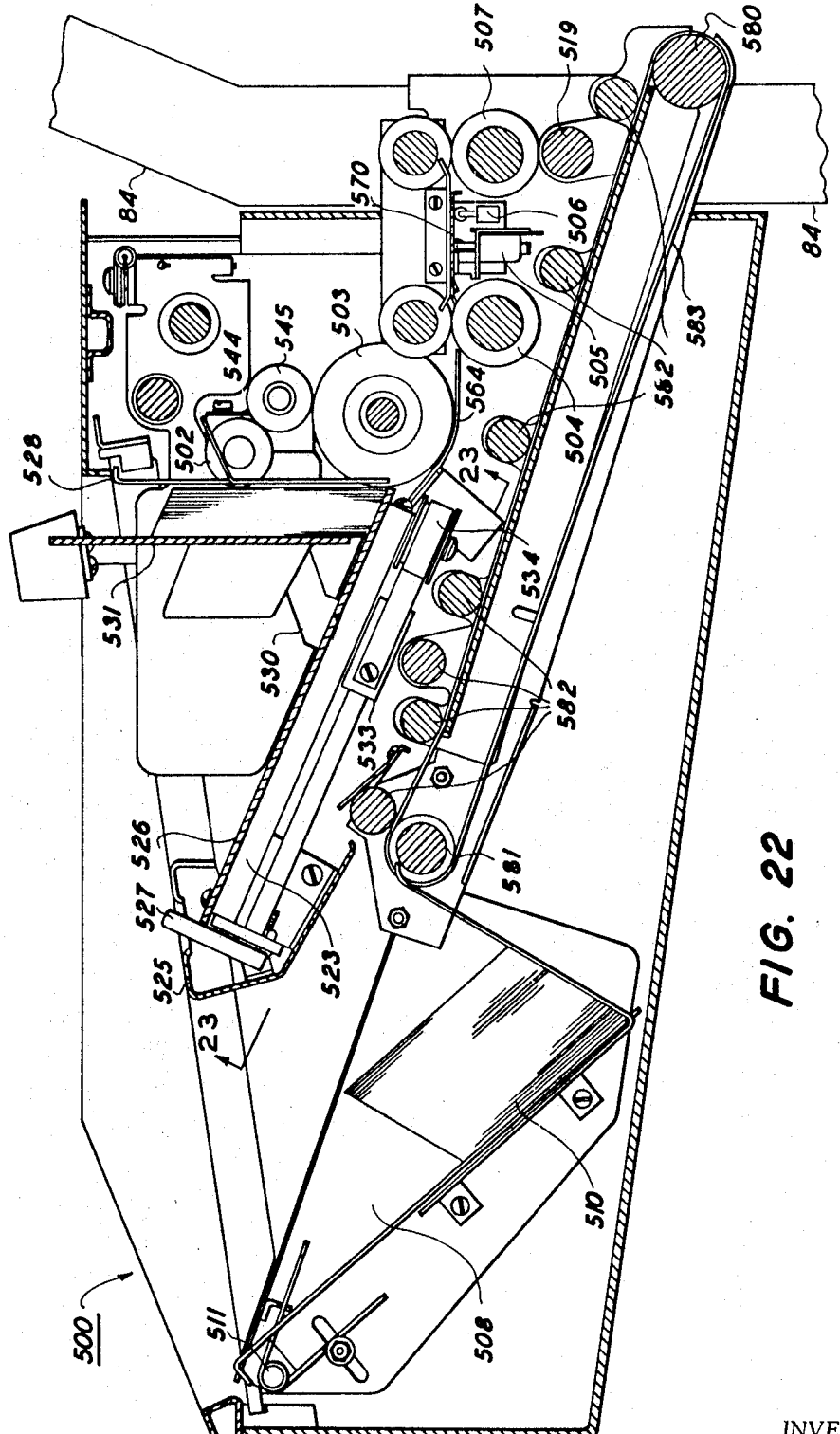
FIG. 22 is a sectional view of the card feeder shown in FIG. 21.

Referring now to FIG. 22, friction wheel 503 is mounted on a shaft which is journaled to side plates 521 and 522. A portion of the peripheral surface of friction wheel 503 extends through fixed plate 528 near a leading edge of plate 526. The shortest distance between the circumference of the wheel and the leading edge of the bed plate defines a throat through which cards are passed during feeding.

Figure 25:
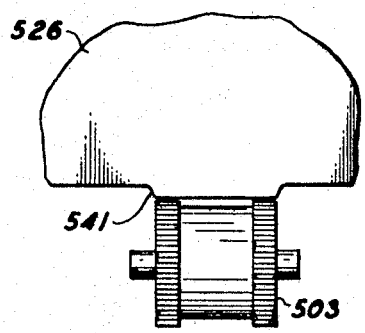
FIG. 25 is a top plan view of the feeding mechanism utilized in the card feeding apparatus.

Now referring to FIG. 25, it is seen that plate 526 is essentially rectangular with boss 541 centrally located at one end of the plate to form the leading edge of the plate that defines one parameter of the throat through which cards are passed during feeding. The boss has a width substantially equiavlent to the width of the friction wheel and is positioned directly opposite the friction wheel.

Friction wheel 503 has two tractor tread surfaces 538 on its circumference, best seen in FIG. 24, and it is these surfaces which extend through fixed abutment plate 528. A conventional overriding clutch 542 is mounted inside friction wheel 503. The friction wheel normally rotates at the speed of its shaft, however, the overriding clutch permits the friction wheel to rotate at a faster speed than the shaft if an additional force is applied to the friction wheel. Electrically activated clutch 539 mounted on the same shaft as the friction wheel imparts rotation to the shaft when it is engaged. Electric clutch 539 receives power through gear 540.

Two nudger wheels 502 are mounted on truck 544 above the friction wheel and spaced apart to coincide with the spacing of the tractor treads 538 on friction wheel 503. The nudger wheels 502 are driven by intermediate wheels 545 also mounted on the truck. The intermediate wheels 545 are in contact with both the nudger wheels and the tractor treads to supply power to the nudger wheels whenever the function wheel 502 is rotated. The circumference of the nudger wheels extend through the fixed abutment plate 528 substantially the same distance as the tractor treads.

Cards 501 inserted between the adjustable and fixed abutment plates are held under constant pressure against the friction wheel 503 and the nudger wheels 502 by the constant tension devices 534 as best seen in FIGS. 22 and 23. The nudger wheels force the leading card downward into the throat formed between the friction wheel and leading edge of bed plate 526. The cards are vertically displaced from one another by a slight distance, i.e., shingled, due to the incline of bed plate 526. Shingling of the cards aids the nudger wheels 543 to force the cards into the throat formed between the friction wheel and bed plate 526. The inclined bed plate also assists the friction wheel to eject a card through the throat formed by it with the bed plate.

The left and right margin guards 546 and 547, best seen in FIG. 21, are slidably mounted on the carriage guide shaft 524 and the frame guide member 517. The left margin guard 546 is locked to the carriage guide shaft 524 and right-hand margin guard 547 is locked to the frame guide rod 517. The locks comprise a lever arm held in tension contact against a shaft or rod by a spring. The locks are released by depressing the lock handles 548 and 549. The margin guards are laterally adjustable relative to the carriage guide shaft 524 and frame guide rod 517 between side plates 521 and 522 and the extremities of adjustable abutment plate 531.

The cards 501, regardless of their size, must be centered about the friction wheel 503 to assure efficient operation of the ejection apparatus and proper registration of the cards relative to the xerographic machine. Pulleys 550 and 557 mounted on the carriage side panels and coupled by continuous cable 552 function jointly to maintain cards centered about friction wheel 503. The cable is secured to the right margin guard at point 553 and the left margin guard at point 554. When the right margin guard is moved along guide rod 517, the entire carriage, including the left margin guard, moves in the same direction through the same distance because of the mechanical link between the cable, pulleys and margin guards. Since the left margin guard is locked to the carrige guide shaft, the cable is not free to move about the pulleys when tension is applied to the cable. Therefore, any movement of the right margin guard causes a like movement by the left margin guard and carriage.

The opeaation is different when the left margin guard 546 is moved along guide shaft 524. Depressing the lock handle 548 permits the left margin guard to be moved along the carriage guide shaft 554 This time, however, the right margin guard remains fixed because it is locked to the frame guide rod 517 and the carriage 500 moves in the same direction as the left margin guard but only through half the distance. For example, when the left margin guard is moved to the left a distance $2x$, the carriage moves a distance $x$ to the left because of the mechanical advantage supplied by pulley 551 and cable 552. The cable is free to move because the carriage on which the pulley 551 is mounted is free to move relative to the frame. As the cable is pulled a distance $2x$ to the left the pulley 551 and carriage move a distance $x$ because of the force exerted on the pulley by the cable between the tie points 553 and 554.

Referring now to FIG. 24, the shafts of the primary feed rollers 504 and secondary feed rollers 507 are mounted on bearings in the carriage side panels 521 and 522. The upper rollers are idler rollers. Feed rollers 507 is coupled by gear 560 to spline shaft 519 and runs continuously when power is supplied to the spline shaft 519. The primary roller 504 has electrically actuated clutch 561 (partially hidden) mounted on its shaft at the end mounted in side panel 521. Electrically actuated brake 562 is mounted on the shaft of the primary roller at the end mounted in side panel 522. Power is supplied to primary roller 504 by a belt coupled between the secondary roller and the primary roller. The gear 540 on the friction wheel shaft is driven by gear 563 on the primary roller shaft.

A platen 570, shown in FIG. 22, is supported between the primary and secondary feed rollers. Supported beneath the platen are stop switch 505 and inhibit switch 506. These switches have arms extending through the platen which are depressed when they are in contact with a card causing the generation of an electrical signal. A signal produced by stop switch 505 is applied to clutch 561 and brake 562 coupled to the primary roller 504 to stop the advancement of a card the instant the stop switch detects the presence of a card. The signal produced by the inhibit switch 505 is transmitted to xerographic machine to prevent the formation of a subsequent image on the photoreceptive belt 10. This signal is not removed until a card completely passes the inhibit switch.

Power is supplied to the feeding device by a power source internal to the xerographic machine. Sprocket 520 and spline shaft 519 are driven by the machine power source by a belt coupled to the sprocket. The spline shaft in turn continuously drives secondary roller 507 through gear 560. Gear 560 is mated to spline shaft regardless of the position to which the carriage 500 is moved on the frame guide rods.

Power is supplied to the primary roller by a belt coupled between the primary and secondary rollers.

Power is applied to friction wheel 503 through gears 563 and 540 coupled to the primary feed rollers and the friction wheel respectively. The friction wheel drives the nudger wheels 502 through intermediate wheels 545.

The operation of the feeding device proceeds as follows. A card of particular size is placed onto carriage 500 between margin guards 546 and 547 which are adjusted to the width of the card. Adjustable abutment plate 531 is allowed to come into pressure contact with the stack forcing the cards against fixed abutment plate 528 and the nudger wheels and friction wheel extending therethrough. A scale and marker are provided to align the right margin guide to the image formed on the photoreceptive belt 10. Movement of the left or right margin guards produces a compensating movement of the carriage to maintain the cards centered about the friction wheel.

The dimension of the card feeding throat formed between plate 526 and the friction wheel is adjusted to slightly less than the thickness of the cards. This adjustment is made by turning dial 527.

The constant pressure applied by adjustable abutment plate 531 on the cards increases the friction between adjacent the cards within the sack but it also increases the friction between the card abuting the friction wheel and nudger wheels. The friction between the card abuting the nudger wheels and friction wheels is much greater than the friction between the abuting card and others in the stack thereby enhancing the separation of the card from the stack through the throat. The ejection of a card is aided by the incline bed plate 526 because of the shingled relationship given the cards by the bed plate. The width of the throat is slightly less than the thickness of a card to prevent more than one card from being fed at a time. The surfaces on the friction wheel permit the throat to be narrower than the thickness of a card.

When power is initially applied to the feeding device, feed roller clutch 561 and friction wheel clutch 539 are engaged and the brake 562 is released thereby enabling the friction wheel and nudger wheels to eject the first card from the stack. The card is advanced by friction wheel 503 along guide member 564 to the primary feed rollers. The primary feed rollers rotate at a greater angular velocity than the friction wheel and as a result pull the card from the friction wheel. The overriding clutch 542 enables the friction wheel to be rotated at a greater rate than its shaft thereby permitting the faster rotating feed rollers to pull a card from the friction wheel. This pulling operation establishes a spacing between the cards ejected from the stack 500. Rotating the feed rollers about twenty percent faster than the friction wheel has been found to establish a satisfactory spacing between the cards. The primary feed rollers advance a card into contact with stop switch 505 which generates an electrical signal used to release clutch 561 and to activate brake 562 thereby stopping the primary feed rollers and the friction wheel.

The card positioned at the stop switch is ready to be fed to the xerographic machine. The formation of an image on photoreceptive belt 10 initiates the generation of an electrical signal which released the feed roller brake and engages the clutch thereby causing the primary feed rollers to advance the card across the platen 570 to secondary feed rollers 507. As the card advances across the platen inhibit switch 506 is activated. The inhibit switch causes an electrical signal to be transmitted to the xerographic machine to prevent the formation of a second image on the photoreceptive belt.

The constantly driven secondary feed rollers propel the card onto registration conveyor 710 which carries the card to the transfer station 4, where a developed toner particle image is transferred to the card. Thereafter the card is carried by fuser conveyor 720 to fusing station 800 where the developed image is permanently affixed to the card. Conveyor 730 delivers the card to conveyor 509 which in turn delivers it to the stacker tray 508.

Conveyor 509 comprises rollers 580 and 581 journaled in side plates 521 and 522. Coupled between rollers 580 and 581 are a plurality of card transport belts 583 on which the cards are supported. The cards are held in contact with belts 583 to facilitate their transport by a plurality of idler rollers 582 journaled in side plates 521 and 522 at spaced intervals along the conveyor. Power is continuously applied to the conveyor by an appropriate drive means coupled between roller 581 and the continuously driven secondary feed roller 507. The stacker tray 508 is also supported by side plates 521 and 522.

When the primary feed rollers were activated to advance the card from its position at stop switch 505, the friction wheels and nudger wheels were also activated. The second card in the stack was under the influence of the friction wheel at that time and traveled only a short distance before arriving at the primary feed rollers. The primary feed rollers also pulled this card away from friction wheel because of its faster rotational speed. The second card advanced until it triggered the stop switch causing the generation of the signal that stops the feed rollers. When the first card requested by xerographic machine had completely passed the inhibit switch the inhibit switch signal was removed from the xerographic machine and a second image was free to be formed. Therefore, when the second image was formed on the photoreceptive belt a signal was again generated by the machine to energize the primary feed rollers thereby driving the second card forward. As this card is advanced a third card is brought into position at stop switch 505. The cycle followed by the first card is therefore repeated until the required number of cards are delivered to the xerographic machine.

The feeding of cards continues in this manner until the xerographic machine transmits an electrical signal to the feeding device indicating that only one more card is needed. This signal causes the friction wheel clutch 539 to be disengaged. Therefore, the card positioned at the stop switch at this time is advanced to the xerographic machine by the primary feed rollers but the next card in the stack is not advanced to a position at the stop switch. This latter card will be the first card fed to the xerographic machine when the feeding device is subsequently requested to deliver a card.

CARD CONVEYOR MODULE

After a support medium, such as an EDP card, is forwarded from the card feeder 500 and advanced by the feed rollers 507, the card is passed onto the card conveyor module 700 for further processing. The module 700, as best illustrated in FIGS. 26–29, is supported adjacent the xerographic plate 10 and support module 100 on a pair of commercially available file-drawer type slide units 701 secured to the conveyor module 700 and to machine frame members 84 by appropriate brackets 702. The entire unit 700 is slidable on the slide unit 701 to allow the module to be moved into and out from the xerographic section of the machine to facilitate replacement of the xerographic belt 10 or to clear occasional jams of support media. The handle 703 secured to shaft 704 rotatably journaled in the module 700 controls a quarter-turn lock, a portion of which is supported from vertical support plate 85, of a well known type as previously described with reference to the xerographic belt support module 100 to lock the unit 700 into the machine.

The card conveyor module 700 includes the registration conveyor 710, transfer conveyor 780, fuser conveyor 720, and return conveyor 730 which are held in appropriate spaced relationship by inboard and outboard frame plates 705 and 706, respectively.

The registration conveyor 710 includes a pair of rollers 711 and 712 rotatably supported on shafts 713 and 714, respectively, secured in frame plates 705 and 706. A plurality of belts 715 extend about the rollers 711, 712 to forward the data processing cards to the registration gate 740. A movable pressure plate assembly 707, supported by tie rods 709 and 709a in frame plate 705 and 706, includes a plurality of ball members 708 contacting the belt 715. The ball members hold an EDP card against the belt for movement therewith, and the entire pressure plate assembly is pivotable about tie rod 709a to move the assembly into and out from contact with the belts to facilitate removal of occasional card material jams.

A registration gate 740 is journaled in support plates 705 and 706, and actuated by a rotary solenoid SOLR (electrically coupled to output terminal T66 of FIG. 36) for rotating the fingers 741 secured to shaft 742 out of interference with a data processing card upon the solenoid being actuated by photocell PC10 sensing the timing mark created by marker 487. The actuator arm of solenoid SOLR is connected to a bifurcated level 743 secured to shaft 742 whereby movement of the solenoid actuator arm will oscillate the fingers 741 out from interference with the data processing card, allowing the card to proceed to the transfer station 4, and then the fingers return to an initial position in interference with the path of movement when a subsequent card contacts the actuator arm of limit switch SW10 positioned in the path of movement across conveyor 310.

Upon the support medium being forwarded in timed relationship to the developed latent image on the xerographic plate 10 as determined by the photocell PC10 actuating the register gate 740, the card is advanced to the transfer conveyor 780. The transfer conveyor 780 includes a pair of bifurcated support plates 782 secured to rotatable drive shaft 783 mechanically connected to be rotatably driven by shaft 714 through gear 784 secured thereto and supported from the frame plates 705 and 706. The bifurcated support plates 782 are connected by means of a cross member 785 appropriately secured to the bifurcated support plates and extending between the frame plates 705 and 706.

A pair of rollers 783 and 783a are mounted between the two support plates 782 to drive and guide a series of flexible strands 781. Strands 781 extend around the two rollers 783, 783a and a pair of pressure rollers 786 which are rotatably supported in the support plate 782. Strands 781 are spaced along the roller to span the photoreceptive surface 10 and are forced into contact with the photoreceptive surface between the rollers 783, 783a when the transfer conveyor assembly 780 is brought into contact with the photoreceptive surface. As seen in the machine drive schematic FIG. 30, roller 783 has a drive gear 784 secured to the end to be driven through an idler gear by means of the drive roller 714 of the card registration transport 710. When a card is fed from the card registration transport onto the transfer conveyor 780 to be brought into contact with the xerographic belt, the card extends across the strands 781 against the photoreceptive surface and is carried forward by the strands across the transfer station. The transfer corotron 11a is supported by the cross member 785 at the approximate center of the bifurcated support plate 782 traversing the photoreceptive surface. When a data processing card is carried by the strands 781 into contact with the photoreceptive surface it contacts a powder image previously developed on this surface by means of the photocell-registration gate synchronization. The powder image is transferred from the photoreceptive surface to the data processing card by the application of the corona discharge from the corotron 11a.

Positioned adjacent the transfer corotron 11a, is an electrical discharge device 60 for removing the data processing cards from the photoreceptive surface to which it has been previously electrostatically attracted by means of the transfer corotron. This electrical discharge device 60 referred to as a stripping corotron, is positioned adjacent the transfer corotron 11a at a point after the xerographic toner powder image has been transferred from the photoreceptive surface to the EDP card, and is secured to the cross member 785 by appropriate means. The stripping corotron comprises a conductive member suitably connected to a high voltage source as shown in the electrical schematic FIG. 33, with the conductive member enclosed in a suitable insulator 61 and having a plurality of pin-like electrodes 62 extending from the conductor through the insulating material with their points adjacent the surface of the xerographic belt to emit a corona discharge to neutralize the electrostatic attraction of the EDP card to the xerographic plate allowing the card to drop from the plate onto the fuse conveyor 720.

After the support medium is stripped from the xerographic plate 10 by the stripping corotron 60, the cards are forwarded by the fuser conveyor 720 beneath the fusing apparatus 800. The conveyor 720 includes a plurality of rollers 721, 722, 723, 724, 725 and 726 rotatably supported on shafts secured between frame plate 705 and 706 positioned adjacent the vacuum frame 727 connected to a suitable vacuum source, not shown, and supported between frame plates 705 and 706. The upper surface of vacuum frame 727 includes a plurality of apertures between the runs of belts 728 for holding EDP card in a flattened position against the belts as the card advances beneath the fusing elements 810. As best seen in FIG. 29, after a card passes across the top of conveyer 720, it is turned approximately 180 degrees by passing between rollers 722, 724, 725, and 726 being guided therebetween by the belts 728 passing about rollers 721, 722, 723 and the belts 729 passing about rollers 724, 725, and 726 in a manner previously described with reference to the turn around portion of exposure-return transport 300. After being reversed in direction by the above rollers series, the card is carried along the bottom of the conveyor 720 and held into contact therewith by means of a pressure plate assembly 770 similar in construction to pressure plate assembly 707 and supported adjacent the lower runs of belts 728 by the frame plates 705 and 706.

The fused EAM card is stripped from fuser conveyor 720 by a suitable stripper finger secured to the bottom of vacuum frame 727 and extending between the runs of belt 728, to allow the card to drop onto return conveyor 730. A return conveyor 730 includes rollers 731 and 732 rotatably supported on shafts 733 and 734, respectively, secured to frame plate 705 and 706. A plurality of belts 735 extend about rollers 731 and 732 over a guide plate 736, supported by frame plate 705 and 706 and having a plurality of rotatable pressure shafts 737 positioned adjacent the upper run of belts 735 to hold the cards in contact with the belt surface for advancement onto the card stacker conveyor 509.

FUSER

Subsequent to the developed xerographic toner powder image being transposed from the plate 10 onto the support medium by means of the transfer coroton 11a and stripped from the plate surface by the stripping corotron 60, the card is conveyed beneath the fusing apparatus 800. The fuser, at best is seen in FIG. 26, is supported adjacent the upper runs of belt 728 of the fuser conveyor 720 by means of end portion brackets 815 secured to each end of the fuser housing 808 and fastened to the frame plates 705 and 706 of the card conveyor modules 700. A pair of high energy lamps 810 commonly referred to as Xenon flash lamps are electrically connected in a suitable manner as disclosed in copending application Ser. No. 547,048, filed May 2, 1966, in the name of T. B. Michaels to a power supply as shown in FIG. 36 and supported from the fusing housing 808 adjacent to the upper runs of belts 728 of fuser conveyor 720. The lamps 810 are intermittently actuated to provide an energy output, for example of approximately 600–700 joules for a duration of one millisecond, to permanently fuse the transposed image to the support medium. A reflector unit 809 is supported above the lamps 810 from the fuser housing 808 to control the radiation emitted by the lamps and to direct this energy onto the image-bearing data processing card.

MACHINE DRIVE SYSTEM

Figure 30:
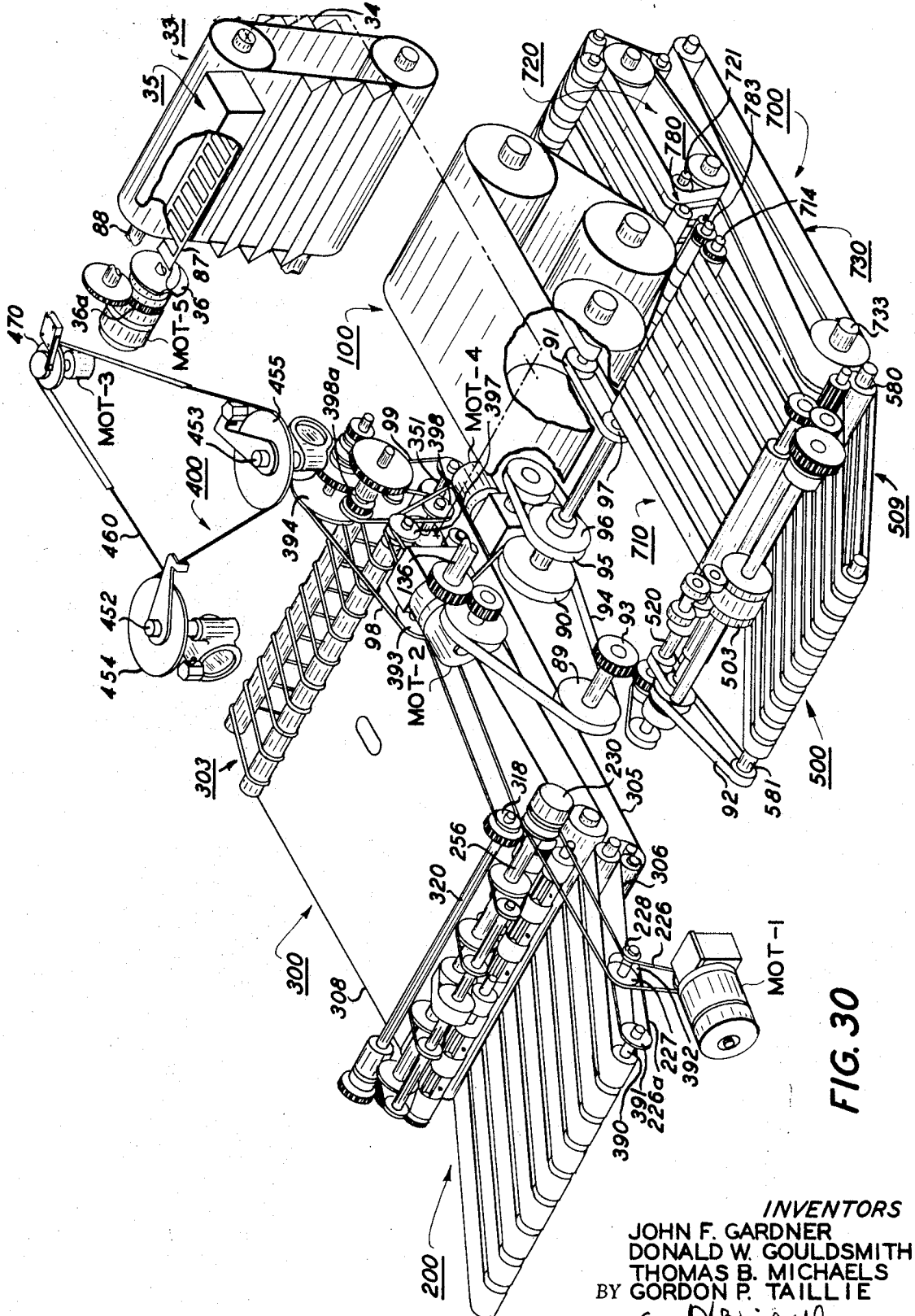
FIG. 30 is a schematic illustration of the drive mechanisms and motors used to operate the automatic xerographic reproducing machine illustrated in FIG. 1.

Referring now to FIG 30, power is supplied to the various components of the machine by means of a plurality of drive motors MOT1, MOT2, MOT3, MOT4, and MOT5 connected to suitable power supplied illustrated in the electrical schematic FIG. 33 and operated in timed relationship as discussed in the Machine Operation portion of this specification. Motor MOT1 is the prime mover for the document feeding and separating apparatus 2000 and the document stacked transport 306 by means of a flexible drive such as a timing belt 226. The timing chain 226 passes about a suitable drive sprocket attached to the drive shaft of motor MOT1, idler sprockets 227 and 228, and an electrical magnetically actuated clutch and brake assembly 230 to drive main drive shaft 256 of the feeder-separator apparatus which is intermittently operated as described in the Machine Operation portion of this specification. A second flexible drive member 226a passes about a sprocket 392, secured adjacent sprocket 227 for rotation therewith, and drive sprocket 391 secured to shaft 390 of the stacker transport 306 to provide continuous rotary power to the stacker transport for advancing a document to the stripper apparatus 309.

Motor MOT2 is the prime mover for the exposure-return transport system 300 by means of flexible drive members 98 and 99 passing about a plurality of timing and drive sprockets. The drive member 98 passes about a sprocket 393 suitably connected to the power shaft of motor MOT2, sprocket 394, a drive sprocket of shaft 351, and drive sprocket 397 to provide power to the multiple speed exposure transport 308 through the sprocket 394 and clutching mechanism heretofore described, interconnecting turn around string transport 303 through a friction drive from transport 308, and return transport 305 by means of a sprocket drive secured to shaft 351, respectively. A second flexible drive member 99 passes about drive sprocket 398 and 398a which is geared to the clutching unit for driving the exposure transport 308 during a portion of the document registration cycle as previously described in the Exposure-Return Transport portion of the specification.

The drive for moving lens units 450, 451 into and out from the optical path is provided by motor MOT3. The lens units are supported from shafts 452, 453, respectively, and rotated by means of a cable 460 passing about pulleys 452, 455 associated with units 450, 451, respectively, and coupled to drive sprocket 470 mounted on the drive shaft of motor MOT3. Cable 460 is passed around pulley 454 and 455 in a reversal orientation such that a clockwise rotation of sprocket 470 produces a clockwise rotation of shaft 453 and a counterclockwise rotation of shaft 452. From this arrangement it may be seen that as motor MOT3 is driven in one direction, shaft 453 will be driven in a similar direction and shaft 452 in a reverse direction. This arrangement positions one of the lenses into the optical path and at the same time removes the second lens from the optical path.

The drive for the xerographic belt 10, card feeder 500, and card conveyor module 700 is provided by motor MOT4. A drive sprocket, suitably secured to the drive shaft of motor MOT4, is coupled to sprocket 96 secured to an extension of registration conveyor drive shaft 714 by means of a flexible drive member 95 for driving conveyor 710. Another sprocket, 97, secured to shaft 714 is coupled to drive roller 721 of the fuser transport 720 by means of the flexible drive member 91 to drive conveyor 720. The transfer conveyor 780 is driven by means of gear 784 secured to shaft 783 being driven by a mating gear secured to registration conveyor shaft 714. The xerographic belt 10, supported on the belt support module 100 for rotation therewith, is driven by motor MOT4 by means of a gear secured to shaft 104 and mechanically coupled to a flexible drive member 94 driven by sprocket 90 secured to the extension of shaft 714. The flexible drive member 94, in addition, drives sprocket 89 having a gear 93 coupled thereto to operate the friction feed wheel 503 of the card feeder 500. The gear 93 rotates shaft 520 which through the gear train shown in FIG. 30, and described in the Card Feeder and Separator portion of this specification rotates the feeder 503 and drives the card stacker conveyor 509 by means of a flexible drive member 92 coupled to roller 581 and drives a gear secured to stacker conveyor roller 580. Operation of stacker conveyor 509 drives return conveyor 730 by means of a gear secured to roller 580 of the stacker conveyor mechanically coupled to a gear secured to shaft 733 of the return conveyor.

Motor MOT5, the last prime mover, has a wobble plate 36, and a gear 36a secured to the drive shaft to provide power to the developer apparatus 33 and toner dispenser 35. The gear 36a is mechanically coupled to a gear secured to shaft 88 for moving the buckets 34 within the developer apparatus. The wobble plate 36 is positioned to contact a spring biased slide unit 87 for dispensing toner powder into the developer apparatus.

MACHINE OPERATION

The general operation of the reducing/duplicating xerographic apparatus will now be described with specific reference to FIGS. 31 through 37 which illustrate generally the control logic circuitry for the apparatus.

FIG. 1 shows in detail the control panel for the apparatus of the present invention.

The operator will select a particular mode of operation, either REDUCE or DUPLICATE by pressing either button PB5 or PB6 as shown on the control panel of FIG. 31. The operator will then dial the desired number of copies of each document to be copied by rotating knobs K1 and K2 until the appropriate units and tens digits are displayed in windows W3 and W4, respectively.

For purposes of describing a typical operating cycle, it will be assumed that the desired mode of operation is to provide a specified plurality of reduced copies of original documents onto card stock, i.e., the REDUCE mode.

In this example, the operator would then only press the "On Reduce" button PB5 which actuates three momentary detent switches illustrated in FIG. 32. These switches are designated RSW1, RSW2, and RSW3. Switch RSW1 provides energizing current from an AC power source generally designated by the reference numeral PS7 to a transformer TF8. The secondary current generated in this transformer passes through the normally closed contacts of contact relay 10 and through a normally closed emergency stop or off switch SW12.

This emergency stop switch corresponds to the "Off" push button PB9 shown on the control panel.

Connecting this normally closed emergency stop switch to solenoid SOL1 are a series of mechanical interlocks, generally designated by reference numeral INT11, and a normally closed contact relay CR4 and the closed switch RSW2. Therefore, immediately upon the depression of on reduced button PB5 the solenoid SOL1 is energized changing the initial position of the other various contacts associated with and directly under the influence of this solenoid.

For simplicity of illustration the contact relays (CR) controlled by a particular solenoid (SOL) are designated by a reference numeral corresponding to the numeral associated with the solenoid. Where more than one contact relay is controlled by one solenoid, this reference numeral is followed by a second designatory numeral. All switch arms bisected with a broken line are controlled by a solenoid.

The energization of solenoid SOL1 closes contact relays CR1–1 and CR1–2 with latch AC power to the primary winding of transformer TF8 and through the normally closed contacts of relay CR3–1 to solenoid SOL10 which is a time delay solenoid which characteristically deenergizes after current starts through its coil for a predetermined period of time. Also, relay CR1–3 is closed latching solenoid SOL1 to the secondary current from the transformer.

The other side of solenoid SOL10 is connected to terminal ASN which represents an AC neutral in common with the power source PS7.

Relay CR1–2 also latches AC power to a low voltage power supply generally designated by the reference numeral PS 12. This low voltage power supply provides the necessary voltage to the various logic circuits to be described as well as to photocells, count indicators, etc. Where a terminal is designated in the figures to be discussed by a negative sign, this is mean to indicate that this voltage terminal is connected to this low voltage power supply PS12.

Relay CR1-2 also connects AC power to the copy counter and this association will be described in greater detail hereinafter in connection with the copy counter itself.

A reset circuit RC2, which may be a monostable multivibrator, is coupled to low voltage supply PS12 to be actuated when this supply reaches its operating level after solenoid SOL1 is energized. This reset circuit provides a suitable reset or set pulse at output terminal T1. This output pulse serves to place some of the flip-flops in the logic circuitry in an initial reset condition or a set condition. Relay CR1-2 also provides power to double pole relay CR5-1 which is normally in the position shown. This relay provides AC power to a motor MOT3 which positions either the duplicating or reducing lens in position for operation of the apparatus under the particular mode selected. The mechanical linkage between these lenses and the motor and the particular drive technique utilized has already been described in connection with FIGS. 5 and 30.

In the example of this description the reduce mode has been selected by the operator which means that the reducing lens must move into position as described in connection with FIG. 4. It should be realized at this point that this lens may already be in its proper position due to the mode of operation selected during the last operation of the apparatus. If this is the situation then the limit switch RLS1 associated with relay CR5-1 will be in an opened position, i.e., in contact with terminal T2. However, for purposes of explanation it is assumed that the duplicating lens is in position at the time that the REDUCE mode is selected. Therefore, limit switch RLS1 associated with relay CR5-1 is in the position as shown in FIG. 32.

The duplicating limit switch DLS1 is then in an opened position, i.e., contacting terminal T4. This connects the AC power source PS7 through relay CR5-1 to the lens position motor MOT3. Upon receipt of this power the motor will move the reducing lens into its proper position such that a stop on the drive mechanism of the lens will actuate limit switch RLS1 from the position illustrated to that position whereby the arm of the switch contacts terminal T2. This deenergizes the motor MOT3 halting the movement of the reducing lens so that the lens is now in its proper position, while at the same time energizing solenoid SOL7 to open the normally closed contacts of relay CR7. The opening of this relay provides a lens position signal to logic circuitry in FIG. 36 which will be described in more detail hereinafter.

Still referring to FIG. 32, in the REDUCE mode solenoid SOL5 remains unenergized thereby keeping the contacts of relay CR5-2 in their initial condition as illustrated. This places a reference potential, illustrated as ground potential, on one side of indicator lamp LMP5 and one side of two photocells PC3 and PC4. The function of these photocells will be described hereinafter. Lamp LMP15 serves to illuminate the "On Reduce" button PB5 to indicate that the REDUCE mode has been selected.

Photocells PC3 and PC4, referred to as the slow and stop photocells, respectively, have their outputs connected through OR gates G2 and G4, respectively. The outputs of these OR gates are connected to output terminals T6 and T8, respectively.

Referring now to FIG. 33 in addition to FIG. 32 the status of the apparatus at this point in the operation cycle will be stop print condition. This condition will be indicated by the illumination of push button PB10 on the control panel. The lamp illuminating this push button is designated by reference numerals LMP2 in FIG. 33 and is connected across an energizing potential through the closed contacts of relay CR3-2 which is under the influence of solenoid SOL3.

This solenoid would then be in an unenergized state because of the condition of the various inputs to the logic circuitry illustrated in FIG. 33.

In the initial condition of the apparatus as above described, flip-flop FF1 in FIG. 33 is in a reset condition due to the reset signal applied to it from input terminal T1. This reset condition of flip-flop FF1 will continue as long as a set signal is not applied to the set side of this flip-flop. Tse set side of this flip-flop is connected directly to input terminal T10.

Referring again to FIG. 32 this input terminal T10 corresponds to the terminal designated by the same reference numeral which is connected to one contact of a print switch SW1. This print switch is normally open and corresponds to push button PB12 of the control panel of FIG. 31.

At this point in the operation of the apparatus the print button has not been actuated by the operator and therefore the machine remains in its stop-print condition as indicated by the illumination of the stop-print lamp LMP2.

The operator now loads a plurality of documents into the document feeder described in FIGS. 6–11. Card stock is also loaded into the card feeder described in FIGS. 21–25.

With the documents to be copied and the card stock to receive the copies in position in their respective feeders, the operator next presses the print button PB12 to begin the reducing/printing operation of the apparatus.

As was noted in the description of FIG. 32, a time delay solenoid SOL10 was connected to AC power source PS7 upon the energization of solenoid SOL1. This power is supplied to solenoid SOL10 through the normally closed contacts of relay CR3-1. This relay CR3-1 is under the influence of solenoid SOL3 in FIG. 33 and while the apparatus is in a stop print condition and solenoid SOL3 is deenergized, relay CR3-1 remains in its initially closed condition. Upon the energization of solenoid SOL1 the time period designed into time delay SOL10 is initiated. This time period limits the time interval during which the operator may place the documents and card stock in their respective feeders and press the print button PB12. Failure to press the print button within the time period results in the complete shut down of the apparatus after the aforementioned time period has expired.

However, upon the depression of the print button a print signal is received by the circuitry of FIG. 33 at input terminal T10 which provides a set signal to the set side of flip-flop FF1 to energize solenoid SOL3. This effects the opening of the contacts of relay CR3-1 in FIG. 32. Also, upon the depression of the print button the stop print lamp LMP2 is extinguished and an energizing potential is applied instead across the print lamp LMP3 which illuminates the push button PB12 on the control panel of FIG. 31. Since the contacts of relay CR3-1 in FIG. 32 are now opened, the time delay solenoid SOL10 is inactivated and out of the circuit.

It is noted that the time period of this time delay solenoid will commence to run whenever the apparatus is placed in a stop print position since the contacts of relay CR3-1 will then close. This statement is true, of course, only if AC power remains connected to one side of relay CR3-1.

Flip-flop FF2 in FIG. 33 is initially in a reset condition which disables AND gates G6 and G8 thereby inhibiting solenoids SOL2 and SOL6 respectively. Solenoid SOL2 controls the main power relay CR2 while solenoid SOL6 controls the developer housing motor relay CR6. Both the main power relay and the developer housing motor relay are in an initially opened condition. As illustrated in FIG. 33 these relays connect AC power source PS7, which may be identical to the AC power source referred to hereinabove in connection with FIG.

32, to various units and subsystems of the apparatus requiring AC power. An example of these could be the fuser and exposure power supplies, the various compressor motors, power supplies for the various corotrons, and the main drive motor. Therefore, the depression of the print button PB12 provides a set signal at input terminal T10 of FIG. 33 which sets, in addition to flip-flop FF1, flip-flop FF2 thereby enabling AND gates G6 and G8, the outputs of which are connected to one side of solenoids SOL6 and SOL2 respectively. The other inputs to these AND gates G6 and G8 are derived from the outputs of two delay circuits DC2 and DC4 which may, for purposes of example, be 20 and 50 seconds, respectively.

These delay circuits are of conventional design and are such that they delay only a positive-going edge where a positive-going edge is represented by transition in voltage level from one level to a more positive level.

These delay circuits have their inputs connected to the output of NOR gate G10 which, in turn, has one input connected to input terminal T10 via an input inverter and another input to the output of AND gate G12. AND gate G12 will be discussed in more detail hereinafter.

At this point in the operation of the apparatus it is only necessary to realize that NOR gate G10 and delay circuits DC2 and DC4 will translate the print signal via input inverters to enable the respective inputs of AND gates G6 and G8 thereby energizing the main power solenoid SOL2 and the developer housing solenoid SOL6.

The low level signal from the output of delay circuit DC4 disables AND gate G14. This keeps solenoid SOL4 in its initial deenergized condition thereby maintaining the contacts of relay CR4 in their inital closed condition. This solenoid SOL4 may be referred to as the AC power shut down solenoid.

Whenever this solenoid is energized the contacts of relay CR4 are opened which, with reference to FIG. 32, terminates power to solenoid SOL1 which controls power flow to substantially the entire apparatus.

Reference will now be made to the logic circuitry of FIG. 34 which provides the necessary control over the document feeder and transport system.

The document feeder brake is activated by a high level signal at output terminal T12 in FIG. 34. The level of this signal is determined directly from the conditions of the three inputs to OR gate G16.

One of these conditions is the print or stop print condition of the apparatus which is indicated to the circuit of FIG. 34 through input terminal T16 which is directly connected as one input to OR gate G16. In the stop print condition the signal present at this input terminal T16 is at a high level while in the print condition this signal is at a low level. This input terminal corresponds to output terminal T16 in FIG. 33.

A second input to OR gate G16 is derived directly from the output of AND gate G20. The condition of this signal will be described in detail hereinafter.

The last or third input to OR gate G16 is derived initially from either the output of AND gate G22 or from one of three switches.

The first switch SW4 is the carrier switch referred to earlier in connection with FIG. 7 and is in its position as shown in FIG. 4 during the automatic operation of the apparatus. If the operator elects to feed documents to the apparatus manually then a carrier as described earlier must be employed to support the document to be copied. This carrier when inserted in the feeder tray will open the carrier switch SW4.

The second switch, manual-automatic switch SW5, is shown in its normally opened position when the machine is operating in an automatic mode. This switch is mechanically linked to the control lever 239 previously alluded to in connection with FIG. 9.

The third switch, a document feed switch SW6, is as shown in FIG. 34 in its normally opened condition indicative of the fact that there are documents in the document feeder tray. This switch was described earlier in connection with FIG. 7.

For purposes of this example, the manual/automatic switch SW5 is in its opened condition and the document feed switch SW6 is also in an opened condition as illustrated in FIG. 34. The carrier switch SW4 is closed connecting a source of low voltage applied at terminal T18 through a suitable resistor R6 directly to OR gate G16.

AND gate G22 has one input connected through an input inverter to the junction between delay circuit DG6 and the input inverter associated with AND gate G24. The signal from this junction represents the output from NOR gate G26 which monitors the output of two photocells PC7 coupled to input terminals T20 and T22 previously referred to in connection with FIG. 7.

These two photocells function to detect the lead edge of a document as it leaves the document feeder moving toward the feed roller 316. In order to so function, the photocells PC7 and their respective light sources L7 are positioned intermediate the document feeder and the feed roller 316. To spaced apart photocells are utilized instead of one photocell in this situation to insure accurate lead edge detection even in the case of a mutilated document having an irregular and discontinuous lead edge.

When no document is detected, the output at this junction is a low level signal which serves to enable this input of AND gate G22 after being invented by the input inverter.

The other input to AND gate G22 through an input inverter is from a document gate switch SW7 which, as noted in the description of FIG. 12, is cam operated to indicate the position of the document gate. When the switch is closed, as illustrated in FIG. 34, the document gate is up to obstruct the passage of a document from the document feeder toward the exposure transport system. If the document gate switch SW7 is open, then the document gate is down to permit the passage of a document from the document feeder through the feed rollers to the exposure transport system. As illustrated, a high level signal is applied to the input inverter associated with AND gate G22 which is connected to the arm of the document gate switch SW7.

The combination of a high level signal from the document gate switch SW7 and a low level signal from the delay circuit DC6 when no document is detected by photocells PC7 provide a low level signal at the output of AND gate G22 which is supplied directly as an input to OR gate G16.

The input to OR gate G16 from AND gate G20 is determined by four signal conditions. The first three of these signal conditions are monitored by AND gate G18, the output of which is a direct input to AND gate G20. These will now be described.

One signal condition is print or stop print condition, the former being a low level signal while the latter is a high level signal.

A second condition is the state of carrier switch SW4 which, in its normally closed condition for automatic operation, is represented by a low level signal also.

The third signal condition at the input of the AND gate G18 is the condition of flip-flop FF16, the zero output of which is connected to AND gate G18. This flip-flop is initially in a set condition as a result of a signal at input terminal T1 when the apparatus is first energized by the operator. In this set condition a low level signal is connected to the input inverter associated with AND gate G18. The set input of flip-flop FF16 is connected to the output of NOR gate G26. The reset input of this flip-flop is connected via an inverter INV1 to the zero output of flip-flop FF3. When the reducing/duplicating apparatus is first energized, this flip-flop FF3 is placed in a reset condition providing a high level signal at its zero output and a low level signal at its one output. In this condition, the signal from the zero output of flip-flop FF3 does not affect the initial set condition of flip-flop FF16.

The fourth signal condition monitored by AND gate G20 is derived from the output of delay circuit DC6. Initially, photocells PC7 will not detect a document passing through the document feeder since the apparatus has just been activated and the output of NOR gate G26 and delay circuit DC6 will be at a low level.

Prior to the depression of print push button PB12, OR gate G16 will have as inputs two low level conditions derived from the output of AND gate G18 and AND gate G22. A high level signal is supplied to OR gate G16 from terminal T16 which is connected to contact relay CR3–2 in FIG. 33. This high level signal is passed by OR gate G16 to terminal T12 to energize the document feeder brake. After the operator has placed the documents and card stock in their respective feeders, and the print push button is depressed, this high level signal at terminal G16 is removed thereby deenergizing the document feeder brake and initiating feeding of the first document into the apparatus.

Referring now to flip-flops FF4 and FF5 in FIG. 34, the control of the document transport system will be described at this initial point of the operation of the apparatus.

Flip-flop FF4, initially in its reset condition, has its zero output connected through a delay circuit DC8 to the high speed exposure transport clutch which is connected to output terminal T24. This clutch is energized during the presence of a high level signal at this terminal T24. Flip-flop FF5, also in its initial reset condition, has its zero output connected to output terminal T23. This terminal serves as an input to energize the exposure transport brake when this flip-flop is placed in a set condition. This simultaneously releases or deenergizes the low speed exposure transport clutch connected to terminal T25 representing the output from the one side of flip-flop FF5. The output from the zero side of flip-flop FF5 is directly connected to the reset input of flip-flop FF3.

With the document feeder feeding the first document after depression of the print button by the operator, this first document advances so as to interrupt the light incident upon either photocell PC7 referred to previously in the description of FIG. 7. As the lead edge of the first document fed interrupts this light path, the output of NOR gate G26 goes to a high level condition. This low-high level transition is delayed by delay circuit DC6 connected to the output of NOR gate G26. After the expiration of this delay the output of delay circuit DC6 goes to a high level condition thereby enabling its respective input to AND gate G20. In addition, AND gate G22 is disabled along with AND gate G24 via the input inverters associated with these AND gates.

It is noted that this low-high level transition does not effect the condition of flip-flop FF16 since it is already in a set condition.

The enabling of AND gate G20 provides a high level signal at terminal T12 via OR gate T16 to energize once again the document feeder brake after the time period of delay circuit DC6.

As was noted previously, document gate switch SW7 was in a condition indicative of the fact that the document gate was thwarting passage of any document from the document feeder to the transport system. Therefore, due to the spacing of the photocells PC7 relative to the document feeder and the document gate along with the time delay provided by the delay circuit DC6, the document feeder is permitted to run long enough to effect a buckle or warped condition in the first document fed through the document feeder. This occurs since this document abuts the document gate while the document feeder continues momentarily its feeding operation. However, after the aforementioned time interval designed into delay circuit DC6, has elapsed, the document feeder brake is energized and the feeder is stopped.

When the output of AND gate G20 goes to a high level, a low-high level transistion is provided at the input of the delay circuit DC10 and is delayed for a specified period of time necessary to insure that from the initiation of the document feeder the first document has in fact been buckled at the registration gate. After the lapse of the delay provided by delay circuit DC10 the input of AND gate G28 connected to the output of delay circuit DC10 is enabled. The enabling of AND gate G28 is delayed also to insure that the slot in the transport belt will not be "sensed" until a document is buckled at the document registration gate.

The next event is the detection of the slot 345 in the highly reflective surface of the document transport belt 302 previously referred to in the description of FIG. 15. When this slot is detected by slot sense photocell PC9, a low-to-high level transition is provided at input terminal T26 which is connected to the input of delay circuit DC12 which delays this transition. The delay of circuit DC12 is utilized to insure that the document gate will not be released until the slot is in such a position as to permit the advancing document to bisect the slot rather than completely cover it.

The amount of delay afforded by delay circuit DC12 of the slot sense signal will be dependent in part upon the exact position of the slot when it is sensed by the photocell relative to the speed of the transport belt as will become more apparent hereinafter. After the elapse of the delay of circuit DC12, one input to AND gate G27 is enabled. The other input to this gate is connected via an input inverter to terminal T14. The signal supplied to this terminal originates from the double feed switch SW11 which is actuated by the double feed detector mechanism previously described in connection with FIG. 10. This signal will be at a low level in the absence of the detection of a double feed thereby enabling AND gate G27.

With the enabling of AND gate G27, AND gate G28 is enabled to generate a setting signal to the set input of flip-flop FF3. When the flip-flop goes into a set condition the zero output goes to a low level which is inverted by inverter INV1 to afford a resetting pulse to flip-flop FF16 thereby disabling AND gate G18 connected to this output of flip-flop FF16 via an input inverter.

The disabling of AND gate G18 disables AND gate G20 to return the output of this gate to a low signal level. This, in turn, provides a low level signal at output terminal T12 via OR gate G16 to release the document feeder brake and commence operation of the feeder.

With flip-flop FF3 now in a set condition, the low-high level transition in its one output is delayed by delay circuit DC14 to provide a pulse at output terminal T28 of OR gate G32 having a duration equal to the delay period of circuit DC14. This delay typically may be 13 milliseconds. This pulse is passed by AND gate G30 which has one input connected via an input inverter to the output of delay circuit DC14 and another input connected through a similar input inverter to the zero side of flip-flop FF3. This pulse generated at output terminal T28 will effect the release of the document held in buckled configuration by the document gate by energizing the document gate selenoid which is coupled to output terminal T28.

The document gate has been released to permit the document it was holding to continue under the influence of the feeder through the feed roller. With the release of the document gate, the document gate switch SW7 is now in an opened condition providing a low level signal to the input inverter associated with AND gate G22 and G24. This effectively enables the respective inputs of these AND gates. The document will now be under the influence of the feed roller and the document feeder and will proceed onto the exposure transport belt in such a manner that its lead edge bisects the area of the slot 345 in the transport belt.

As the document advances onto the document transport system, the trailing edge of this document will pass over photocells PC7 and thereby reestablish light incidence on the photocells. This will immediately provide a low level signal at the output of NOR gate G26 which will enable AND gate G22 and G24 providing a high level signal at the output of each of these AND gates.

The high level signal at the output of AND gate G22 will be passed by OR gate G16 to output terminal T12 energizing the document feeder brake and terminating the operation of the feeder.

The enabling of AND gate G24 will provide a low-high level transition at the input of delay circuit DC16 which will delay this transition for a predetermined period of time, for example, 57 milliseconds. After this elapse of time, a high level signal will be translated by OR gate to output terminal T28 reinstating the document registration gate in its initial position to abut the next document feed from the document feeder. The amount of this delay afforded by delay circuit DC16 is dictated by the amount of time required to move the trailing edge of the document from immediately above photocells PC7 to a position where it is clear of the document gate to insure that the document gate, when reinstated, does not damage the document.

With the document gate reinstated, document gate switch SW7 once again disables AND gate G22 and G24 terminating the high level signals at output terminal T28 as well as once again providing a low level signal at the output of AND gate G22 which is translated to OR gate G16.

Since OR gate G16 has at its input only low level signals, the feeder is once again energized through the release of the document feeder brake.

From the preceding description of the slot sensor circuitry and the document feeder control, the inter-relationship between the delay of circuit DC12, the position of slot sense photocell PC9, the speed of the exposure transport belt 302, the closest distance between the exposure transport belt and the output of the feed rollers 316, and the conveying speed of the feed rollers is of some criticality. Each individual factor may be altered only with a compensating adjustment in one or more of the other factors.

With the factors mentioned in the preceding paragraph carefully selected, upon release of the document by the document gate the pinch rollers will convey the document onto the transport belt in such a manner that the belt slot will be bisected by the lead edge of the document. This relationship between the lead edge and the slot will be maintained by the influence of the tacking corotron 301 as previously noted.

The status of the circuitry of FIG. 34 is such now as to have photocells PC7 exposed to light, the document gate switch is again closed as illustrated in FIG. 34, the slot sense photocell is detecting the reflections from the surface of the document transport belt, and the feeder has commenced feeding the second document from the document feeder tray. This document will continue to be fed until a predetermined period of time after it interrupts the light incident upon either photocell PC7 whereby the stopping of the feeder as outlined above will be repeated with the exception that flip-flop FF16 which was in its reset condition will be set upon the detection by photocells PC7 of the lead edge of the second document.

This second document will maintain its buckled condition against the document registration gate until such time as the slot sense photocell detects the slot in the exposure transport belt after the document transport is restarted. The restarting of the document transport will be described in detail in connection with FIG. 37.

As the document now electrostatically adhering to the exposure belt 302 moves into the exposure zone a slow photocell PC3 previously alluded to in connection with FIG. 32 and formerly detecting light from low intensity source L4 detects the change from light to dark and generates a signal at input terminal T6 which enables one input of AND gate G34. The other input of this AND gate, as well as one input of AND gate G36, is connected to the one output of flip-flop FF3 and, while this flip-flop is in a set condition, is enabled. Therefore, the signal indicative of the passage of the lead edge covering a portion of the slot in the exposure transport belt past slow photocell PC3 sets flip-flop FF4 disengaging the high speed exposure transport clutch connected to output terminal T24.

The enabling of AND gates G34 and G36 with the set condition of flip-flop FF3 insures that the slow photocell will only be able to slow down the speed of the document transport when a document is actually on the transport as signified by the set condition of flip-flop FF3. Otherwise, the slow photocell will detect the trailing edge of the belt slot 345 and slow the transport belt even if a document is not on the belt.

It is noted that the delay circuit DC8 in the zero output circuit of flip-flop FF4 does not delay this negative-going signal since this delay is effective only in regards to a positive-going signal.

At this point, the exposure transport speed will be reduced from a relatively high speed, for example, 15 inches per second, to a slower speed, for example, 2 inches per second, under the influence of the slow speed clutch connected to output terminal T25 associated with flip-flop FF5. The lead edge of the document bisecting slot continues now at a slower speed in the exposure zone and approaches a stop photocell PC4.

Immediately upon the detection by the stop photocell PC4 of the lead edge of the document bisecting the slot, a signal is generated at input terminal T8 which enables a respective input of AND gate G36 to effect the setting of flip-flop FF5. Upon the placing of flip-flop FF5 in its set condition, the low speed clutch connected to output terminal T25 is deenergized and the exposure transport brake energized thereby stopping the exposure transport with the document now properly and accurately registered in the exposure zone. Also coincident with the setting of flip-flop FF5 is the resetting of flip-flop FF3, the reset input side of which is connected to the zero output of flip-flop via inverter INV2. The resetting of flip-flop FF3 inhibits AND gates G34 and G36 and maintains the output of OR gate G32 at a low level.

Still referring to the document control circuitry of FIG. 34, three output terminals are designated T30, T32, and T34. Output terminal T30 is directly connected to the output of NOR gate G26, output terminal T32 is directly connected to the one output of flip-flop FF3 and terminal T34 is directly connected to the one output of flip-flop FF5. A high level signal at any one of these output terminals is indicative of the fact that a document is in process. These output terminals are connected to similarly designated input terminals in FIG. 33 and will be referred to in more detail hereinafter.

In addition to output terminals T30, T32, and T34, there is also illustrated in FIG. 34 output terminals T36, T38, T40, T42 and T44, and T46 which have a direct connection to various outputs in the circuit of FIG. 34 and these output terminals correspond in reference numeral to various input terminals in the other figures designating the circuitry for the apparatus.

Output terminal T42 is particularly noted since it is directly connected to the output of the stop photocell PC4. The signal at this output terminal is indicative of the occurrence of a flash of the exposure lamps previously referred to in connection with the description of FIG. 4. This is possible due to the fact that this photocell will be exposed to the exposure illumination when the document in the exposure zone is flash illuminated. The signals at this output terminal T42 will be used by other circuitry to indicate when each copy of the document in the exposure zone is made.

Returning to the circuitry of FIG. 33, OR gate G38 has three inputs connected to terminals T30, T32, and T34 which correspond to similarly referenced output terminals in the circuit of FIG. 34. The presence of a high level signal condition on any one of these inputs to OR gate G38 represents the fact that a document is in process between the document feeder and the document stacker.

In the example of the operation of the apparatus, a document was fed from the document feeder to the exposure transport for exposure. The high level signal at output/input terminal T30 connected to the output of NOR gate G36 was generated when the photocells PC7 detected the lead edge of his document. This high level signal was passed by OR gate G38 and AND gate G12, the other input of which is enabled by the low level signal applied across the then closed contacts of relay CR3-2 to the input inverter of this AND gate. This high level signal at the output of AND gate G12 is connected to output terminal T48 in FIG. 33 to which is coupled the card scrub roller clutch referred to previously in the description of FIGS. 22 and 24. This high level signal energizes the card scrub clutch which couples the card scrub roller to the driving force of the card feed rollers. The energization of this clutch feeds a card from the card tray through the card feed rollers where the card actuates a microswitch referred to as the card switch and designated SW8 in FIG. 36.

Referring now to FIG. 36, the presence of a card at the card switch SW8 closes this switch providing a signal to the set side of flip-flop FF6 to set this flip-flop. The one side of this flip-flop is directly connected to the card feeder clutch through output terminal T50 and a high level signal at this output terminal deenergizes the card feed clutch previously referred to in the description of FIGS. 22 and 24. Simultaneously with the deenergization of the card fed clutch, the card fed brake is actuated by a low level signal from the zero side of flip-flop FF6. The card feed brake referred to previously in connection with FIGS. 22 and 24 is connected to output terminal T52 in FIG. 36. Also connected to the one side of flip-flop FF6 is an output terminal T54 at which may be present a card feed signal depending upon the condition of flip-flop FF6.

Therefore, upon a high level signal at output terminal T30 in FIG. 34 a document-in-process signal is generated at the output of AND gate G12 in FIG. 33 to energize the card scrub roller to feed a card into the card feeder toward the card registration transport. Once in the card feeder the card previously fed will actuate the card switch SW8 which will de-energize the card feed clutch and energize the card feed brake to stop the card feeder.

To summarize the status of the operation of the apparatus to this point, a document to be copied in reduced form is motionless in the exposure zone electrostatically adhered to the exposure transport belt and a card is stopped at the card switch SW8 in the card feeder. This card will ultimately receive the reduced developed image of the document in the exposure zone transferred from the xerographic belt.

Referring again to the circuit of FIG. 36, a multivibrator of conventional design, generally designated by the reference numeral MV2, has its output connected to a conventional flash trigger circuit F4 which controls the flash exposure lamps of FIG. 4 to provide flash illumination of the document thereby exposing the xerographic belt. The input of this multivibrator is connected through a delay circuit DC18 to the output of AND gate G40.

Actuation of the multivibrator MV2 is possible only if six conditions are satisfied. The first condition is that the appartus be in a print condition for at least five seconds.

This five-second delay, provided by delay circuit 101, between depression of the print button and actuation of the multivibrator is necessary to insure that the portion of the xerographic belt to be first exposed is adequately cleaned and precharged. This five second time period is a function of the speed of the xerographic belt. This speed may be two inches per second so that five seconds will permit the belt seam, if it has just entered the image area of the belt's path, to be moved completely outside a ten inch portion of the path of the belt where the image of the document will be focused.

At this point in the operation of the apparatus, the print button has been depressed in excess of the five second time requirement so that this condition is satisfied. Satisfaction of this condition is indicated by a high level signal at the input of AND gate G42 associated with input terminal T16. The inverter INV4 in FIG. 36 is necessary to invert the print signal derived from FIG. 33.

A second condition which must be satisfied is that the proper lens is in position to focus the image of the document in the exposure zone onto the xerographic belt during flash illumination. This condition, referring back to FIG. 32, is satisfied when the reduce limit switch RLS1 is actuated after the reducing lens is in position. The actuation of limit switch RLS1 effects a connection of solenoid SOL7 to the source of AC power PS7. This opens the normally closed contacts of contact relay CR7 providing a lens position signal to input terminal T56 of FIG. 36. This input terminal T56 is directly connected to one input of AND gate G44.

A third condition which must be satisfied is the assurance of a predetermined spacing between successively fed cards in the card feeder. This is accomplished through the use of an image length switch SW9 which must be in an opened condition to satisfy this condition. The function of this switch, as noted previously in connection with the description of FIG. 22, is to insure adequate spacing between the cards in the card feeder. This switch is also directly connected as an input to AND gate G44.

A fourth condition which must be satisfied is the presence of a high level signal at input terminal T44 which is connected as an input also to AND gate G44 in FIG. 36. This input terminal T44 corresponds in reference numeral to output terminal T44 in FIG. 34 and is shown as being directly connected to the one side of flip-flop FF5. This flip-flop, since a document is stopped on the exposure transport in the exposure zone, is in a set condition providing a high level signal at the output terminal T44 to energize its respective input to AND gate G44 in FIG. 36 thereby satisfying this fourth condition.

A fifth condition which must be satisfied is that the card feeder brake be energized. This condition is indicated to AND gate G44 by the direct input to this AND gate from the one output of flip-flop FF6. When the card feeder brake is energized this input to AND gate G44 is a high level signal.

A sixth and final condition which must be satisfied before the exposure driving multivibrator MV2 may be actuated is that the seam of the xerographic belt is not in a position so as to interfere with the image of the document focused on this xerographic belt. This condition is monitored by two photocells PC5 and PC6 referred to previously in connection with the description of FIG. 17. As noted in that description photocell PC6 is physically coupled to the image mask so that its position may be varied depending upon the position of this image mask.

Flip-flop FF7 as shown in FIG. 36 has its zero output connected directly as an input to AND gate G42. In its normally reset condition, flip-flop FF7 has a high level signal condition at this output thereby enabling AND gate G42. This reset condition, however, is altered whenever photocell PC6 coupled to input terminal T60 detects a light-no light transition. This light-no light transition is detected by photocell PC6 when the leading edge of a piece of nonreflective tape running transverse to the seam of the xerographic belt passes its position. Upon this occurrence, a high level signal is supplied to the set input of flip-flop FF7 setting this flip-flop and disabling AND gate G42. This condition of flip-flop FF7 continues until the trailing edge of this strip of nonreflective tape passes the position of photocell PC5. This photocell coupled to input terminal T62, upon detecting a no light-light transition will provide a positive-going signal to the reset input of flip-flop FF7 bringing this flip-flop back to its original reset condition and thereby enabling AND gate G42. Therefore, photocells PC5 and PC6 cooperate with flip-flop FF7 to disable AND gate G42 during that interval of time in which the nonreflective strip of tape is in that image area in the path of the xerographic belt where the document image is to be focused. In this manner, the multivibrator MV2 will be inhibited while the xerographic belt's seam is in this area.

As photocell PC5 detects the trailing edge of the tape this sixth condition will be satisfied and, with the other five conditions satisfied, a positive-going signal will be supplied from the output of AND gate G40 to the input of delay circuit DC18 to energize multivibrator MV2 after the delay of circuit DC18.

The delay of circuit DC18 is provided in order to insure that the exposure transport system has come to reset before the flash exposure of the document is initiated. The margin of certainty provided by this delay circuit depends upon the overall timing of the apparatus.

Therefore, with the machine in a print condition, the seam of the xerographic belt out of interference with any image of the document focused on the xerographic belt, the proper lens in position, the image length switch SW9 open, with the card switch SW8 in a closed condition, and with a document stopped at the exposure zone on the exposure transport, a suitable initiating signal will be supplied to multivibrator MV2 which will then effect the generation of trigger pulses which will initiate illuminating flashes from the flash exposure apparatus generally designated by reference numeral F4.

The initiating signal to the input of multivibrator MV2 is also utilized to enable one input of AND gate G46, the output of which serves as the set input to flip-flop FF8. This AND gate G46 receives another input signal from input terminal T42 which corresponds to output terminal T42 shown in FIG. 34. An enabling signal to this other input of AND gate T42 will be provided each time a flash exposure of the document in the exposure zone is made and detected by stop photocell PC4. Upon the detection of the first flash illumination of the document, flip-flop FF8, normally in the reset condition, will be set providing a positive-going signal at its one output. This positive-going signal is delayed by delay circuit DC22 before being translated to the input inverter associated with AND gate G48.

The other input of this AND gate G48 receives an input signal through an input inverter from the zero side of flip-flop FF8. Therefore, with the multivibrator MV2 energized and the detection of a flash illumination of the document by stop photocell PC4, flip-flop FF8 in FIG. 36 is placed in a set condition. The zero side of this flip-flop goes to a low level condition which enables AND gate G48. The other input to this AND gate connected through a delay circuit DC22 to the one output of this flip-flop remains in a low level condition for the duration of the delay of circuit DC22. This provides at the output of AND gate G48 a high level signal having a duration substantially equal to that of the delay circuit DC22. This high level signal is provided at output terminal T64 which is connected, as will be described hereinafter, to the input of the copy counter of FIG. 37. A billing counter may also be energized by coupling its input to this output terminal T64 in FIG. 36.

The zero side of flip-flop FF8 is also connected via an inverter INV6 to the reset input of flip-flop FF6 while the reset input of this flip-flop FF8 is directly connected to the set input of flip-flop FF6 and therefore to the card switch SW8. The connection between the zero side of flip-flop FF8 and the reset input side of flip-flop FF6 is through an inverter INV6 which inverts the signal at the zero output of flip-flop FF8. Therefore, when flip-flop FF8 is set by the detection of a flash illumination of the document on the exposure transport, a positive-going signal is received at the reset input of flip-flop FF6 to reset this flip-flop. As noted previously, in the reset condition, flip-flop FF6 energizes the card feeder clutch and deenergizes the card feeder brake to permit a card in the card feeder to be advanced. The resetting of flip-flop FF6 disables AND gate G44 which in turn disables AND gate G40 to inhibit multivibrator MV2.

In the example used to describe the operation of the apparatus, it was assumed that more than one reduced copy of the document stopped in the exposure zone on the transport belt was to be made. Therefore, referring to FIGS. 33 and 34, a signal will be present at any one of output terminals T30, T32, and T34 which will be passed by OR gate G38 in FIG. 33 to enable AND gate G12 thereby maintaining energization of the card scrub roller clutch connected to output terminal T48. As was noted previously, the card scrub roller will be driven only when the card feeder clutch is energized. This energization of the card feeder clutch was renewed when flip-flop FF6 was reset upon the detection of the first flash illumination of the document on the exposure transport belt. Therefore, as the first card is moved over the card switch, the card scrub roller conveys a second card into the card feeder to once again activate the card switch SW8. The activation of this switch repeats the previously described cycle of stopping the card feeder by deenergizing the card feeder clutch and energizing the card feeder brake. At this time, it should be realized that the first card into the card feeding system has been advanced into the card registration transport system which operates independently of the card feeder itself.

As the first card progresses under the motive influence of the card registration transport, the card gate switch SW10 is actuated from its normally open condition. Actuation of this switch SW10, still referring to FIG. 36, sets the normally reset flip-flop FF9 to energize the card registration gate solenoid which is connected to output terminal T66. As noted previously in the description of FIG. 28, this registration gate solenoid positions the registration gate to align and stop the card on the moving card registration transport. The card will be released by the gate at a time such that the card will properly meet and register with the image developed on the xerographic belt at the transfer station. The registration gate solenoid will be deenergized and the document gate will release the card when mark sense photocell PC10 detects the registration mark developed on the xerographic belt.

Since the one side of flip-flop FF9 enables one input of AND gate G50 when flip-flop is in a set condition, detection by photocell PC10 of the non-reflective developed registration mark on the xerographic belt will provide a positive-going signal at terminal T63 which is passed by OR gate G52 to reset flip-flop FF9 thereby de-energizing the registration gate solenoid and releasing the card held by the registration gate. The delay circuit DC24 provided in the other input to OR gate G52 insures that the card held by the registration gate will be released even in the event that photocell PC10 fails to detect the registration mark. This is necessary to avoid a card jam at the registration gate if the second and following cards from the card feeder are advanced toward the gate.

After the card is released by the registration gate it will continue along the registration transport to the transfer station described in FIG. 3. At this point the developed image of the document will be transferred to the card. The card is then conveyed to the fuser station where the toner image is fused with the card and the card is then returned to a stacker previously referred to in connection with FIG. 3.

At the fuser station, there may be a photocell detection system to sense the entry of a toner-image bearing card into the influence of a flash fusing apparatus. A trigger control circuit, shown generally in block form in FIG. 32 at reference numeral C8, may be utilized to trigger the fuser lamp appropriately to fuse the toner image on the card. An example of a possible fuser trigger circuit is disclosed in copending application S.N. 547,048.

Figure 37:
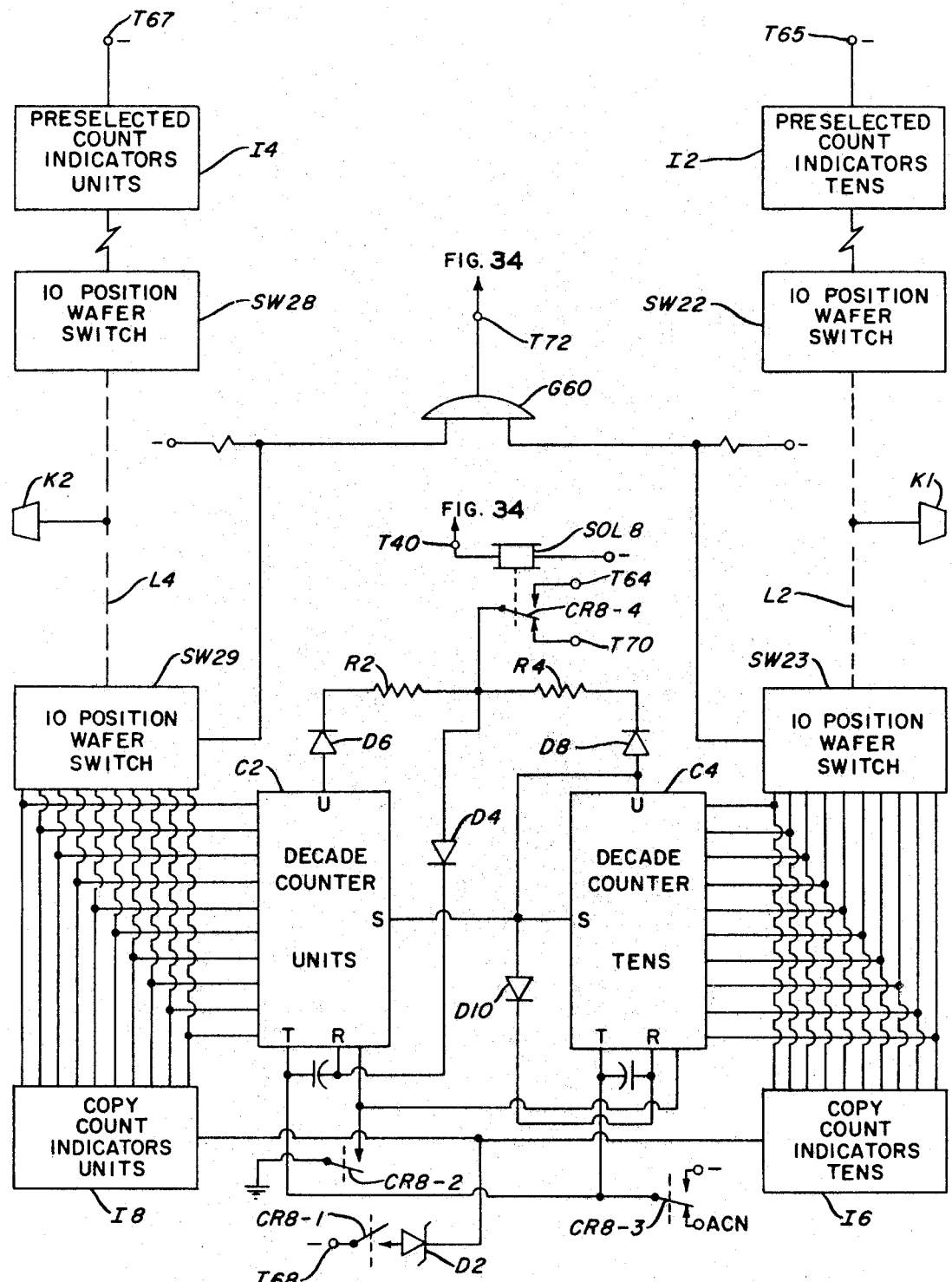

Referring now to FIG. 37, there is illustrated the copy counter circuit utilized in the apparatus. The actual counting mechanism may take various conventional forms, and, for example, a Veeder Root decade counter is illustrated symbolically in block form and designated generally by reference numerals C2 and C4. Each of these counters represents a decade counter. Counter C2 is utilized and connected relative to counter C4 to register units while counter C4 registers tens.

As noted previously in control panel of FIG. 31, a manually operated knob K1 is utilized in FIG. 37 to control two ten position wafer switches, for example, through mechanical linkage symbolically designated by the broken line L2. Wafer switch SW22 is connected through ten connectors to the preselected count indicators symbolically represented in the block designated I2. These ten input connections may, for example, be connected to various numeral control terminals on a conventional Nixie tube which receives power from terminal T65. In this manner, by manually turning knob K1 the operator may position wafer switch SW22 to illuminate on control panel in FIG. 31 at window W4 the tens digit of the number of desired copies. Similarly, knob K2 is mechanically linked via linkage L4 to a pair of similar wafer switches SW28 and SW29. As was the case with wafer switch SW22 and indicators I2, wafer switch SW28 displays via the indicators I4 the units digit in the number of desired copies at window W3 on the control panel. The preselected count indicators for the unit digits receives power from terminal T67.

Each of the ten output connections from wafer switches SW23 and SW29 is connected respectively to one of ten input connections associated with the tens counter C4 and the units counter C2, respectively. At the junction of these connections between wafer switches SW23 and SW29 and decade counters C4 and C2, respectively, there is connected an input lead to the copy count indicators I6 for the tens digit and the copy count indicators I8 for the units digit, respectively. Each of these indicators I6 and I8 receive power from terminal T68 via the closed contacts of normally opened contact relay CR8–1 and Zener diode D2. As will be described hereinafter, copy count indicators I6 and I8 serve to display at windows W5 and W6, respectively, on control panel the tens and units digits of the number representative of the amounts of copies made of a single document.

Decade counters C2 and C4 are connected in common to a reference potential, such as ground potential, via contact relay CR8–2 which is normally opened as indicated in FIG. 37. Further, the T input to counters C2 and C4 are normally connected in common through the contacts of contact relay CR8–3 to AC neutral. Terminal R of decade counter C2 is connected via diode D4 to junction J2 which is normally connected via the closed contacts of contact relay CR8–4 to terminal T70 which, in turn, is connected to AC power source PS7 referred to in FIG. 32. Junction J2 is also connected via resistors R2 and diode D6 to the U input of counter C2 and to a similar input of counter C4 via resistor R4 and diode D8 respectively. The S terminal of counter C2 is connected via diode D10 to terminal R of counter C4. The functions of these various connections to counters C2 and C4 will be described in more detail hereinafter. Referring back to FIG. 34, it was noted that the document transport brake was coupled to the zero output of flip-flop FF5 via output terminal T23. This brake was energized when flip-flop FF5 was set upon the detection by stop photocell PC4 of the lead edge of the document overlying the slot in the exposure transport belt. Also connected to the zero output of flip-flop FF5 was output terminal T40 which corresponds to input terminal T40 in FIG. 37 to which is connected solenoid SOL8. This connection between the zero output of flip-flop FF5 and solenoid SOL8 allows the energization of this solenoid whenever flip-flop FF5 is in a set condition, i.e., whenever the stop photocell stops the document transport for exposure of the document to be copied. The energization of solenoid SOL8 brings the counter circuitry of FIG. 37 into the overall circuit system of the apparatus with the exception of the preselected count indicators I2 and I4 which are energized upon activation of the apparatus initially.

Upon energization of solenoid SOL8, contact relays CR8–1 through CR8–4 are switched from the positions illustrated in FIG. 37. In this manner, terminal T64 in FIG. 37 is now connetcted to junction J2 while ground potential is connected to both counters C2 and C4. The copy count indicators I6 and I8 are energized and a negative potential is applied via contact relay CR8–3 to terminals T of counters C2 and C4. Therefore, with solenoid SOL8 energized the counter circuit of FIG. 37 is ready to receive count signals from the circuit of FIG. 36.

Referring now briefly to FIG. 36, where output terminal T64 corresponds with input terminal T64 associated with contact relay CR8–4 in FIG. 37, it is recalled that signals from the stop photocell are received at input terminal T46 in FIG. 36 to set flip-flop FF8 via AND gate G46 and, in effect, generate an output pulse from AND gate G48 of some predetermined duration dictated by the delay of circuit DC22. This output pulse at terminal T64 represents a flash illumination of the document stopped in the exposure zone. Each time this pulse is received by input terminal T64 of FIG. 37, diode D4 is forward biased and units counter C2 is stepped one unit. This one unit step is displayed by copy count indicator I8 as the numeral K1.

In the example used in describing a typical operational cycle of the apparatus of the present invention, it was assumed that a predetermined plurality of reduced copies was desired of a particular document. Therefore, continuing this example, it may be assumed that two reduced copies were desired. In that instance, after the document has been flash illuminated for the second time, copy count indicator I8 will display the numeral K2 which corresponds to the numeral displayed by the units preselected count indicator I4. This coincidence will be relayed to AND gate G60 via lead C2 from wafer switch SW29. The other input to AND gate G60 will be derived from wafer switch SW23 and decade counter C4 via connection C4. In this case, the tens decade counter will have a zero count registered and the zero terminal of wafer switch SW23 will be energized indicating coincidence. This coincidence determined by AND gate G60 will be represented by a positive-going signal at output terminal T72 associated with this AND gate.

Referring back to FIG. 34 wherein input terminal T72 corresponds with output terminal T72 of FIG. 37, the positive-going signal generated by AND gate G60 upon coincidence between the preselected count and the actual copy count registered by decade counters C2 and C4 will act to reset flip-flops FF4 and FF5. The resetting of these flip-flops acts to return the high speed and low speed exposure transport clutches and brake to their initial condition, whereby the document electrostatically adhered to the exposure transport belt will be advanced out of the exposure zone. Delay circuit DC8 in the zero side output of flip-flop FF4 serves to delay the high level signal which will energize the high clutch of the exposure transport.

In this manner, delay of circuit DC8 prevents the exposure transport from going up to high speed from a brake condition and possibly damaging the mechanical drive for the transport system. Therefore, after the delay of circuit DC8 the exposure transport will step up from its low speed to its high speed in advancing the document just copied out of the exposure zone. The resetting of flip-flops FF4 and FF5 upon the completion of the desired number of copies will begin the cycle of the apparatus anew.

Since the energization of solenoid SOL8 is maintained by flip-flop FF5 when this flip-flop is in its set condition, the coincidence signal from AND gate G60 deenergizes solenoid SOL8 thereby effecting the reset of counters C2 and C4 to zero. This reset is achieved through the application negative half-wave rectified pulses passed by diodes D6 and D8 from the AC power source connected at terminal T70. At the same time, terminal T of the counters is connected to AC neutral via relay CR8–3.

The document just copied will pass the detacking corotron previously referred to in connection with the description of FIG. 14 and transfer onto the return transport 305. This return transport system will move the document as previously described through conveyor roller 360 and into the influence of the stacker transport system which will deposit the document in the document stacker.

If more documents to be copied are present in the document feeder, they will be fed onto the exposure transport system under the control of the circuit of FIG. 34 as previously decribed.

Assuming that there are no more documents to process, the output of OR gate G38 in FIG. 33 will no longer detect a signal at either input terminals T30, T32, or T34.

Therefore, the output of AND gate G12 will go to a low level.

This low level signal will deenergize the card scrub roller clutch coupled to output terminal T48. This low level signal at the output of AND gate G12 will also effect a positive-going signal at the output of NOR gate G10. This positive-going signal will be delayed by delay circuit DC2 for a predetermined period of time, for example 20 seconds. At the end of this period of time AND gate G6 will be disabled thereby deenergizing solenoid SOL6. Deenergization of solenoid SOL6 interrupts power to the developer housing motor MOT2 from power surface PS7.

Delay circuit DC4 will delay this positive-going signal for a longer period of time, such as 50 seconds. After this delay, AND gate G8 will be disabled thereby deenergizing solenoid SOL2 which controls power to the various power supplies, drive, and compressor motors in the apparatus as previously noted.

If the apparatus was in a print condition when the termination of a document-in-process signal was detected by OR gate G38, then the high level signal delayed by circuit DC2 will enable AND gate G14 to energize solenoid SOL4 opening the closed contacts of relay CR4 (FIG. 32). This operates to effectively isolate AC power supply PS7 from the rest of the apparatus thereby completely shutting the apparatus down.

There are certain failure detection circuits utilized in the apparatus of the present invention. Referring to FIG. 33, the document failure and card failure detection systems are illustrated. The document failure lamp LMP4 will be energized upon the occurence of several conditions in the document path.

One condition is a jam of documents in the transport system. This condition will be signified by a signal at input terminal T74 in FIG. 33. This input terminal corresponds to a similarly designated output terminal in FIG. 32 which will be referred to hereinafter.

If the photocells PC7 detecting the lead edge of a document as it leaves the document feeder do not detect a document within a specified period of time determined by delay circuit DC26 after energization of the document feeder, AND gate G62 will be enabled to pass a setting signal via OR gate G64 to flip-flop FF10. Flip-flop FF10 will then act to energize lamp LMP4 via NOR gate G66 indicating some malfunction in the feeder. The input terminal T76 connected to AND gate G62 corresponds to output T76 of AND gate G12 in FIG. 33.

Another condition which will energize the document failure lamp LMP4 is a double feed detection signal at input terminal T14 which is connected to the double feed sensing apparatus previously described. This input terminal T14 is directly connected to NOR gate G66.

The card failure detection lamp LMP5 is responsive, as was the document failure lamp, to certain conditions indicating the malfunction in the card transport system. The sole condition to which this lamp is responsive is the condition wherein a document is indicated as being in process along the document transport path and the card feeder clutch is energized. This implies that a card has been requested to be fed into the card transport system but this request has not been responded to by the card feeder system.

This condition will also place the entire apparatus in a stop print condition by connecting the output of flip-flop FF11 to the flip-flop FF1 via OR gate G56 and OR G58. This same stop print condition will result when there are no longer documents in process and a double feed detection is made. This condition is sensed by flip-flop FF1 via AND gate G130 and OR gate G56 and OR gate G58.

Another condition which will place the apparatus in a stop print condition is the coincidence of a double feed condition and the absence of a document-in-process signal which is detected by AND gate G54.

Also, whenever flip-flop FF10 in the document failure circuit of FIG. 33 is set, the apparatus will enter a stop print condition.

OR gate G58 also monitors an input directly from the stop print button designated PB10 on the control panel of FIG. 31. Depression of the stop print button actuates switch SW15 thereby providing the operator with direct control over the apparatus without necessitating complete shut down of the machine as is the case in the depression of the off button PB9.

When the machine is placed in a stop print condition and solenoid SOL3 is de-energized, the contacts of relay CR3–1 in FIG. 32 return to their normally closed condition providing AC power through close contacts of relay CR1–2 from source PS7 to energize solenoid SOL10 which has a time delay characteristic. This time delay may, for example, be ten minutes. After power has been supplied to solenoid SOL10 for the specified delay period, this solenoid opens the contacts of relay CR10 thereby terminating power to the entire apparatus and effecting a complete shut down of the apparatus.

The document failure lamp LMP4 will be energized upon the occurrence of a jam indicated by a signal at input terminal T74 of FIG. 33. This signal is provided by a jam sensing circuit illustrated in FIG. 35 which will now be described.

Basically, the jam detector functions as an up-down counter and maintains the count as a function of the documents copied and the documents returned to the document stacker at the output of the document transport system.

Figure 35:
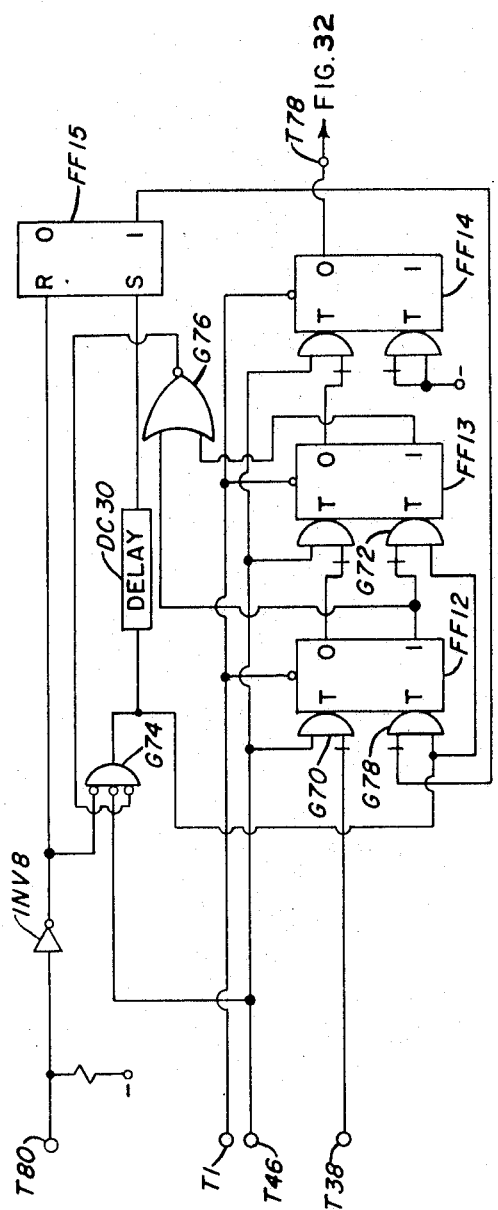

The jam detector in FIG. 35 has four inputs: from the slot sense photocell at input terminal T46, from flip-flop FF3 in FIG. 34 which controls the document gate at input terminal T38 and a reset signal input at terminal T1. The fourth input to the jam detector is derived from the document output photocell referred to in the description of FIG. 9 which monitors documents entering the area of the document stacker. This signal is received at input terminal T80. Initially, the stages of the up-down counter, namely flip-flops F12, F13, and F14 are in their reset condition providing a high level signal at output terminal T78 which corresponds to input terminal T78 of FIG. 32. This initial reset is accomplished by a reset pulse at input terminal T1. Each flip-flop FF12, FF13, and FF14 in FIG. 35 has two inputs through an appropriate AND gate to the toggle input (designated T) of the flip-flop. Each of these AND gates has two inputs, a DC level input and a clock input, the latter being designated by the short line bisecting the input lead. The gate is enabled by a high level signal on the DC level input and a positive-going signal or low-high level transition at the clock input. The toggle connection to these flip-flops will switch the flip-flop from its previous stable state to its other stable state upon the enabling of either AND gate.

In operation, the counter is stepped up one count by the signal at input terminal T38, i.e., each time the document gate is released to permit a document to be advanced toward the transport system. This signal at input terminal T38 is a positive-going signal coincident with the setting of flip-flop FF3 in FIG. 34 and will set flip-flop FF12 via AND gate G70 since the DC level input to this AND gate is enabled upon the detection by the slot sense photocell of the slot in the exposure transport belt. This signal is applied to the circuit of FIG. 35 at input terminal T46.

The setting of flip-flop FF12 has no affect on the condition of flip-flop FF13, since the only positive-going signal to this flip-flop is applied via AND gate G72, the DC level of which is disabled. This DC level input of AND gate G72 is connected to the output of AND gate G74 which is a low level signal. This low level output condition of AND gate G74 is a result of the high level signal applied from input terminal T46 via an input inverter associated with this gate. A NOR gate G76 monitors the one output of both flip-flops FF12 and FF13 and the output of this NOR gate will be a low level signal while the up-down counter has registered a count of 1, 2, or 3.

The up-down counter will continue to register a count indicative of each time a document is released by the document gate to the transport system. This count will be made in what is referred to as the up direction.

As each document is copied and proceeds to the document stacker referred to previously in connection with the discussion of FIG. 9, the document output photocell PC11 will detect the lead edge of the document as it enters the document stacker and provide a low level signal at input terminal T80 of FIG. 35. This low level signal is inverted by inverter INV8 to provide a low-high transition to the reset input of flip-flop FF15 to insure that this flip-flop is in a reset condition. Also, this inverted low level signal is provided to an input inverter associated with AND gate G74. As the trailing edge of the document passes the document output photocell, the output of inverter INV8 goes to a low level signal condition. Since the other two inputs to AND gate G74 are enabled, this gate G74 will be enabled when the trailing edge of the document passes the document output photocell. This generates a high level signal which is delayed by delay circuit DC30 and which also enables the DC level inputs of AND gates G72 and G78. After the delay of circuit DC30 has elapsed, this high level signal sets flip-flop FF15 which has its one output coupled to the clock input of AND gate G78. The positive-going signal from flip-flop FF15 enables AND gates G78 thereby toggling flip-flop FF12 to its other stable state and effectively reducing the count registered in the counter by one unit. In this manner, the counter should never register a count greater than three since this count is reduced as each document leaves the document transport. If a jam occurs somewhere in the transport system preventing documents from entering the stacker, the count in the counter will not be reduced. Therefore this count will exceed three and flip-flop FF14 will be set. The signal at the zero output of flip-flop FF14 will energize jam solenoid SOL9 in FIG. 32 which closes the contacts of relay CR9 thereby producing a jam detect signal at terminal T74 of FIG. 33.

Upon the energization of solenoid SOL9, the normally closed contacts of relay C9 will be opened thereby removing print switch PSW1 from its energizing potential. The operator will then be unable to resume printing operations until the jam is cleared and a jam reset switch SW14 (FIG. 32) is depressed. This energizes jam override solenoid SOL11 which restores relay CR9 to its initial condition thereby permitting the print operation to be renewed by the depression of print switch SW1. In the above example, the operation of the apparatus of the present invention was described for the reducing mode wherein it is desired to obtain multiple copies of documents in reduced form on cardstock. As noted then, the apparatus is also capable of duplicating reduced images on cardstock.

The operations of the apparatus in the DUPLICATE mode are substantially the same as it was in the REDUCE mode with some exceptions.

In the DUPLICATE mode, the depression of the on duplicate pushbutton PB6 initiates the energization of solenoid SOL5 in FIG. 32 through the actuation of switches DSW1, DSW2, and DSW3. Switches DFW1 and DFW2 are connected respectively in parallel with switches RSW1 and RSW2 and therefore perform these same functions in the DUPLICATE mode as these switches performed in the REDUCE mode. In addition, switch DSW3 is connected directly to solenoid SOL5 through the normally close contacts of contact relay CR3–2. Energization of solenoid SOL5 actuates associated contact relays such as CR5–1, which controls the proper lens positioning for duplicate mode, contact relay CR5–2, which energizes the "On Reduce" indicating lamp LMP16 as well as placing in the circuit photocells PC1 and PC2 into the circuit which are connected through OR gates G2 and G4, respectively, to output terminal T6 and T8 in FIG. 32. Energized solenoid SOL5 also actuates the normally open contacts of contact relay CR5–3 to latch solenoid SOL5 to AC power via the normally closed switch RSW3.

The inclusion of photocells PC1 and PC2 into the circuit by the energization of solenoid SOL5 is necessary because the documents to be copied are now small cards which, in order to be on the optical axis of the exposure optical system, must be stopped on the exposure transport belt in the exposure zone sooner than would a normal standard size letter document. With the exception of the aforementioned differences, the operation of the apparatus in the DUPLICATE mode is substantially identical to the operation in the REDUCE mode.

While there has been shown and described one embodiment of the invention, it is intended that the invention be not limited to the exact form shown and described nor to anything less than the whole of the invention as set forth in the appended claims.

What is claimed is:

1. Xerographic printing apparatus adapted for reproducing images of visual information in reduced configuration on record media such as electrical accounting machine cards or the like, comprising in combination,
   a photoconductive insulating member comprising a flexible endless belt having a photoconductive surface thereon,
   rotatable roller means mounting said photoconductive member and defining a path of movement through which said photoconductive member is advanced,
   drive means operatively connecting said roller means for continuously advancing said photoconductive member along the defined path past a series of xerographic processing stations,
   one of said xerographic processing stations including an optical system for projecting images of exposed visual information onto said photoconductive member including a document exposure station optically aligned with said photoconductive member and adapted to receive input documents having visual information thereon,
   condition responsive illumination means at said station adapted upon actuation thereof to instantaneously expose said photoconductive member to the full frame image of visual information on an input document, at least two optical lenses of predetermined focal lengths and alternatively movable into and out of the optical path for determining the size of projected images at the photoconductive member, another of said xerographic processing stations including means for transferring developed latent electrostatic images from said photoconductive member onto the surface of a record medium, fusing means for fusing transferred images to record medium including flash illumination means adapted upon actuation thereof to emit an amount of radiant energy sufficient to fuse said images to said record medium.

2. An automatic xerographic reproducing machine for creating a facsimile of various sized original documents onto data processing media and duplicating said media including, feeding means for forwarding a document to an exposure station, exposure means to illuminate a document at said exposure station with a high intensity short duration flash of light, means defining an optical path emanating from an illuminated document at said exposure station and terminating at a photoreceptive surface actinic to said illumination light, a photoreceptive surface advanced past said termination point in a substantially flattened orientation to receive a light pattern image of an illuminated document forming a latent image thereof, means to develop said latent image formed at said photoreceptive surface, means positioned adjacent said photoreceptive surface for adjusting the area of the photoreceptive surface adapted to receive a light pattern image of an illuminated document, and wherein said photoreceptive surface is in the form of an endless belt having a portion with lead and trail edges indicative of a seam in said belt;

said means for adjusting the area of the photoreceptive surface includes:

first and second opaque mask members separated by an area to accommodate said light pattern image, said first mask member being stationary relative to said optical path, adjusting means for varying the area of separation between said first and second mask members, first photocell means fixed to said second mask member and movable therewith for generating a first electrical signal upon the entry of said lead edge of said portion into said area of separation, second photocell means fixed to said first mask member for generating a second electrical signal upon the egress of said trail edge of said portion from said area of separation; and inhibit circuit means responsive to said first and second electrical signals for inhibiting said exposure means for illuminating said document during the presence of said portion in said area of separation.

3. A two mode automatic xerographic reproducing machine for creating reduced facsimiles of various sized original documents onto data processing card stock and equidimensional facsimiles of original data processing cards onto data processing card stock comprising:

a feeding means for forwarding originals to an exposure station;

a photorecepter;

means for continuously moving said photoreceptor with a portion thereof in a flattended condition;

exposure means for selectively illuminating simultaneously the entire original at said exposure station;

means for positioning data processing card originals at a first position at said exposure station in a duplicate mode and other originals at a second position at said exposure station in a reduce mode;

optical means having an optical path between said exposure station and said photoreceptor for forming a reduced or equidimensional light pattern latent image of the original at said exposure station on the flattened portion of said photoreceptor during said reduce or duplicate mode, respectively.

4. An automatic xerographic reproducing machine for creating facsimiles of original full size documents on data processing media in a reduce mode and facsimiles of original data processing media on like data processing medium in a duplicate mode comprising:

feeding means for forwarding an original to an exposure station;

a photoreceptor;

means for continuously moving a portion of said photoreceptor in a flattened condition;

optical means including a light source for forming simultaneously at said flattened portion of said photoreceptor a light pattern image of an original at said exposure station and having an optical path commencing at said exposure station and terminating at said portion of said photoreceptor, said optical means including at least two lenses one of which forms a reduced light image of an original at said exposure station, said lenses being alternately movable into said optical path;

means for selectively positioning one of said lenses in said optical path depending upon the desired mode;

registration means at said exposure station condition responsive to which of said lenses is in said optical path for registering original data processing media at a first position at said exposure station, and other originals at a second position at said exposure station, said other originals being positioned at said second position when said one lens is in said optical path;

means for developing said light pattern formed at said photoreceptor.

References Cited

UNITED STATES PATENTS

| | | | |
|---|---|---|---|
| 2,741,960 | 4/1956 | Oldenboom | 355—11 X |
| 2,923,212 | 2/1960 | Corrado | 95—4.5 |
| 3,011,474 | 12/1961 | Ulrich | 355—11 X |
| 3,146,688 | 9/1964 | Clark | 355—16 X |
| 3,187,162 | 6/1965 | Hojo | 355—3 X |
| 3,282,177 | 11/1966 | Stanton | 355—14 X |
| 3,299,787 | 1/1967 | Kolb | 355—16 X |
| 3,339,469 | 9/1967 | McFarlane | 355—16 |

JOHN M. HORAN, Primary Examiner